(12) United States Patent
Araki

(10) Patent No.: US 10,779,009 B2
(45) Date of Patent: Sep. 15, 2020

(54) IMAGE DECODING DEVICE AND METHOD

(71) Applicant: SONY CORPORATION, Tokyo (JP)

(72) Inventor: Yuichi Araki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/423,399

(22) Filed: May 28, 2019

(65) Prior Publication Data

US 2019/0281323 A1 Sep. 12, 2019

Related U.S. Application Data

(63) Continuation of application No. 15/128,008, filed as application No. PCT/JP2015/057837 on Mar. 17, 2015, now Pat. No. 10,440,397.

(30) Foreign Application Priority Data

Mar. 31, 2014 (JP) ................. 2014-071170

(51) Int. Cl.
| | |
|---|---|
| *H04N 19/86* | (2014.01) |
| *H04N 19/82* | (2014.01) |
| *H04N 19/70* | (2014.01) |
| *H04N 19/30* | (2014.01) |
| *H04N 19/96* | (2014.01) |

(52) U.S. Cl.
CPC ............ *H04N 19/86* (2014.11); *H04N 19/30* (2014.11); *H04N 19/70* (2014.11); *H04N 19/82* (2014.11); *H04N 19/96* (2014.11)

(58) Field of Classification Search
CPC .................................. H04N 7/14; H04N 7/15
USPC .......................................... 375/240.1–240.29
See application file for complete search history.

(56) References Cited

U.S. PATENT DOCUMENTS

| | | | |
|---|---|---|---|
| 8,799,499 B2 | 8/2014 | Brannon, Jr. | |
| 9,270,987 B2 | 2/2016 | Sato | |
| 2014/0328411 A1* | 11/2014 | Jeong | H04N 19/70 375/240.26 |

(Continued)

FOREIGN PATENT DOCUMENTS

| | | |
|---|---|---|
| JP | 2013-141094 A | 7/2013 |
| JP | 2013-229866 A | 11/2013 |

(Continued)

OTHER PUBLICATIONS

Notice of Allowance and Fees Due for U.S. Appl. No. 15/128,008, dated Feb. 27, 2019, 07 pages.

(Continued)

*Primary Examiner* — Frederick D Bailey
(74) *Attorney, Agent, or Firm* — Chip Law Group

(57) ABSTRACT

The present disclosure relates to an image decoding device and method through which it is possible to suppress an increase in a load of a decoding process. The present disclosure is provided with a decoding unit configured to generate decoded image data by decoding encoding data obtained by encoding image data for each coding unit (CU) that is recursively divided, and a filter processing unit configured to perform a filter process of the decoded image data generated by the decoding unit according to information set for each data unit corresponding to header information of the encoding data. The present disclosure is applicable, for example, to an image decoding device and the like.

20 Claims, 39 Drawing Sheets

(56) References Cited

U.S. PATENT DOCUMENTS

2016/0269684 A1* 9/2016 Lim .................... H04N 7/15

FOREIGN PATENT DOCUMENTS

| WO | 2013/108684 A1 | 7/2013 |
|---|---|---|
| WO | 2013/145773 A1 | 10/2013 |
| WO | 2013/192164 A2 | 12/2013 |

OTHER PUBLICATIONS

Advisory Action for U.S. Appl. No. 15/128,008, dated Dec. 5, 2018, 05 pages.
Final Office Action for U.S. Appl. No. 15/128,008, dated Sep. 21, 2018, 10 pages.
Non-Final Office Action for U.S. Appl. No. 15/128,008, dated Apr. 6, 2018, 10 pages.
Office Action for JP Patent Application No. 2016-511513, dated Mar. 7, 2019, 11 pages of Office Action and 09 pages of English Translation.
High Efficiency Video Coding, Series H: Audiovisual and Multimedia Systems, Infrastructure of Audiovisual Services-coding of Moving Video, ITU-T Telecommunication Standardization Sector of ITU, H.265, Apr. 2013, 23 pages.
Bross, et al.,"Editors Proposed Corrections to HEVC Version 1", Joint Collaborative Team on Video Coding (JCT-1 VC) of ITU-T SG 16 WP 3 and ISO/IEC JTC 1/SC 29/WG 11, 13th Meeting: Incheon, KR, Apr. 18-26, 2013, pp. 1-298.
High Efficiency Video Coding, Recommendation ITU-T H.265, International Telecommunication Union, Apr. 2013, p. 8.
Telecommunication Standardization Sector of ITU, "Infrastructure of Audiovisual Services—Coding of 2 Moving Video", An Exposition on "MPEG-DASH", Series H: Audiovisual and Multimedia Systems, ITU-T, High efficiency video coding, H.265, Apr. 2013, p. 8.
International Search Report and Written Opinion of PCT Application No. PCT/JP2015/057837, dated May 26, 2015, 06 pages of English Translation and 06 pages of ISRWO.
International Preliminary Report on Patentability of PCT Application No. PCT/JP2015/057837, dated Oct. 13, 2016, 07 pages of English Translation and 05 pages of IPRP.
Office Action for JP Patent Application No. 2016-511513, dated Oct. 17, 2019, 07 pages of Office Action and 07 pages of English Translation.
"Series H: Audiovisual and Multimedia Systems, Infrastructure of Audiovisual Services—Coding of Moving Video", High Efficiency Video Coding, ITU-T H.265, Apr. 2013, 23 pages.
Office Action for JP Patent Application No. 2016-511513, dated Jan. 31, 2020, 03 pages of Office Action and 03 pages of English Translation.

* cited by examiner

FIG. 5

| Sequence parameter set RBSP syntax | |
|---|---|
| seq_parameter_set_rbsp( ) { | Descriptor |
|   sps_video_parameter_set_id | u(4) |
|   sps_max_sub_layers_minus1 | u(3) |
|   sps_temporal_id_nesting_flag | u(1) |
|   profile_tier_level(sps_max_sub_layers_minus1) | |
|   sps_seq_parameter_set_id | ue(v) |
|   chroma_format_idc | ue(v) |
|   if(chroma_format_idc == 3) | |
|     separate_colour_plane_flag | u(1) |
|   pic_width_in_luma_samples | ue(v) |
|   pic_height_in_luma_samples | ue(v) |
|   conformance_window_flag | u(1) |
|   if(conformance_window_flag) { | |
|     conf_win_left_offset | ue(v) |
|     conf_win_right_offset | ue(v) |
|     conf_win_top_offset | ue(v) |
|     conf_win_bottom_offset | ue(v) |
|   } | |
|   bit_depth_luma_minus8 | ue(v) |
|   bit_depth_chroma_minus8 | ue(v) |
|   log2_max_pic_order_cnt_lsb_minus4 | ue(v) |
|   sps_sub_layer_ordering_info_present_flag | u(1) |
|   for (i = (sps_sub_layer_ordering_info_present_flag ? 0:sps_max_sub_layers_minus1);<br>     i <= sps_max_sub_layers_minus1; i++) { | |
|     sps_max_dec_pic_buffering_minus1[i] | ue(v) |
|     sps_max_num_reorder_pics[i] | ue(v) |
|     sps_max_latency_increase_plus1[i] | ue(v) |
|   } | |
|   log2_min_luma_coding_block_size_minus3 | ue(v) |
|   log2_diff_max_min_luma_coding_block_size | ue(v) |
|   log2_min_transform_block_size_minus2 | ue(v) |
|   log2_diff_max_min_transform_block_size | ue(v) |
|   max_transform_hierarchy_depth_inter | ue(v) |
|   max_transform_hierarchy_depth_intra | ue(v) |
|   scaling_list_enabled_flag | u(1) |
|   if(scaling_list_enabled_flag) { | |
|     sps_scaling_list_data_present_flag | u(1) |
|     if(sps_scaling_list_data_present_flag) | |
|       scaling_list_data( ) | |
|   } | |
|   amp_enabled_flag | u(1) |
|   sample_adaptive_offset_enabled_flag | u(1) |
|   pcm_enabled_flag | u(1) |
|   if(pcm_enabled_flag) { | |
|     pcm_sample_bit_depth_luma_minus1 | u(4) |
|     pcm_sample_bit_depth_chroma_minus1 | u(4) |

FIG. 6

| | |
|---|---|
| log2_min_pcm_luma_coding_block_size_minus3 | ue(v) |
| log2_diff_max_min_pcm_luma_coding_block_size | ue(v) |
| pcm_loop_filter_disabled_flag | u(1) |
| } | |
| num_short_term_ref_pic_sets | ue(v) |
| for (i = 0; i < num_short_term_ref_pic_sets; i++) | |
|    short_term_ref_pic_set(i) | |
| long_term_ref_pics_present_flag | u(1) |
| if(long_term_ref_pics_present_flag) { | |
|   num_long_term_ref_pics_sps | ue(v) |
|   for(i = 0; i < num_long_term_ref_pics_sps; i++) { | |
|     lt_ref_pic_poc_lsb_sps[i] | u(v) |
|     used_by_curr_pic_lt_sps_flag[i] | u(1) |
|   } | |
| } | |
| sps_temporal_mvp_enabled_flag | u(1) |
| strong_intra_smoothing_enabled_flag | u(1) |
| vui_parameters_present_flag | u(1) |
| if(vui_parameters_present_flag) | |
|   vui_parameters( ) | |
| sps_extension_flag | u(1) |
| if(sps_extension_flag) | |
|   while(more_rbsp_data( )) | |
|     sps_extension_data_flag | u(1) |
| rbsp_trailing_bits( ) | |
| } | |

FIG. 8

| Picture parameter set RBSP syntax | |
|---|---|
| pic_parameter_set_rbsp() { | Descriptor |
|   pps_pic_parameter_set_id | ue(v) |
|   pps_seq_parameter_set_id | ue(v) |
|   dependent_slice_segments_enabled_flag | u(1) |
|   output_flag_present_flag | u(1) |
|   num_extra_slice_header_bits | u(3) |
|   sign_data_hiding_enabled_flag | u(1) |
|   cabac_init_present_flag | u(1) |
|   num_ref_idx_l0_default_active_minus1 | ue(v) |
|   num_ref_idx_l1_default_active_minus1 | ue(v) |
|   init_qp_minus26 | se(v) |
|   constrained_intra_pred_flag | u(1) |
|   transform_skip_enabled_flag | u(1) |
|   cu_qp_delta_enabled_flag | u(1) |
|   if(cu_qp_delta_enabled_flag) | |
|     diff_cu_qp_delta_depth | ue(v) |
|   pps_cb_qp_offset | se(v) |
|   pps_cr_qp_offset | se(v) |
|   pps_slice_chroma_qp_offsets_present_flag | u(1) |
|   weighted_pred_flag | u(1) |
|   weighted_bipred_flag | u(1) |
|   transquant_bypass_enabled_flag | u(1) |
|   tiles_enabled_flag | u(1) |
|   entropy_coding_sync_enabled_flag | u(1) |
|   if(tiles_enabled_flag) { | |
|     num_tile_columns_minus1 | ue(v) |
|     num_tile_rows_minus1 | ue(v) |
|     uniform_spacing_flag | u(1) |
|     if(!uniform_spacing_flag) { | |
|       for(i=0; i < num_tile_columns_minus1; i++) | |
|         column_width_minus1[i] | ue(v) |
|       for(i=0; i < num_tile_rows_minus1; i++) | |
|         row_height_minus1[i] | ue(v) |
|     } | |
|     loop_filter_across_tiles_enabled_flag | u(1) |
|   } | |
|   pps_loop_filter_across_slices_enabled_flag | u(1) |
|   deblocking_filter_control_present_flag | u(1) |
|   if(deblocking_filter_control_present_flag) { | |
|     deblocking_filter_override_enabled_flag | u(1) |
|     pps_deblocking_filter_disabled_flag | u(1) |
|     if(!pps_deblocking_filter_disabled_flag) { | |
|       pps_beta_offset_div2 | se(v) |
|       pps_tc_offset_div2 | se(v) |
|     } | |
|   } | |

FIG. 9

| | |
|---|---|
| pps_scaling_list_data_present_flag | u(1) |
| if(pps_scaling_list_data_present_flag) | |
|     scaling_list_data() | |
| lists_modification_present_flag | u(1) |
| log2_parallel_merge_level_minus2 | ue(v) |
| slice_segment_header_extension_present_flag | u(1) |
| pps_extension_flag | u(1) |
| if(pps_extension_flag) | |
|     while(more_rbsp_data()) | |
|         pps_extension_data_flag | u(1) |
| rbsp_trailing_bits() | |
| } | |

FIG. 10

| Slice segment header syntax | |
|---|---|
| slice_segment_header( ) { | Descriptor |
|   first_slice_segment_in_pic_flag | u(1) |
|   if(nal_unit_type >= BLA_W_LP && nal_unit_type <= RSV_IRAP_VCL23) | |
|     no_output_of_prior_pics_flag | u(1) |
|   slice_pic_parameter_set_id | ue(v) |
|   if(!first_slice_segment_in_pic_flag) { | |
|     if(dependent_slice_segments_enabled_flag) | |
|       dependent_slice_segment_flag | u(1) |
|     slice_segment_address | u(v) |
|   } | |
|   if(!dependent_slice_segment_flag) { | |
|     for(i = 0; i < num_extra_slice_header_bits; i++) | |
|       slice_reserved_flag[i] | u(1) |
|     slice_type | ue(v) |
|     if(output_flag_present_flag) | |
|       pic_output_flag | u(1) |
|     if(separate_colour_plane_flag == 1) | |
|       colour_plane_id | u(2) |
|     if(nal_unit_type != IDR_W_RADL && nal_unit_type != IDR_N_LP) { | |
|       slice_pic_order_cnt_lsb | u(v) |
|       short_term_ref_pic_set_sps_flag | u(1) |
|       if(!short_term_ref_pic_set_sps_flag) | |
|         short_term_ref_pic_set(num_short_term_ref_pic_sets) | |
|       else if(num_short_term_ref_pic_sets > 1) | |
|         short_term_ref_pic_set_idx | u(v) |
|       if(long_term_ref_pics_present_flag) { | |
|         if(num_long_term_ref_pics_sps > 0) | |
|           num_long_term_sps | ue(v) |
|         num_long_term_pics | ue(v) |
|         for(i = 0; i < num_long_term_sps + num_long_term_pics; i++) { | |
|           if(i < num_long_term_sps) { | |
|             if(num_long_term_ref_pics_sps > 1) | |
|               lt_idx_sps[i] | u(v) |
|           } else { | |
|             poc_lsb_lt[i] | u(v) |
|             used_by_curr_pic_lt_flag[i] | u(1) |
|           } | |
|           delta_poc_msb_present_flag[i] | u(1) |
|           if(delta_poc_msb_present_flag[i]) | |
|             delta_poc_msb_cycle_lt[i] | ue(v) |
|         } | |
|       } | |
|       if(sps_temporal_mvp_enabled_flag) | |
|         slice_temporal_mvp_enabled_flag | u(1) |

FIG. 11

| | |
|---|---|
| } | |
| if(sample_adaptive_offset_enabled_flag) { | |
|     slice_sao_luma_flag | u(1) |
|     slice_sao_chroma_flag | u(1) |
| } | |
| if(slice_type == P || slice_type == B) { | |
|     num_ref_idx_active_override_flag | u(1) |
|     if(num_ref_idx_active_override_flag) { | |
|         num_ref_idx_l0_active_minus1 | ue(v) |
|         if(slice_type == B) | |
|             num_ref_idx_l1_active_minus1 | ue(v) |
|     } | |
|     if(lists_modification_present_flag && NumPocTotalCurr > 1) | |
|         ref_pic_lists_modification( ) | |
|     if(slice_type == B) | |
|         mvd_l1_zero_flag | u(1) |
|     if(cabac_init_present_flag) | |
|         cabac_init_flag | u(1) |
|     if(slice_temporal_mvp_enabled_flag) { | |
|         if(slice_type == B) | |
|             collocated_from_l0_flag | u(1) |
|         if((collocated_from_l0_flag && num_ref_idx_l0_active_minus1 > 0) \|\|<br>          (!collocated_from_l0_flag && num_ref_idx_l1_active_minus1 > 0)) | |
|             collocated_ref_idx | ue(v) |
|     } | |
|     if((weighted_pred_flag && slice_type == P) \|\|<br>        (weighted_bipred_flag && slice_type == B)) | |
|         pred_weight_table( ) | |
|     five_minus_max_num_merge_cand | ue(v) |
| } | |
| slice_qp_delta | se(v) |
| if(pps_slice_chroma_qp_offsets_present_flag) { | |
|     slice_cb_qp_offset | se(v) |
|     slice_cr_qp_offset | se(v) |
| } | |
| if(deblocking_filter_override_enabled_flag) | |
|     deblocking_filter_override_flag | u(1) |
| if(deblocking_filter_override_flag) { | |
|     slice_deblocking_filter_disabled_flag | u(1) |
|     if(!slice_deblocking_filter_disabled_flag) { | |
|         slice_beta_offset_div2 | se(v) |
|         slice_tc_offset_div2 | se(v) |
|     } | |
| } | |
| if(pps_loop_filter_across_slices_enabled_flag &&<br>    (slice_sao_luma_flag \|\| slice_sao_chroma_flag \|\|<br>    !slice_deblocking_filter_disabled_flag)) | |
|     slice_loop_filter_across_slices_enabled_flag | u(1) |
| } | |
| if(tiles_enabled_flag \|\| entropy_coding_sync_enabled_flag) { | |

FIG. 12

| | |
|---|---|
| num_entry_point_offsets | ue(v) |
| if(num_entry_point_offsets > 0) { | |
|     offset_len_minus1 | ue(v) |
|     for(i = 0; i < num_entry_point_offsets; i++) | |
|         entry_point_offset_minus1[i] | u(v) |
|     } | |
| } | |
| if(slice_segment_header_extension_present_flag) { | |
|     slice_segment_header_extension_length | ue(v) |
|     for(i = 0; i < slice_segment_header_extension_length; i++) | |
|         slice_segment_header_extension_data_byte[i] | u(8) |
| } | |
| byte_alignment( ) | |
| } | |

FIG. 14

| Coding unit syntax | |
|---|---|
| coding_unit(x0, y0, log2CbSize) { | Descriptor |
|   if(transquant_bypass_enabled_flag) | |
|     cu_transquant_bypass_flag | ae(v) |
|   if(slice_type != I) | |
|     cu_skip_flag[x0][y0] | ae(v) |
|   nCbS = (1 << log2CbSize) | |
|   if(cu_skip_flag[x0][y0]) | |
|     prediction_unit(x0, y0, nCbS, nCbS) | |
|   else { | |
|     if(slice_type != I) | |
|       pred_mode_flag | ae(v) |
|     if(CuPredMode[x0][y0] != MODE_INTRA \|\| log2CbSize == MinCbLog2SizeY) | |
|       part_mode | ae(v) |
|     if(CuPredMode[x0][y0] == MODE_INTRA) { | |
|       if(PartMode == PART_2Nx2N && pcm_enabled_flag && | |
|         log2CbSize >= Log2MinIpcmCbSizeY && | |
|         log2CbSize <= Log2MaxIpcmCbSizeY) | |
|       pcm_flag[x0][y0] | ae(v) |
|     if(pcm_flag[x0][y0]) { | |
|       while(!byte_aligned()) | |
|         pcm_alignment_zero_bit | f(1) |
|       pcm_sample(x0, y0, log2CbSize) | |
|     } else { | |
|       pbOffset = (PartMode == PART_NxN) ? (nCbS/2) : nCbS | |
|       for(j = 0; j < nCbS; j = j + pbOffset) | |
|         for(i = 0; i < nCbS; i = i + pbOffset) | |
|           prev_intra_luma_pred_flag[x0+i][y0+j] | ae(v) |
|       for(j = 0; j < nCbS; j = j + pbOffset) | |
|         for(i = 0; i < nCbS; i = i + pbOffset) | |
|           if(prev_intra_luma_pred_flag[x0+i][y0+j]) | |
|             mpm_idx[x0+i][y0+j] | ae(v) |
|           else | |
|             rem_intra_luma_pred_mode[x0+i][y0+j] | ae(v) |
|       intra_chroma_pred_mode[x0][y0] | ae(v) |
|     } | |
|   } else { | |
|     if(PartMode == PART_2Nx2N) | |
|       prediction_unit(x0, y0, nCbS, nCbS) | |
|     else if( PartMode == PART_2NxN) { | |
|       prediction_unit(x0, y0, nCbS, nCbS/2) | |
|       prediction_unit(x0, y0 + (nCbS/2), nCbS, nCbS/2) | |
|     } else if(PartMode == PART_Nx2N) { | |
|       prediction_unit(x0, y0, nCbS/2, nCbS) | |
|       prediction_unit(x0 + (nCbS/2), y0, nCbS/2, nCbS) | |
|     } else if(PartMode == PART_2NxnU) { | |
|       prediction_unit(x0, y0, nCbS, nCbS/4) | |
|       prediction_unit(x0, y0 + (nCbS/4), nCbS, nCbS*3/4) | |
|     } else if(PartMode == PART_2NxnD) { | |
|       prediction_unit(x0, y0, nCbS, nCbS*3/4) | |

FIG. 15

| | |
|---|---|
| prediction_unit(x0, y0 + (nCbS*3/4), nCbS, nCbS/4) | |
| } else if(PartMode = = PART_nLx2N) { | |
| prediction_unit(x0, y0, nCbS/4, nCbS) | |
| prediction_unit(x0 + (nCbS/4), y0, nCbS*3/4, nCbS) | |
| } else if(PartMode = = PART_nRx2N) { | |
| prediction_unit(x0, y0, nCbS*3/4, nCbS) | |
| prediction_unit(x0 + (nCbS*3/4), y0, nCbS/4, nCbS) | |
| } else {/* PART_NxN */ | |
| prediction_unit(x0, y0, nCbS/2, nCbS/2) | |
| prediction_unit(x0 + (nCbS/2), y0, nCbS/2, nCbS/2) | |
| prediction_unit(x0, y0 + (nCbS/2), nCbS/2, nCbS/2) | |
| prediction_unit(x0 + (nCbS/2), y0 + (nCbS/2), nCbS/2, nCbS/2) | |
| } | |
| } | |
| if(!pcm_flag[x0][y0]) { | |
| if(CuPredMode[x0][y0] != MODE_INTRA && !(PartMode = = PART_2Nx2N && merge_flag[x0][y0])) | |
| rqt_root_cbf | ae(v) |
| if(rqt_root_cbf) { | |
| MaxTrafoDepth = (CuPredMode[x0][y0] = = MODE_INTRA ? (max_transform_hierarchy_depth_intra + IntraSplitFlag) : max_transform_hierarchy_depth_inter) | |
| transform_tree(x0, y0, x0, y0, log2CbSize, 0, 0) | |
| } | |
| } | |
| } | |
| } | |

IMAGE DECODING DEVICE AND METHOD

CROSS REFERENCE TO RELATED APPLICATIONS

The present application claims priority from U.S. patent application Ser. No. 15/128,008, filed on Sep. 21, 2016, which is a U.S. National Stage Entry of International Patent Application No. PCT/JP2015/057837 filed on Mar. 17, 2015, which claims priority benefit of Japanese Patent Application No. 2014-071170 filed in Japan Patent Office on Mar. 31, 2014. Each of the above-referenced application is hereby incorporated herein by reference in its entirety.

TECHNICAL FIELD

The present disclosure relates to an image decoding device and method, and particularly, to an image decoding device and method through which it is possible to suppress an increase in a load of a decoding process.

BACKGROUND ART

In order to improve video coding efficiency, standardization of a coding scheme called High Efficiency Video Coding (HEVC) has proceeded and the development of version 1 has already been completed (for example, refer to Non-Patent Literature 1).

CITATION LIST

Non-Patent Literature

Non-Patent Literature 1: Benjamin Bross, Gary J. Sullivan, Ye-Kui Wang, "Editors' proposed corrections to HEVC version 1," JCTVC-M0432_v3, 2013 Apr. 25

SUMMARY OF INVENTION

Technical Problem

In the version 1, lossless coding for coding units (CUs) of 8×8, 16×16, 32×32, and 64×64 is possible. In this case, a value of a pixel should not be changed according to a loop filter process such as a deblocking filter and a sample adaptive offset (SAO). In addition, it is possible to change a quantization parameter (Qp) for each coding unit, and when a deblocking filter process is performed on a boundary edge between coding units, values of quantization parameters (Qp) of coding units should be referred to.

Therefore, in the loop filter process, information of coding units should be referred to and there is concern of a load of a decoding process increasing.

The present disclosure has been made in view of the above-described circumstances, and can suppress a load of a decoding process from increasing.

Solution to Problem

According to an embodiment of the present technology, there is provided an image decoding device including a decoding unit configured to generate decoded image data by decoding encoding data obtained by encoding image data for each coding unit (CU) that is recursively divided, and a filter processing unit configured to perform a filter process of the decoded image data generated by the decoding unit according to information set for each data unit corresponding to header information of the encoding data.

The filter processing unit may skip a reference to information set for each CU unit referred to when the filter process is performed and performs the filter process of the decoded image data.

When conditions for values of the header information indicate that it is unnecessary to refer to information set for each CU unit, the filter processing unit may skip a reference to information set for each CU unit referred to when the filter process is performed.

The filter processing unit may perform a filter process of the decoded image data in units of coding tree blocks (CTBs).

The filter processing unit may perform a deblocking filter process as the filter process.

When the following formulae are satisfied as the conditions, the filter processing unit may skip a reference to information set for each CU unit referred to when the filter process is performed:

$$pcm\_loop\_filter\_disabled\_flag==0$$

$$transquant\_bypass\_enabled\_flag==0$$

$$cu\_qp\_delta\_enabled\_flag==0.$$

When a picture includes one slice, the filter processing unit may skip a reference to information set for each CU unit referred to when the filter process is performed.

When a picture includes a plurality of slices and when slice headers in the picture have same slice_qp_delta, the filter processing unit may skip a reference to information set for each CU unit referred to when the filter process is performed.

The filter processing unit may perform a sample adaptive offset process as the filter process.

When the following formulae are satisfied as the conditions, the filter processing unit may skip a reference to information set for each CU unit referred to when the filter process is performed:

$$pcm\_loop\_filter\_disabled\_flag==0$$

$$transquant\_bypass\_enabled\_flag==0.$$

According to an embodiment of the present technology, there is provided an image decoding method including generating decoded image data by decoding encoding data obtained by encoding image data for each coding unit (CU) that is recursively divided, and performing a filter process of the generated decoded image data according to information set for each data unit corresponding to header information of the encoding data.

According to an embodiment of the present technology, decoded image data is generated by decoding encoding data obtained by encoding image data for each coding unit (CU) that is recursively divided, and a filter process of the generated decoded image data is performed according to information set for each data unit corresponding to header information of the encoding data.

Advantageous Effects of Invention

According to the present disclosure, it is possible to decode encoding data obtained by encoding image data. In particular, it is possible to suppress a load of a decoding process from increasing.

BRIEF DESCRIPTION OF DRAWINGS

FIG. 5 is a diagram illustrating an example of a syntax of a sequence parameter set.

FIG. 6 is a diagram illustrating an example of a syntax of a sequence parameter set.

FIG. 8 is a diagram illustrating an example of a syntax of a picture parameter set.

FIG. 9 is a diagram illustrating an example of a syntax of a picture parameter set.

FIG. 10 is a diagram illustrating an example of a syntax of a slice header.

FIG. 11 is a diagram illustrating an example of a syntax of a slice header.

FIG. 12 is a diagram illustrating an example of a syntax of a slice header.

FIG. 14 is a diagram illustrating an example of a syntax of a coding unit.

FIG. 15 is a diagram illustrating an example of a syntax of a coding unit.

DESCRIPTION OF EMBODIMENT(S)

Hereinafter, forms (hereinafter referred to as "embodiments") for implementing the present disclosure will be described. The description will proceed in the following order.

1. First embodiment (image decoding device)
2. Second embodiment (multi-view image decoding device)
3. Third embodiment (hierarchical image decoding device)
4. Fourth embodiment (computer)
5. Fifth embodiment (application example)
6. Sixth embodiment (set, unit, module, and processor)

1. First Embodiment

<HEVC>

In HEVC, a coding tree block (CTB) is defined as a coding unit of a fixed size. Image data of one picture is divided and encoded according to the CTB, and the encoding data of each CTB is sequentially decoded in a decoder. The CTB can be further divided into coding units (CUs) of 8×8, 16×16, 32×32, and 64×64.

Figure 1:
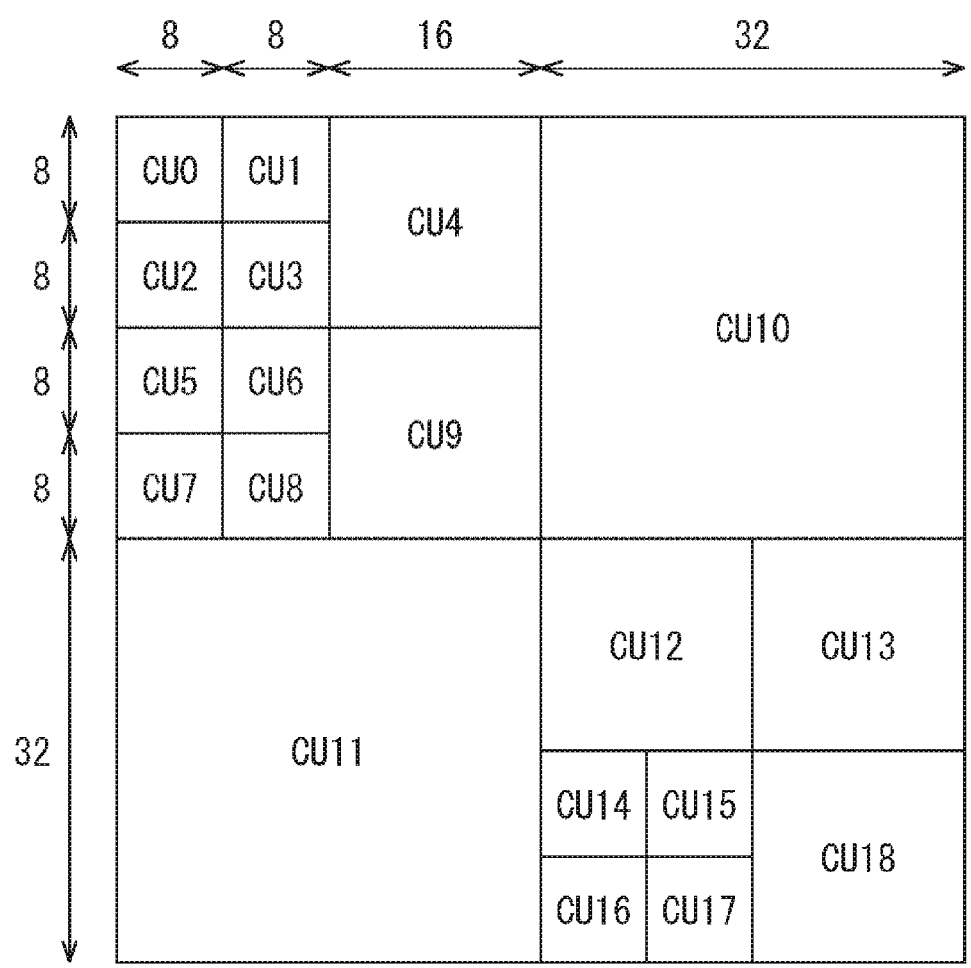
FIG. 1 is a diagram describing a configuration example of a coding unit.

FIG. 1 is a division example of the CU. In the example of FIG. 1, one CTB is divided into 19 CUs.

Meanwhile, in a sequence parameter set (SPS), when pcm_enabled_flag that is flag information indicating whether there is PCM, is "0," a value of pcm_loop_filter_disabled_flag that is flag information indicating whether a loop filter is disabled when PCM is enabled, which is included in the SPS, is implicitly "0." In addition, a value of pcm_flag that is flag information indicating whether there is a syntax structure of pcm_sample and transform_tree in the CU, which is included in the CU of the sequence, is also implicitly "0."

On the other hand, when pcm_enabled_flag=1 is satisfied, there is pcm_loop_filter_disabled_flag and there is pcm_flag for each CU.

Similarly, in a picture parameter set (PPS), when a value of transquant_bypass_enabled_flag is "1," there is cu_transquant_bypass_flag that is flag information indicating whether scaling, a transform process, and a loop filter are skipped in the CU for each CU.

Figure 2:
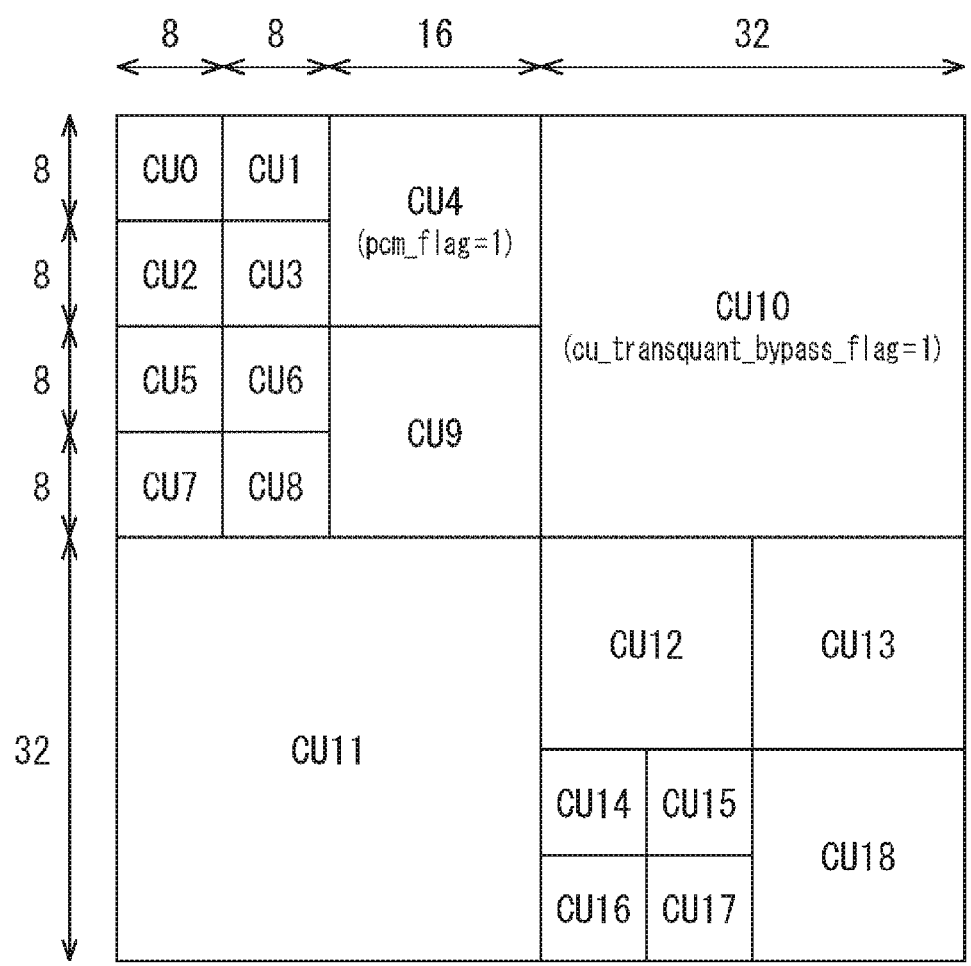
FIG. 2 is a diagram describing an example of information in units of coding units.

FIG. 2 is a diagram illustrating a configuration example of a CTB when there is a CU in which pcm_flag=1 and cu_transquant_bypass_flag=1. In the example of FIG. 2, pcm_flag of CU4 is "1" and cu_transquant_bypass_flag of CU10 is "1."

When a deblocking filter and sample adaptive offset (SAO) process is performed on a CU in which pcm_loop_filter_disabled_flag=1 and pcm_flag=1 (that is, a CU of PCM data) and a CU in which cu_transquant_bypass_flag=1 (a lossless CU), a pixel value in the CU should not be changed according to the HEVC standard. That is, such a pixel value in the CU undergoes a filter process and then returns to a value from before the filter process was performed.

In addition, when cu_qp_delta_enabled_flag that is flag information indicating whether there is diff_cu_qp_delta_depth indicating a difference between a coding tree block size of a luminance signal and a minimum coding unit size including cu_qp_delta_abs and cu_qp_delta_sign_flag in the PPS, and indicating whether there is cu_qp_delta_abs indicating a difference value between a quantization parameter of a current coding unit and a predicted value thereof in a transform unit (TU) is "1," it is possible to change a quantization parameter $Qp_Y$ for each CU.

Figure 3:
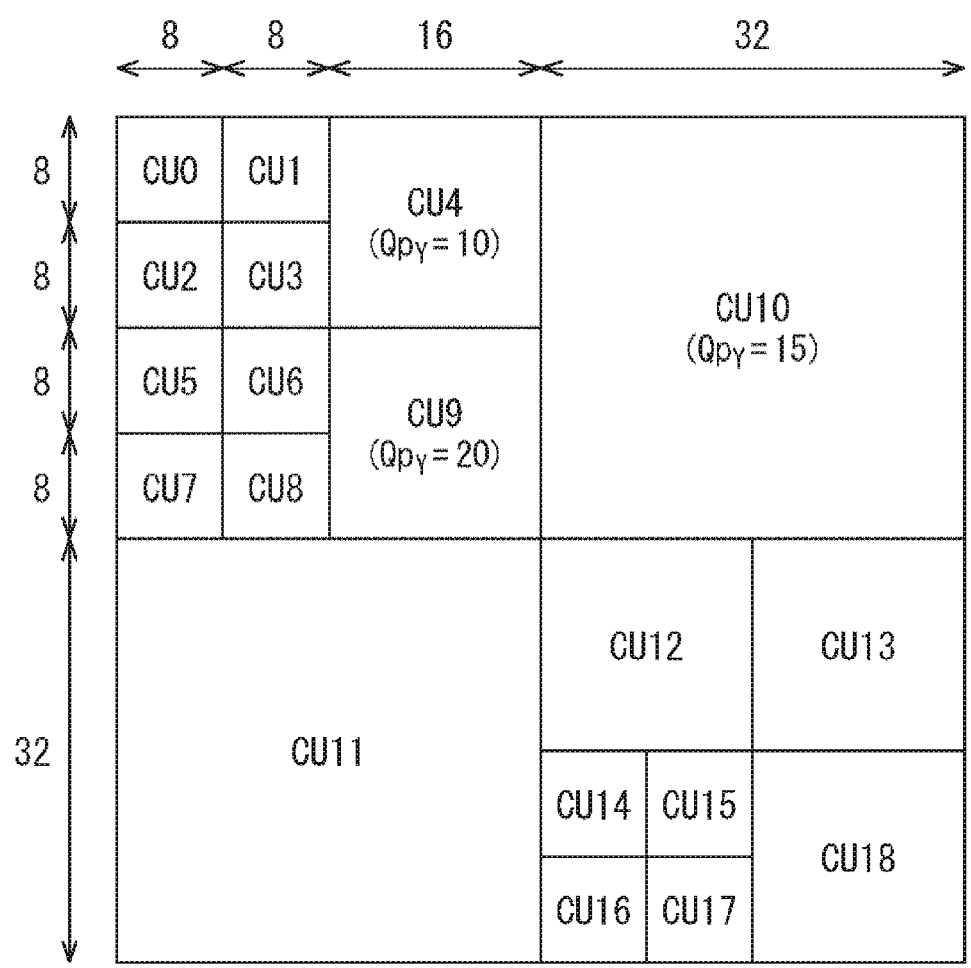
FIG. 3 is a diagram describing an example of information in units of coding units.

FIG. 3 is a diagram illustrating an example in which a value of $Qp_Y$ is changed for each CU. Here, $Qp_Y$ of CU4, CU9, and CU10 is 10, 20, and 15, respectively. A value of qPL=((QpQ+QpP+1)>>1) calculated in a deblocking filter process is a value that is different for each boundary of the CU.

In the case of FIG. 2 and FIG. 3, when the deblocking filter process is performed, it is necessary to acquire pcm_flag, cu_transquant_bypass_flag, and $Qp_Y$ in units of CUs, and use them in the process. In addition, in the case of FIG. 2 and FIG. 3, when an SAO process is performed, it is necessary to acquire pcm_flag and cu_transquant_bypass_flag in units of CUs and use them in the process.

As illustrated in FIG. 1, since it is possible to form a plurality of CUs in the CTB, that is, in a picture, when information of each CU is referred to in this manner, there is concern of a load of the filter process increasing.

In other words, when pcm_flag=0, cu_transquant_bypass_flag=0, and $Qp_Y$=fixed value in all CUs in the picture, in the deblocking filter process and the SAO process, it is unnecessary to refer to information of such CU units, and it is possible to suppress a load of the filter process from increasing.

<Filter Control>

Therefore, according to information set for each data unit corresponding to header information of encoding data, a filter process is performed on decoded image data generated when encoding data obtained by encoding image data is decoded for each CU that is recursively divided. Thus, it is possible to suppress information in units of unnecessarily small data from being used, and it is possible to suppress a load of the decoding process from increasing.

The header information refers to information that is parsed (referred to) before data set in each hierarchy or information that is parsed (referred to) independently from data set in each hierarchy with respect to hierarchies (for example, sequence/picture/slice/tile/maximum coding unit/ coding unit). For example, information such as a video parameter set (VPS), a sequence parameter set (SPS), a picture parameter set (PPS), a slice header, an nal unit type (nal_unit_typ), and supplemental enhancement information (SEI) corresponds to the header information. The header information includes not only information that is explicitly defined as a syntax of a bitstream but also information positioned at the beginning of each hierarchy.

<Image Decoding Device>

Figure 4:
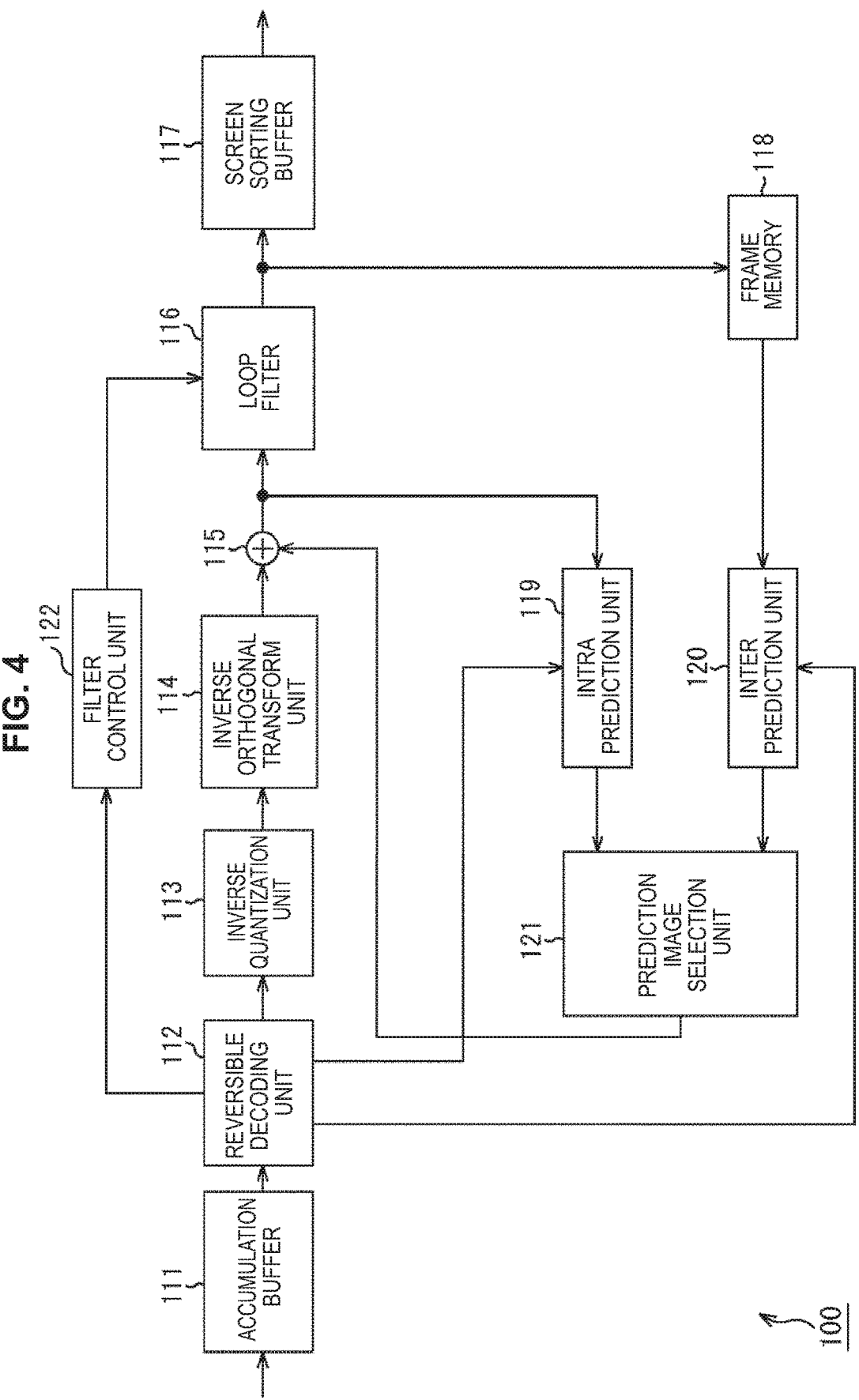
FIG. 4 is a block diagram illustrating an example of a main configuration of an image decoding device.

FIG. 4 is a block diagram illustrating an example of a main configuration of an image decoding device that is a form of an image processing device to which the present technology is applied. An image decoding device 100 illustrated in FIG. 4 decodes encoding data that is generated when an image encoding device (not illustrated) encodes image data according to an HEVC encoding scheme.

As illustrated in FIG. 4, the image decoding device 100 includes an accumulation buffer 111, a reversible decoding unit 112, an inverse quantization unit 113, an inverse orthogonal transform unit 114, a computation unit 115, a loop filter 116, and a screen sorting buffer 117. In addition, the image decoding device 100 includes a frame memory 118, an intra prediction unit 119, an inter prediction unit 120, and a prediction image selection unit 121. Further, the image decoding device 100 includes a filter control unit 122.

The accumulation buffer 111 is a reception unit configured to receive encoding data that has been transmitted from an encoding side. The accumulation buffer 111 receives and accumulates the transmitted encoding data and supplies the encoding data to the reversible decoding unit 112 at a predetermined timing. The reversible decoding unit 112 decodes the encoding data supplied from the accumulation buffer 111 according to an HEVC scheme. For example, the reversible decoding unit 112 decodes the encoding data for each CU that is recursively divided. The reversible decoding unit 112 supplies quantized coefficient data that is obtained by decoding to the inverse quantization unit 113.

In addition, the reversible decoding unit 112 determines whether an intra prediction mode or an inter prediction mode is selected as an optimal prediction mode based on information about the optimal prediction mode that is added to the encoding data, and supplies information about the optimal prediction mode to the intra prediction unit 119 or the inter prediction unit 120 according to a mode determined to have been selected. For example, when the intra prediction mode is selected as the optimal prediction mode on the encoding side, information about the optimal prediction mode is supplied to the intra prediction unit 119. In addition, for example, when the inter prediction mode is selected as the optimal prediction mode on the encoding side, information about the optimal prediction mode is supplied to the inter prediction unit 120.

Further, the reversible decoding unit 112 supplies information necessary for inverse quantization, for example, a quantization matrix and a quantization parameter, to the inverse quantization unit 113.

In addition, the reversible decoding unit 112 supplies the header information such as the sequence parameter set (SPS), the picture parameter set (PPS), and the slice header to the filter control unit 122.

The inverse quantization unit 113 performs inverse quantization of the quantized coefficient data that is obtained by decoding performed by the reversible decoding unit 112 according to a scheme corresponding to a quantization scheme on the encoding side. The inverse quantization unit 113 supplies the obtained coefficient data to the inverse orthogonal transform unit 114.

The inverse orthogonal transform unit 114 performs an inverse orthogonal transform of an orthogonal transform coefficient supplied from the inverse quantization unit 113 according to a scheme corresponding to an orthogonal transform scheme on the encoding side. The inverse orthogonal transform unit 114 obtains residual data corresponding to a state from before an orthogonal transform was performed on the encoding side according to the inverse orthogonal transform process. Residual data obtained by an inverse orthogonal transform is supplied to the computation unit 115.

The computation unit 115 acquires residual data from the inverse orthogonal transform unit 114. In addition, the computation unit 115 acquires a prediction image from the intra prediction unit 119 or the inter prediction unit 120 through the prediction image selection unit 121. The computation unit 115 adds a difference image and the prediction image and obtains a reconstructed image corresponding to an image from before the prediction image was subtracted on the encoding side. The computation unit 115 supplies the reconstructed image to the loop filter 116 and the intra prediction unit 119.

The loop filter 116 generates a decoded image of the supplied reconstructed image by appropriately performing a loop filter process including, for example, the deblocking filter process and the SAO process. For example, the loop filter 116 performs the deblocking filter process of the reconstructed image and thus removes block distortion. In addition, for example, the loop filter 116 performs the SAO process of the deblocking filter processing result (the reconstructed image on which block distortion is removed), and thus performs image quality improvement according to a decrease of ringing and correction of a deviation of a pixel value.

A type of the filter process performed by the loop filter 116 is arbitrary and a filter process other than the above-described process may be performed. In addition, the loop filter 116 may perform the filter process using a filter coefficient supplied from the encoding side.

The loop filter 116 supplies the decoded image serving as the filter processing result to the screen sorting buffer 117 and the frame memory 118.

The screen sorting buffer 117 sorts images. That is, the order of frames that are sorted for the encoding order on the encoding side is sorted according to the order of the original display. The screen sorting buffer 117 outputs decoded image data in which the order of frames is sorted to the outside of the image decoding device 100.

The frame memory 118 stores the supplied decoded image, and supplies the stored decoded image as a reference image to the inter prediction unit 120 at a predetermined timing or based on a request from the outside of, for example, the inter prediction unit 120.

Information indicating the intra prediction mode obtained by decoding the header information and the like are appropriately supplied to the intra prediction unit 119 from the reversible decoding unit 112. The intra prediction unit 119 performs intra prediction using the reconstructed image supplied from the computation unit 115 as a reference image in the intra prediction mode used on the encoding side and generates a prediction image. The intra prediction unit 119 supplies the generated prediction image to the prediction image selection unit 121.

The inter prediction unit 120 acquires information (for example, optimal prediction mode information and reference image information) obtained by decoding the header information from the reversible decoding unit 112.

The inter prediction unit 120 performs inter prediction using the reference image acquired from the frame memory 118 in the inter prediction mode indicated by the optimal prediction mode information acquired from the reversible decoding unit 112 and generates a prediction image.

The prediction image selection unit 121 supplies the prediction image from the intra prediction unit 119 or the prediction image from the inter prediction unit 120 to the computation unit 115. Then, in the computation unit 115, a prediction image generated using a motion vector and the residual data supplied from the inverse orthogonal transform unit 114 are added and the original image is decoded. That is, a reconstructed image is generated.

The filter control unit 122 acquires the header information, for example, the sequence parameter set (SPS), the picture parameter set (PPS), and the slice header, transmitted from the encoding side through the reversible decoding unit 112. The filter control unit 122 determines a data unit of information used in the filter process of the loop filter 116 based on the acquired header information. For example, the filter control unit 122 selects whether CU unit information is used.

The filter control unit 122 generates filter control information for controlling an operation of the loop filter 116 such that the loop filter process is performed using information of the determined (selected) data unit, and supplies the filter control information to the loop filter 116.

FIG. 5 and FIG. 6 show an example of a syntax of the sequence parameter set (SPS). As described above, when pcm_enabled_flag shown in the fourth row from the bottom of FIG. 5 is "1," there is pcm_loop_filter_disabled_flag as shown in the third row from the top of FIG. 6, and there is pcm_flag for each CU.

In such a case, the filter control unit 122 refers to various pieces of header information, for example, the SPS and the PPS, and generates filter control information based on the values thereof.

<Filter Control Unit>

Figure 7:
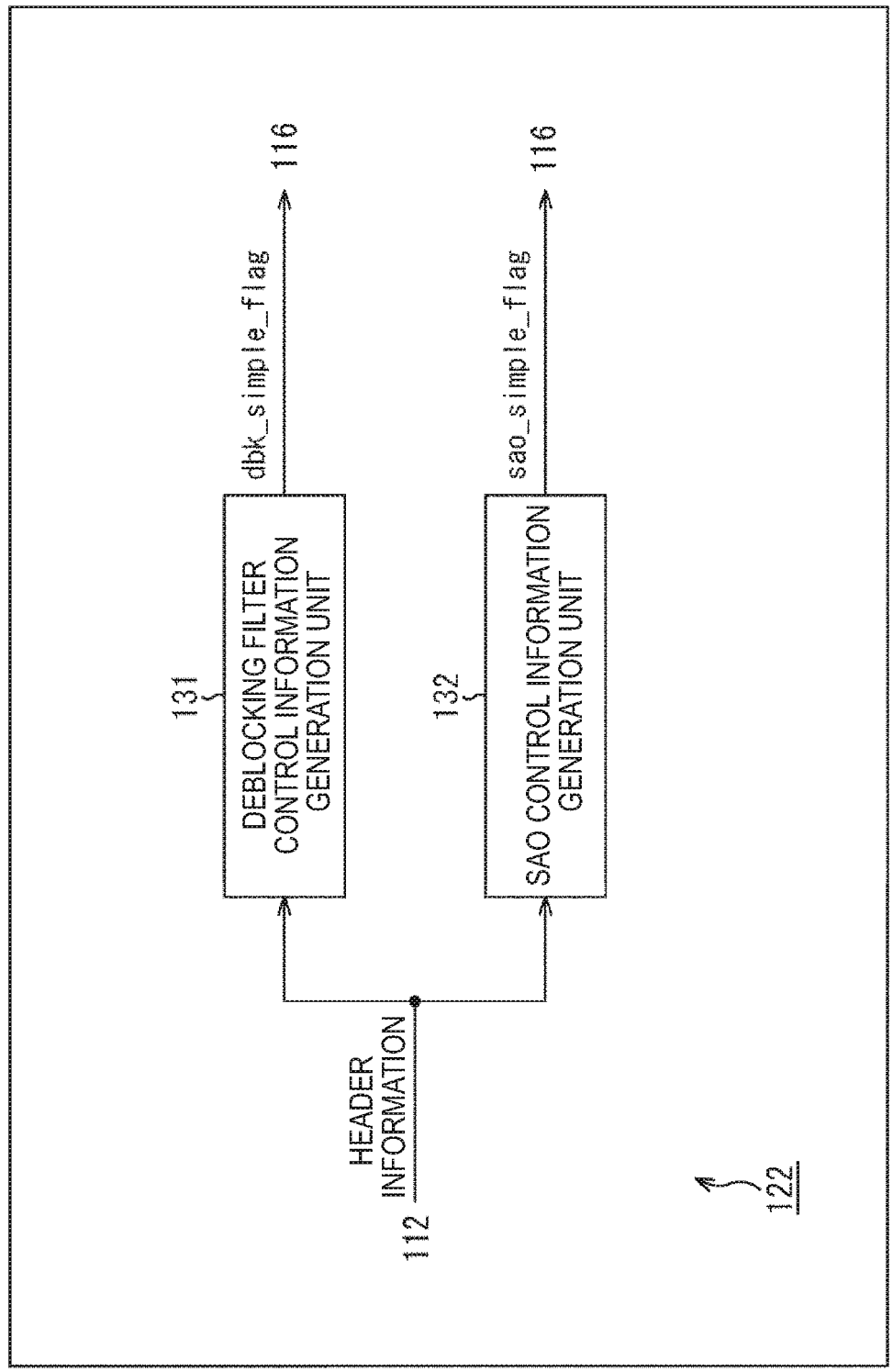
FIG. 7 is a block diagram illustrating an example of a main configuration of a filter control unit.

FIG. 7 illustrates an example of a main configuration of the filter control unit 122. As illustrated in FIG. 7, the filter control unit 122 includes a deblocking filter control information generation unit 131 and an SAO control information generation unit 132.

The deblocking filter control information generation unit 131 refers to the header information, for example, the SPS, the PPS, and the slice header, supplied from the reversible decoding unit 112, and determines a data unit of information used in the deblocking filter process. For example, when conditions for values of such header information indicate that it is unnecessary to refer to information set for each CU unit, the deblocking filter control information generation unit 131 skips a reference to information set for each CU unit referred to when the filter process is performed. In other words, for example, when conditions for values of such header information indicate that it is necessary to refer to information set for each CU unit, the deblocking filter control information generation unit 131 refers to information set for each CU unit referred to when the filter process is performed.

For example, based on the header information, when the filter process of PCM data is disabled, the deblocking filter control information generation unit 131 selects use of CU unit information. For example, the deblocking filter control information generation unit 131 refers to pcm_loop_filter_disabled_flag (the third row from the top of FIG. 6) of the sequence parameter set (SPS), and when the value is true ("1"), selects use of the CU unit information.

In addition, for example, based on the header information, when there is a possibility of the filter process in units of CUs being skipped, the deblocking filter control information generation unit 131 selects use of the CU unit information. For example, the deblocking filter control information generation unit 131 refers to transquant_bypass_enabled_flag of the picture parameter set (PPS), and when the value is true ("1"), selects use of the CU unit information.

FIG. 8 and FIG. 9 show an example of a syntax of the picture parameter set (PPS). When transquant_bypass_enabled_flag shown in the $22^{nd}$ row from the top of FIG. 8 is true ("1"), there is cu_transquant_bypass_flag for each CU. Then, in this case, the deblocking filter control information generation unit 131 selects use of the CU unit information during the deblocking filter process.

Further, for example, based on the header information, when there is a possibility of the quantization parameter in units of CUs being changed, the deblocking filter control information generation unit 131 selects use of the CU unit information. For example, the deblocking filter control information generation unit 131 refers to cu_qp_delta_enabled_flag of the picture parameter set (PPS), and when the value is true ("1"), selects use of the CU unit information.

When cu_qp_delta_enabled_flag shown in the 14th row from the top of FIG. 8 is true ("1"), at least one of diff_cu_qp_delta_depth and cu_qp_delta_abs may be included for each CU. That is, there is a possibility of the quantization parameter in units of CUs being changed. Therefore, in this case, the deblocking filter control information generation unit 131 selects use of the CU unit information during the deblocking filter process.

In addition, for example, when a current picture serving as a processing target includes a plurality of slices and there is a possibility of the quantization parameter for each slice being changed, the deblocking filter control information generation unit 131 selects use of the CU unit information. For example, when slice_qp_delta of the slice header (slice_segment_header) is compared between slices and the values are not the same, the deblocking filter control information generation unit 131 selects use of the CU unit information.

FIG. 10, FIG. 11, and FIG. 12 show an example of a syntax of the slice header. When slice_qp_delta shown in the 29th row from the top of FIG. 11 is not the same between slices, the deblocking filter control information generation unit 131 selects use of the CU unit information during the deblocking filter process.

On the other hand, when all of pcm_loop_filter_disabled_flag, transquant_bypass_enabled_flag, and cu_qp_delta_enabled_flag have false values ("0") and there is no possibility of the quantization parameter for any slice being changed (for example, when a picture includes one slice or when slice headers in a picture have the same slice_qp_delta), the deblocking filter control information generation unit 131 selects nonuse of the CU unit information during the deblocking filter process.

The deblocking filter control information generation unit 131 generates deblocking filter control information dbk_simple_flag, and determines the value as a value reflecting such selection (determination). For example, when the CU unit information is not used during the deblocking filter process, the deblocking filter control information generation unit 131 sets dbk_simple_flag=1. In addition, for example, when the CU unit information is used during the deblocking filter process, the deblocking filter control information generation unit 131 sets dbk_simple_flag=0.

The deblocking filter control information generation unit 131 supplies dbk_simple_flag generated in this manner to the loop filter 116.

The SAO control information generation unit 132 refers to the header information, for example, the SPS and the PPS, supplied from the reversible decoding unit 112, and determines a data unit of information used in the SAO process. For example, when conditions for values of such header information indicate that it is unnecessary to refer to information set for each CU unit, the SAO control information generation unit 132 skips a reference to information set for each CU unit referred to when the filter process is performed. In other words, for example, when conditions for values of such header information indicate that it is necessary to refer to information set for each CU unit, the SAO control information generation unit 132 refers to information set for each CU unit referred to when the filter process is performed.

For example, based on the header information, when the filter process of PCM data is disabled, the SAO control information generation unit 132 selects use of the CU unit information. For example, the SAO control information generation unit 132 refers to pcm_loop_filter_disabled_flag (the third row from the top of FIG. 6) of the sequence parameter set (SPS), and when the value is true ("1"), selects use of the CU unit information.

In addition, for example, based on the header information, when there is a possibility of the filter process in units of CUs being skipped, the SAO control information generation unit 132 selects use of the CU unit information. For example, the SAO control information generation unit 132 refers to transquant_bypass_enabled_flag of the picture parameter set (PPS) (the $22^{nd}$ row from the top of FIG. 8), and when the value is true ("1"), and selects use of the CU unit information.

On the other hand, when both of pcm_loop_filter_disabled_flag and transquant_bypass_enabled_flag have false values ("0"), the SAO control information generation unit 132 selects nonuse of the CU unit information during the SAO process.

The SAO control information generation unit 132 generates SAO control information sao_simple_flag and determines the value as a value reflecting such selection (determination). For example, the SAO control information generation unit 132 sets sao_simple_flag=1 when CU unit information is not used during the SAO process. In addition, for example, the SAO control information generation unit 132 sets sao_simple_flag=0 when the CU unit information is used during the SAO process.

The SAO control information generation unit 132 supplies sao_simple_flag generated in this manner to the loop filter 116.

<Loop Filter>

Figure 13:
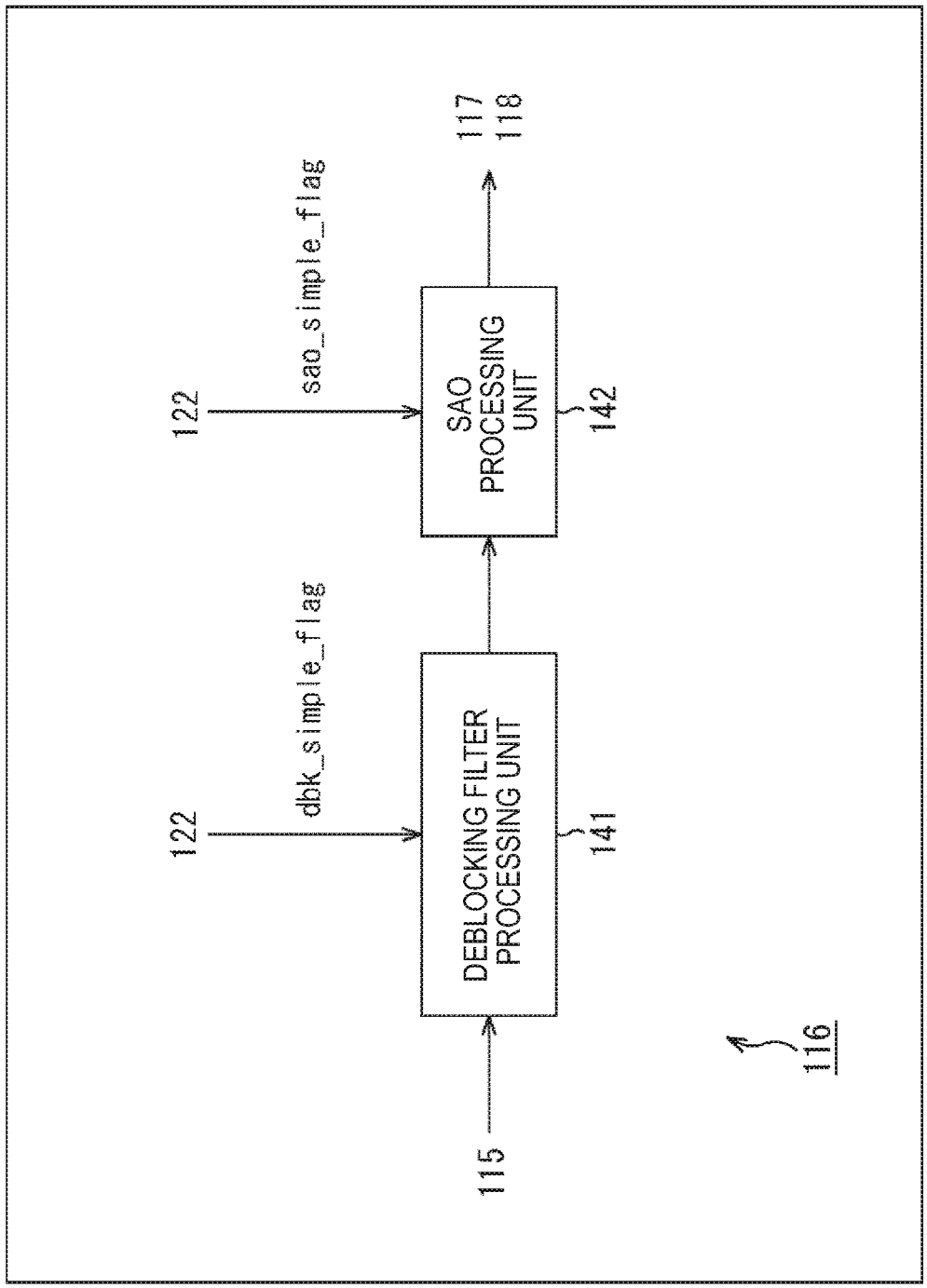
FIG. 13 is a block diagram illustrating an example of a main configuration of a loop filter.

FIG. 13 is a block diagram illustrating an example of a main configuration of the loop filter 116. As illustrated in FIG. 13, the loop filter 116 includes a deblocking filter processing unit 141 and an SAO processing unit 142.

The deblocking filter processing unit 141 performs the deblocking filter process of the reconstructed image supplied from the computation unit 115. In this case, the deblocking filter processing unit 141 acquires the deblocking filter control information dbk_simple_flag supplied from the filter control unit 122, and performs the deblocking filter process based on the value thereof. That is, the deblocking filter processing unit 141 performs the deblocking filter process according to information set for each data unit corresponding to the header information.

For example, when dbk_simple_flag==0 is satisfied, the deblocking filter processing unit 141 performs the deblocking filter process using the CU unit information. That is, when conditions for values of the header information indicate that it is necessary to refer to information set for each CU unit, the deblocking filter processing unit 141 refers to information set for each CU unit referred to when the filter process is performed and performs the deblocking filter process. For example, the deblocking filter processing unit 141 refers to cu_transquant_bypass_flag and pcm_flag of the CU and performs the deblocking filter process using the values thereof.

FIG. 14 and FIG. 15 show an example of a syntax of the CU. In the example of FIG. 14, cu_transquant_bypass_flag is included in the third row from the top and pcm_flag is included in the 16th row from the top. The deblocking filter processing unit 141 performs the deblocking filter process using the values thereof.

In addition, for example, when dbk_simple_flag==1 is satisfied, the deblocking filter processing unit 141 performs the deblocking filter process without using the CU unit information. That is, when conditions for values of the header information indicate that it is unnecessary to refer to information set for each CU unit, the deblocking filter processing unit 141 skips a reference to information set for each CU unit referred to when the filter process is performed and performs the deblocking filter process. The deblocking filter processing unit 141 supplies the reconstructed image on which the deblocking filter process is performed to the SAO processing unit 142.

The SAO processing unit 142 performs the SAO process of the reconstructed image that is supplied from the deblocking filter processing unit 141 and on which the deblocking filter process is performed. In this case, the SAO processing unit 142 acquires the SAO control information sao_simple_flag supplied from the filter control unit 122, and performs the SAO process based on the value thereof. That is, the SAO processing unit 142 performs the SAO process according to information set for each data unit corresponding to the header information.

For example, when ao_simple_flag==0 is satisfied, the SAO processing unit 142 performs the SAO process using the CU unit information. That is, when conditions for values of the header information indicate that it is necessary to refer to information set for each CU unit, the SAO processing unit 142 refers to information set for each CU unit referred to when the filter process is performed and performs the SAO process. For example, the SAO processing unit 142 refers to cu_transquant_bypass_flag (the third row from the top of FIG. 14) and pcm_flag (the 16th row from the top of FIG. 14) of the CU and performs the SAO process using the values thereof.

In addition, for example, when sao_simple_flag==1 is satisfied, the SAO processing unit 142 performs the SAO process without using the CU unit information. That is, when conditions for values of the header information indicate that it is unnecessary to refer to information set for each CU unit, the SAO processing unit 142 skips a reference to information set for each CU unit referred to when the filter process is performed and performs the SAO process. The SAO processing unit 142 supplies the reconstructed image on which the SAO process is performed (that is, the decoded image) to the screen sorting buffer 117 and the frame memory 118.

As described above, when the loop filter process is performed on information set for each data unit corresponding to the header information, the image decoding device 100 can perform the loop filter process without referring to information in units of unnecessarily small data, and it is possible to suppress a load of the decoding process from increasing.

<Flow of a decoding process>

Next, an example of a flow of processes performed by the image decoding device 100 will be described. First, an example of a flow of the decoding process will be described with reference to a flowchart of FIG. 16.

When the decoding process starts, in Step S101, the accumulation buffer 111 accumulates transmitted bitstreams. In Step S102, the reversible decoding unit 112 decodes the bitstreams supplied from the accumulation buffer 111. That is, I picture, P picture, and B picture that are encoded on the encoding side are decoded. In this case, various pieces of information other than image information included in a bitstream such as the header information are also decoded.

In Step S103, the filter control unit 122 generates filter control information.

In Step S104, the inverse quantization unit 113 performs inverse quantization of the quantized coefficient obtained in the process of Step S102.

In Step S105, the inverse orthogonal transform unit 114 performs an inverse orthogonal transform of the orthogonal transform coefficient obtained in the process of Step S104. According to the process, residual data of a luminance component and prediction residual data of a color difference component are restored.

In Step S106, the intra prediction unit 119 or the inter prediction unit 120 performs a prediction process and generates a prediction image. That is, the prediction process is performed in the prediction mode that is determined by the reversible decoding unit 112 and applied during encoding. More specifically, for example, when intra prediction is applied during encoding, the intra prediction unit 119 generates a prediction image in the intra prediction mode that is selected as an optimal mode during encoding. On the other hand, for example, when inter prediction is applied during encoding, the inter prediction unit 120 generates a prediction image in the inter prediction mode that is selected as an optimal mode during encoding.

In Step S107, the computation unit 115 adds the prediction image generated in Step S106 to the residual data restored in the process of Step S105. Accordingly, the reconstructed image is obtained.

In Step S108, the loop filter 116 performs the loop filter process, including, for example, the deblocking filter process and the SAO process, of the reconstructed image obtained in the process of Step S107.

In Step S109, the screen sorting buffer 117 sorts frames of the decoded image obtained in the process of Step S108. That is, the order of frames that are sorted during encoding is sorted according to the order of the original display. The decoded image whose frames are sorted is output to the outside of the image decoding device 100.

In Step S110, the frame memory 118 stores the decoded image obtained in the process of Step S108.

When the process of Step S110 ends, the decoding process ends.

<Flow of a Process of Generating Filter Control Information>

Next, an example of a flow of the process of generating filter control information performed in Step S103 of such a decoding process will be described with reference to a flowchart of FIG. 17.

When the process of generating filter control information starts, the deblocking filter control information generation unit 131 of the filter control unit 122 performs a process of generating deblocking filter control information in Step S121.

In Step S122, the SAO control information generation unit 132 of the filter control unit 122 performs a process of generating SAO control information.

Figure 16:
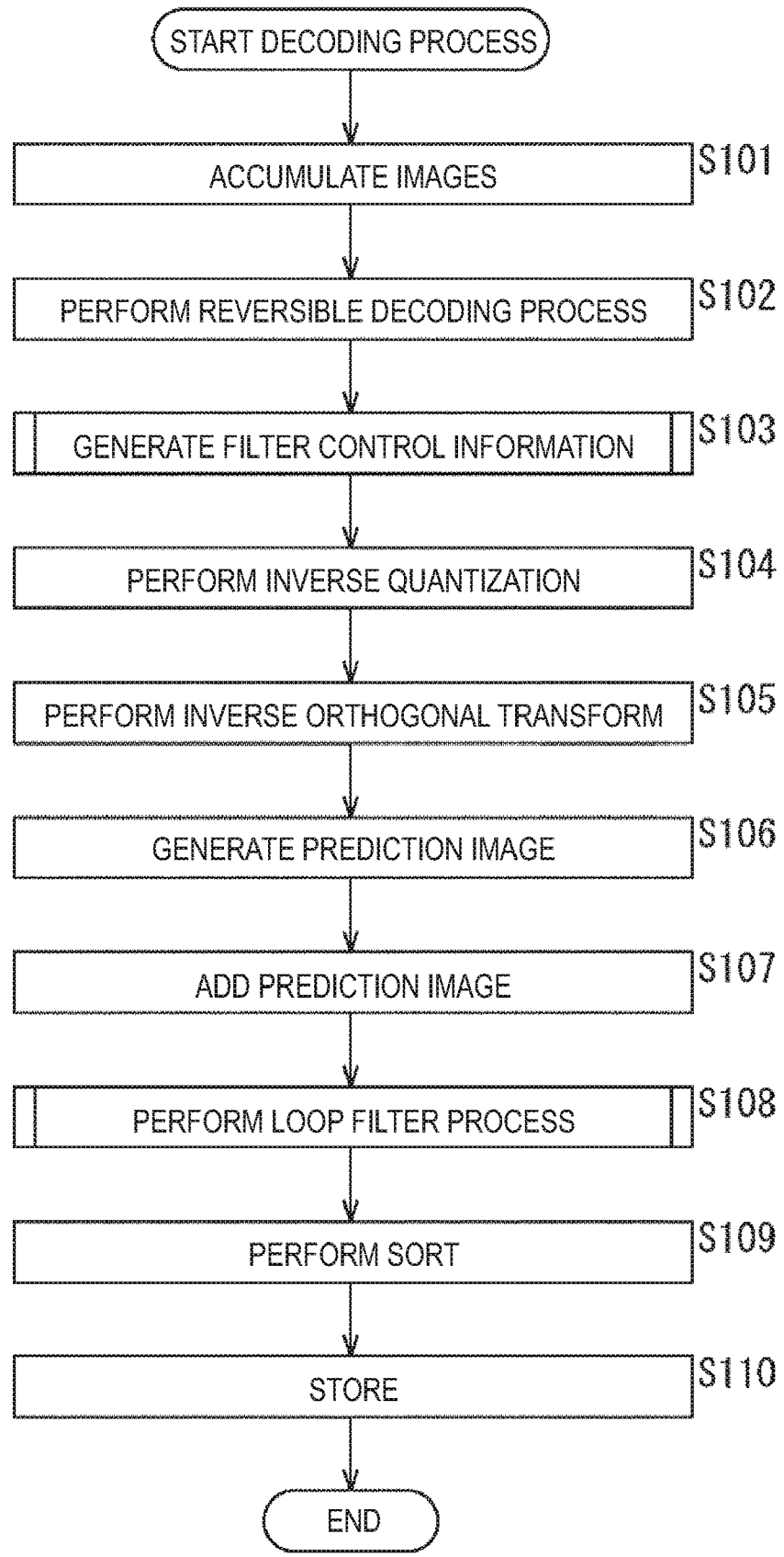
FIG. 16 is a flowchart describing an example of a flow of a decoding process.

When the process of Step S122 ends, the process of generating filter control information ends and the process returns to FIG. 16.

<Flow of a Process of Generating Deblocking Filter Control Information>

Next, an example of a flow of the process of generating deblocking filter control information performed in Step S121 of FIG. 17 will be described with reference to a flowchart of FIG. 18.

When the process of generating deblocking filter control information starts, the deblocking filter control information generation unit 131 sets is_first_slice=0 in Step S131.

In Step S132, the deblocking filter control information generation unit 131 determines whether pcm_loop_filter_disabled_flag==0 is satisfied. When it is determined that pcm_loop_filter_disabled_flag==0 is satisfied, the process advances to Step S133.

In Step S133, the deblocking filter control information generation unit 131 determines whether transquant_bypass_enabled_flag==0 is satisfied. When it is determined that transquant_bypass_enabled_flag==0 is satisfied, the process advances to Step S134.

In Step S134, the deblocking filter control information generation unit 131 determines whether cu_qp_delta_enabled_flag==0 is satisfied. When it is determined that cu_qp_delta_enabled_flag==0 is satisfied, the process advances to Step S135.

In Step S135, the deblocking filter control information generation unit 131 determines whether the number of slices (the number of slice segments) of a current picture serving as a processing target is "1." When the picture includes a plurality of slices, the deblocking filter control information generation unit 131 refers to information set for each CU unit referred to when the filter process is performed. Therefore, when it is determined that the number of slice segments is plural, the process advances to Step S136.

In Step S136, the deblocking filter control information generation unit 131 determines whether is_first_slice==0 is satisfied, that is, whether a current slice serving as a processing target is the first slice of the current picture. Then, when it is determined that the current slice is the first slice of the current picture (that is, is_first_slice==0), the process advances to Step S137.

In Step S137, the deblocking filter control information generation unit 131 sets is_first_slice=1 and first_slice_qp_delta=slice_qp_delta. When the process of Step S137 ends, the process returns to Step S136, and the process thereafter is repeated.

On the other hand, in Step S136, when is_first_slice==1 is satisfied, that is, when it is determined that the current slice is not the first slice of the current picture, the process advances to Step S138.

In Step S138, the deblocking filter control information generation unit 131 determines whether slice_qp_delta==first_slice_qp_delta is satisfied, that is, determines whether the quantization parameter of the current slice matches the quantization parameter of the first slice of the current picture. When slice_qp_delta==first_slice_qp_delta is satisfied, that is, when it is determined that the quantization parameter of the current slice matches the quantization parameter of the first slice of the current picture, the process advances to Step S139. That is, when the picture includes a plurality of slices, the deblocking filter control information generation unit 131 skips a reference to information set for each CU unit referred to when the filter process is performed as long as slice headers in the picture have the same slice_qp_delta.

In Step S139, the deblocking filter control information generation unit 131 determines whether the current slice is the last slice (slice segment) belonging to the current picture. When it is determined that the current slice is not the last slice, the process returns to Step S136, and the process thereafter is repeated.

On the other hand, in Step S139, when it is determined that the current slice is the last slice (the slice segment) belonging to the current picture, the process advances to Step S140.

On the other hand, in Step S135, when it is determined that the number of slices (the number of slice segments) of the current picture is "1," the processes of Step S136 to Step S139 are omitted, and the process advances to Step S140. That is, when the picture includes one slice, the deblocking filter control information generation unit 131 skips a reference to information set for each CU unit referred to when the filter process is performed.

In Step S140, the deblocking filter control information generation unit 131 generates deblocking filter control information dbk_simple_flag and sets a value thereof to "1."

Figure 17:
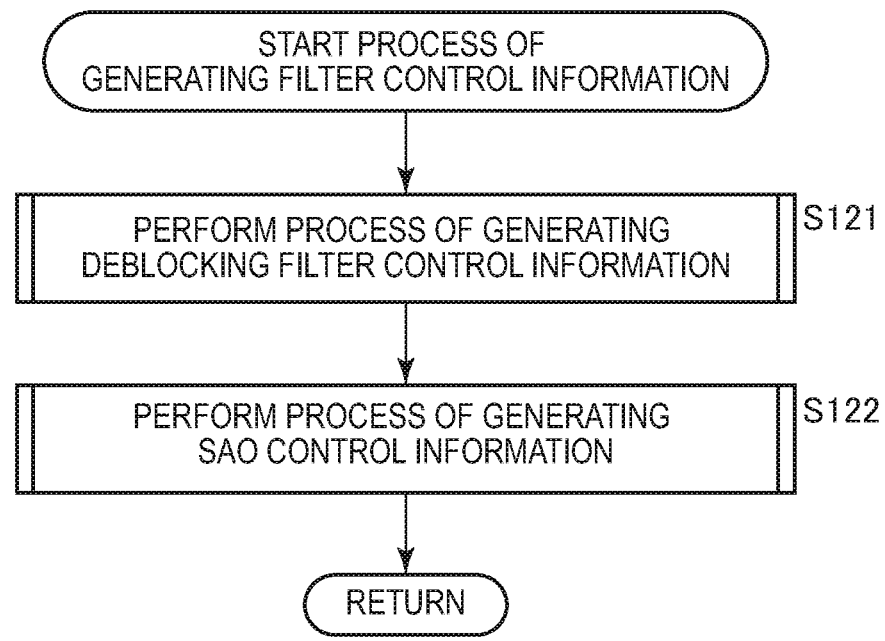
FIG. 17 is a flowchart describing an example of a flow of a process of generating filter control information.
Figure 18:
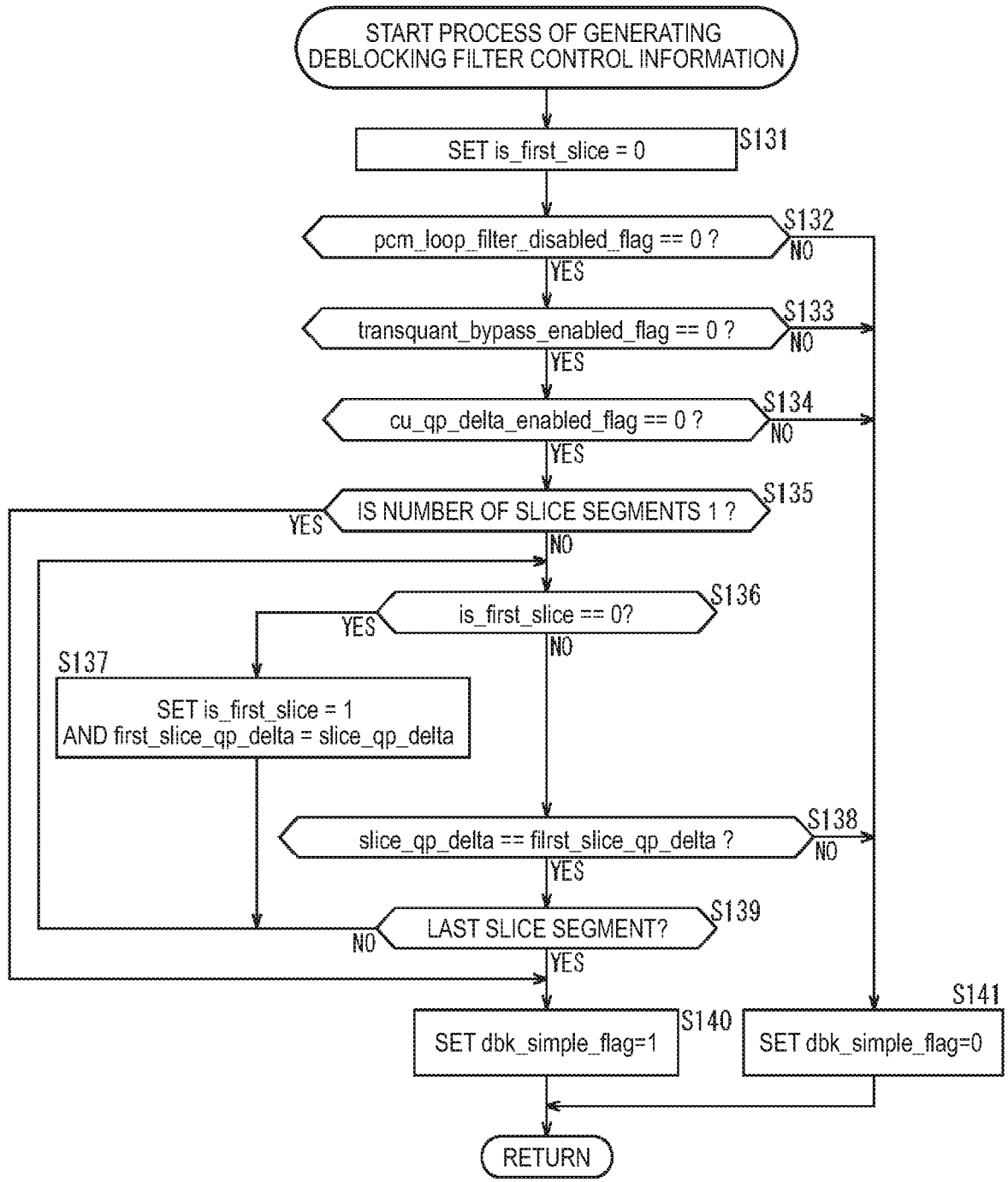
FIG. 18 is a flowchart describing an example of a flow of a process of generating deblocking filter control information.

When the process of Step S140 ends, the process returns to FIG. 17.

In addition, in Step S132, when it is determined that pcm_loop_filter_disabled_flag==1 is satisfied, the process advances to Step S141.

Further, in Step S133, when it is determined that transquant_bypass_enabled_flag==1 is satisfied, the process advances to Step S141.

In addition, in Step S134, when it is determined that cu_qp_delta_enabled_flag==1 is satisfied, the process advances to Step S141.

On the other hand, in Step S138, when slice_qp_delta==first_slice_qp_delta is not satisfied, that is, when it is determined that the quantization parameter of the current slice does not match the quantization parameter of the first slice of the current picture, the process advances to Step S141.

In Step S141, the deblocking filter control information generation unit 131 generates deblocking filter control information dbk_simple_flag and sets a value thereof to "0."

When the process of Step S141 ends, the process returns to FIG. 17.

<Flow of a Process of Generating SAO Control Information>

Figure 19:
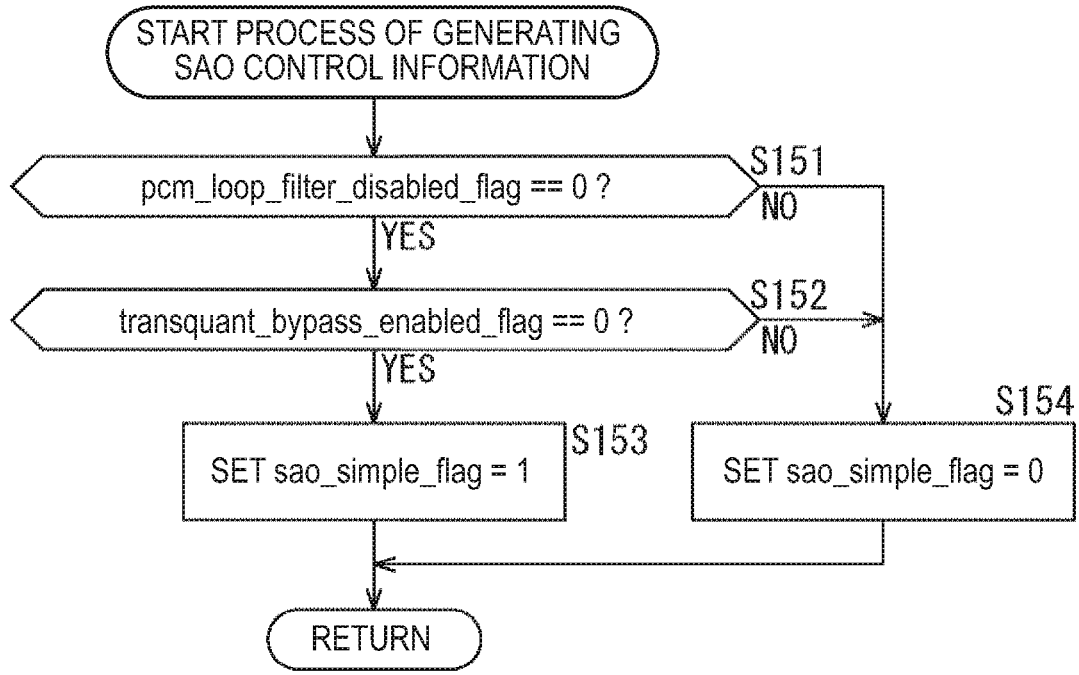
FIG. 19 is a flowchart describing an example of a flow of a process of generating SAO control information.

Next, an example of a flow of the process of generating SAO control information performed in Step S122 of FIG. 17 will be described with reference to a flowchart of FIG. 19.

When the process of generating SAO control information starts, the SAO control information generation unit 132 determines whether pcm_loop_filter_disabled_flag==0 is satisfied in Step S151. When it is determined that pcm_loop_filter_disabled_flag==0 is satisfied, the process advances to Step S152.

In Step S152, the SAO control information generation unit 132 determines whether transquant_bypass_enabled_flag==0 is satisfied. When it is determined that transquant_bypass_enabled_flag==0 is satisfied, the process advances to Step S153.

In Step S153, the SAO control information generation unit 132 generates SAO control information sao_simple_flag and sets a value thereof to "1." When the process of Step S153 ends, the process of generating SAO control information ends and the process returns to FIG. 17.

Meanwhile, in Step S151, when it is determined that pcm_loop_filter_disabled_flag==1 is satisfied, the process advances to Step S154. In addition, in Step S152, when it is determined that transquant_bypass_enabled_flag==1 is satisfied, the process advances to Step S154.

In Step S154, the SAO control information generation unit 132 generates SAO control information sao_simple_flag and sets a value thereof to "0." When the process of Step S154 ends, the process of generating SAO control information ends and the process returns to FIG. 17.

<Flow of a Loop Filter Process>

Figure 20:
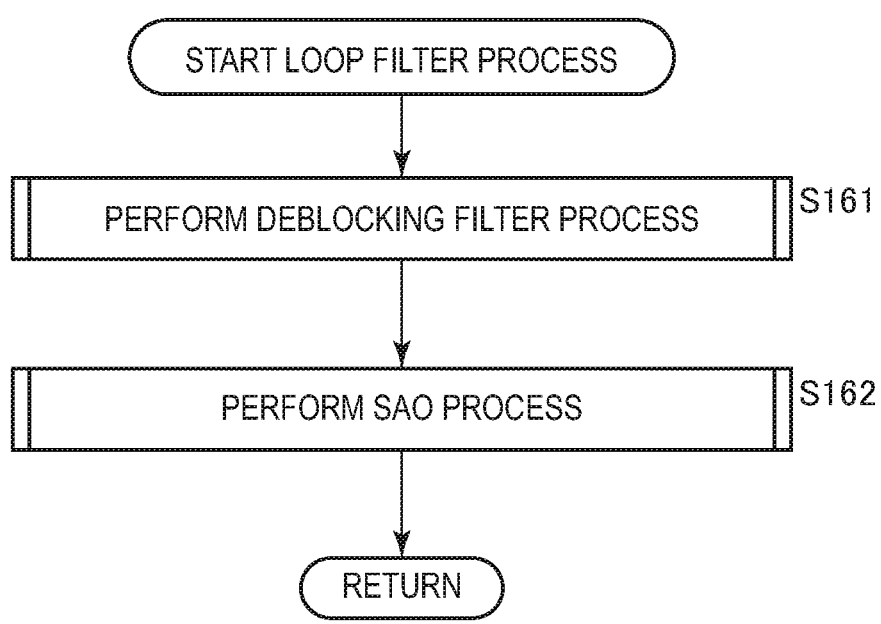
FIG. 20 is a flowchart describing an example of a flow of a loop filter process.

Next, an example of a flow of the loop filter process performed in Step S108 of FIG. 16 will be described with reference to a flowchart of FIG. 20.

When the loop filter process starts, the deblocking filter processing unit 141 of the loop filter 116 performs the deblocking filter process in Step S161.

In Step S162, the SAO processing unit 142 of the loop filter 116 performs the SAO process.

When the process of Step S162 ends, the loop filter process ends and the process returns to FIG. 16.

<Flow of a Deblocking Filter Process>

Next, an example of a flow of the deblocking filter process performed in Step S161 of FIG. 20 will be described with reference to a flowchart of FIG. 21.

When the deblocking filter process starts, the deblocking filter processing unit 141 determines whether the deblocking filter control information dbk_simple_flag supplied from the filter control unit 122 has a value of "1" in Step S171. When it is determined that dbk_simple_flag==1 is satisfied, the process advances to Step S172.

In Step S172, the deblocking filter processing unit 141 performs a CTB unit deblocking filter process in which CU unit information is not used. When the process of Step S172 ends, the deblocking filter process ends and the process returns to FIG. 20.

In addition, in Step S171, when it is determined that dbk_simple_flag==0 is satisfied, the process advances to Step S173.

In Step S173, the deblocking filter processing unit 141 performs a CU unit deblocking filter process in which the CU unit information is used. When the process of Step S173 ends, the deblocking filter process ends and the process returns to FIG. 20.

<Flow of a CU Unit Deblocking Filter Process>

Next, an example of a flow of the CU unit deblocking filter process performed in Step S173 of FIG. 21 will be described with reference to a flowchart of FIG. 22.

When the CU unit deblocking filter process starts, the deblocking filter processing unit 141 calculates a boundary strength of an edge in the picture in Step S181.

In Step S182, the deblocking filter processing unit 141 sets i=0. In Step S183, the deblocking filter processing unit 141 acquires i-th edge information.

In Step S184, the deblocking filter processing unit 141 determines whether a deblocking filter is applied to a current edge serving as a processing target. When it is determined that the deblocking filter is applied, the process advances to Step S185.

In Step S185, the deblocking filter processing unit 141 acquires information of a CU to which a pixel adjacent to the current edge belongs.

In Step S186, the deblocking filter processing unit 141 calculates $qP_L$ from the quantization parameter $Qp_Y$ of the CU, and derives β and tc, which are parameters for the deblocking filter.

In Step S187, the deblocking filter processing unit 141 applies the deblocking filter to the current edge.

In Step S188, in the CU to which a pixel adjacent to the current edge belongs, when (pcm_flag==1 and pcm_loop_filter_disabled_flag=1) or (cu_transquant_bypass_flag=1) is satisfied, the deblocking filter processing unit 141 returns a value of the pixel whose value is changed when the deblocking filter is applied to a value from before the deblocking filter was applied.

When the process of Step S188 ends, the process advances to Step S189. On the other hand, in Step S184, when it is determined that the deblocking filter is not applied, the process advances to Step S189.

In Step S189, the deblocking filter processing unit 141 determines whether the current edge is the last edge of the current picture. When it is determined that the current edge is not the last edge of the current picture, the process advances to Step S190.

In Step S190, the deblocking filter processing unit 141 sets i=i+1. That is, the processing target is moved to the next edge. When the process of Step S190 ends, the process returns to Step S183, and the process thereafter is repeated.

Figure 21:
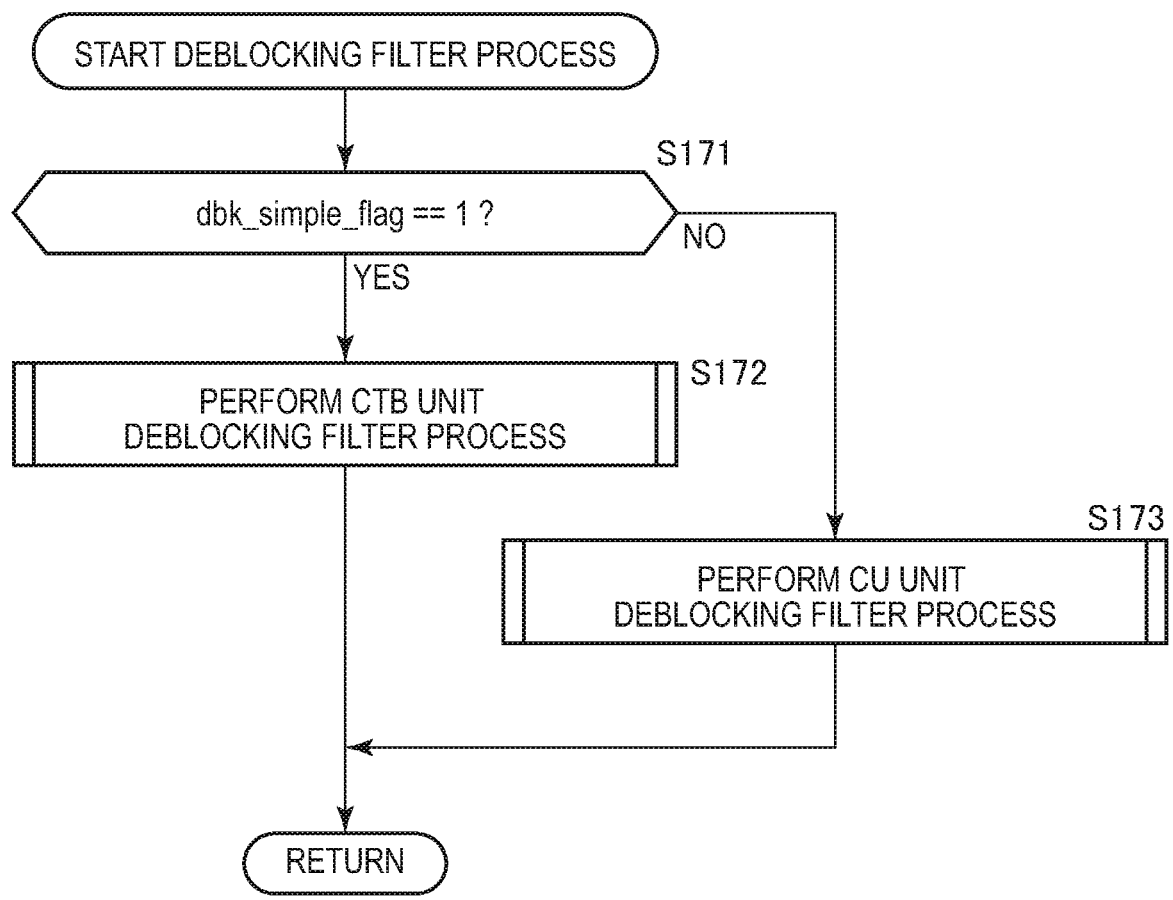
FIG. 21 is a flowchart describing an example of a flow of a deblocking filter process.
Figure 22:
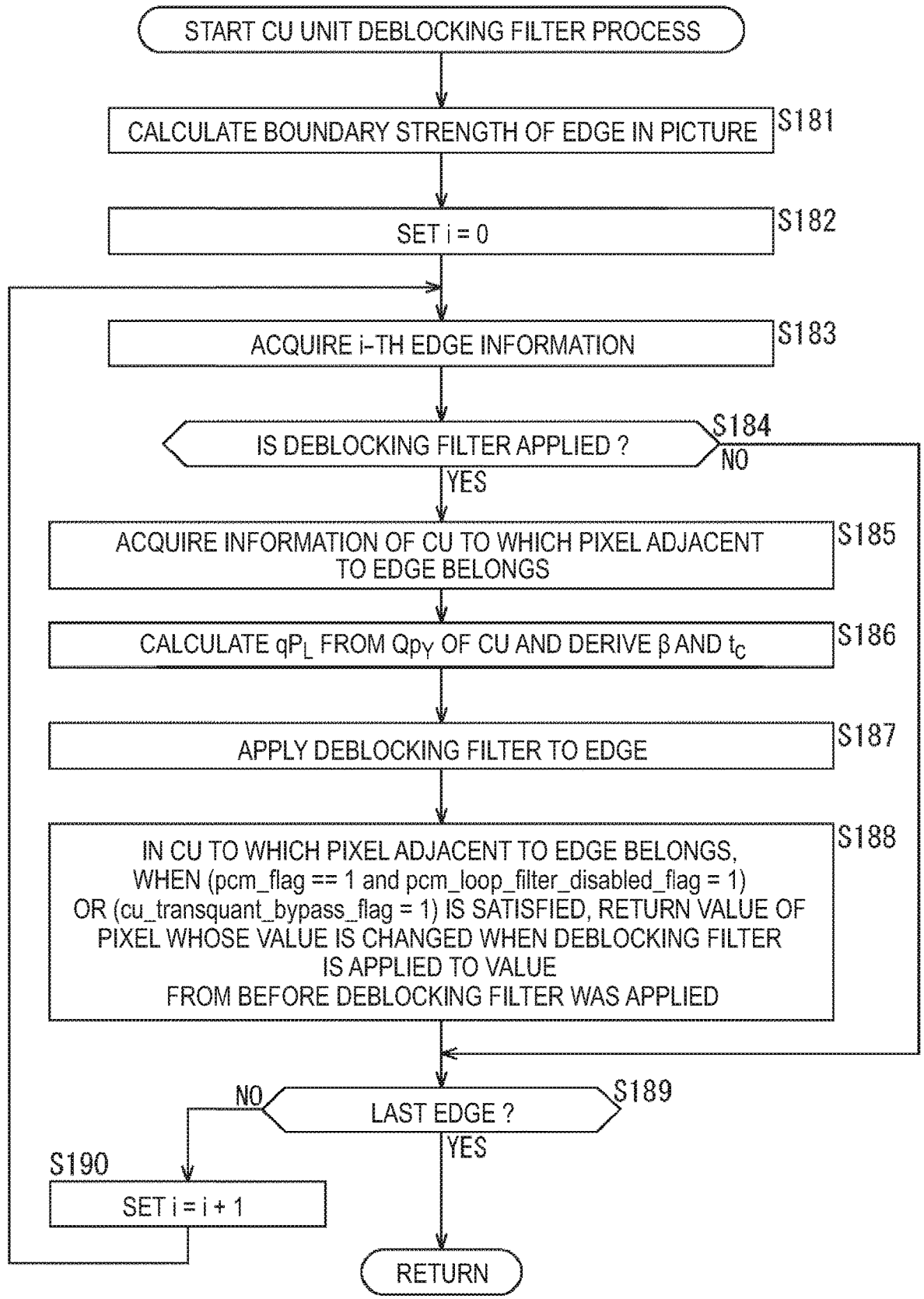
FIG. 22 is a flowchart describing an example of a flow of a CU unit deblocking filter process.

On the other hand, in Step S189, when it is determined that the current edge is the last edge of the current picture, the CU unit deblocking filter process ends and the process returns to FIG. 21.

As described above, the deblocking filter process in which the CU unit information is used should refer to each CU, and a load of the process is large. When the deblocking filter process is performed without confirming the header information, the CU unit deblocking filter process should be performed. Therefore, even if the CU unit information is unnecessary, the CU unit information should be referred to, and there is concern of a load of the deblocking filter process unnecessarily increasing.

<Flow of a CTB Unit Deblocking Filter Process>

Figure 23:
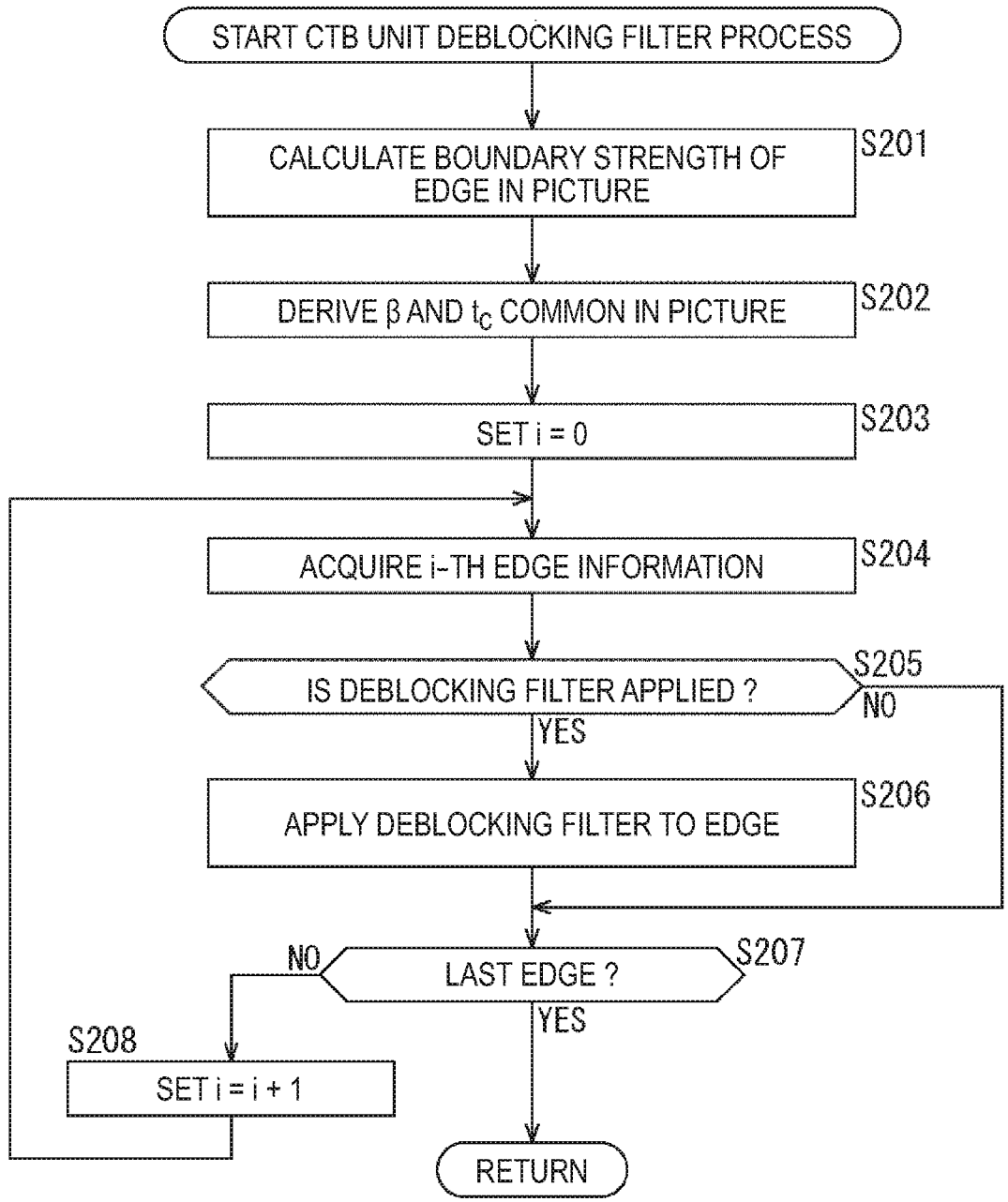
FIG. 23 is a flowchart describing an example of a flow of a CTB unit deblocking filter process.

Next, an example of a flow of the CTB unit deblocking filter process performed in Step S172 of FIG. 21 will be described with reference to a flowchart of FIG. 23.

When the CTB unit deblocking filter process starts, the deblocking filter processing unit 141 calculates a boundary strength of an edge in the picture in Step S201.

In Step S202, the deblocking filter processing unit 141 derives β and tc common in the picture.

In Step S203, the deblocking filter processing unit 141 sets i=0.

In Step S204, the deblocking filter processing unit 141 acquires i-th edge information.

In Step S205, the deblocking filter processing unit 141 determines whether a deblocking filter is applied. When it is determined that the deblocking filter is applied, the process advances to Step S206.

In Step S206, the deblocking filter processing unit 141 applies the deblocking filter to the current edge. When the process of Step S206 ends, the process advances to Step S207. On the other hand, in Step S205, when it is determined that the deblocking filter process is not applied, the process of Step S206 is omitted and the process advances to Step S207.

In Step S207, the deblocking filter processing unit 141 determines whether the current edge is the last edge of the current picture. When it is determined that the current edge is not the last edge of the current picture, the process advances to Step S208.

In Step S208, the deblocking filter processing unit 141 sets i=i+1. When the process of Step S208 ends, the process returns to Step S204, and the process thereafter is repeated.

On the other hand, in Step S207, when it is determined that current edge is the last edge of the current picture, the CU unit deblocking filter process ends and the process returns to FIG. 21.

As described above, since the deblocking filter process can be performed without referring to each CU in the deblocking filter process in which CTB unit information is used, it is possible to suppress a load of the process from increasing. That is, as described above, the deblocking filter processing unit 141 refers to the header information, confirms that the CU unit information is unnecessary, and appropriately uses the CU unit deblocking filter process and the CTB unit deblocking filter process according to necessity or lack of necessity. Thus, the deblocking filter processing unit 141 can suppress a load of the deblocking filter process from unnecessarily increasing.

<Flow of an SAO Process>

Next, an example of a flow of the SAO process performed in Step S162 of FIG. 20 will be described with reference to a flowchart of FIG. 24.

When the SAO process starts, the SAO processing unit 142 determines whether the SAO control information sao_simple_flag supplied from the filter control unit 122 has a value of "1" in Step S211. When it is determined that sao_simple_flag==1 is satisfied, the process advances to Step S212.

In Step S212, the SAO processing unit 142 performs a CTB unit SAO process in which CU unit information is not used. When the process of Step S212 ends, the deblocking filter process ends and the process returns to FIG. 20.

On the other hand, in Step S211, when it is determined that sao_simple_flag==0 is satisfied, the process advances to Step S213.

In Step S213, the deblocking filter processing unit 141 performs the CU unit SAO process in which the CU unit information is used. When the process of Step S213 ends, the SAO process ends, and the process returns to FIG. 20.

<Flow of a CU Unit SAO Process>

Next, an example of a flow of the CU unit SAO process performed in Step S213 of FIG. 24 will be described with reference to a flowchart of FIG. 25. When the CU unit SAO process starts, the SAO processing unit 142 sets i=0 in Step S221.

In Step S222, the SAO processing unit 142 acquires i-th CTB information.

In Step S223, the SAO processing unit 142 determines whether SaoTypeIdx==0 is satisfied. When it is determined that SaoTypeIdx==0 is not satisfied, the process advances to Step S224.

In Step S224, the SAO processing unit 142 calculates SaoOffsetVal and sets j=0.

In Step S225, the SAO processing unit 142 acquires j-th CU information.

In Step S226, the SAO processing unit 142 determines whether (pcm_flag==1 and pcm_loop_filter_disabled_flag=1) or (cu_transquant_bypass_flag==1) is satisfied. When it is determined that (pcm_flag==1 and pcm_loop_filter_disabled_flag=1) or (cu_transquant_bypass_flag==1) is not satisfied, the process advances to Step S227.

In Step S227, the SAO processing unit 142 adds an offset to the CU. When the process of Step S227 ends, the process advances to Step S228. In addition, in Step S226, when it is determined that (pcm_flag==1 and pcm_loop_filter_disabled_flag=1) or (cu_transquant_bypass_flag=1) is satisfied, the process advances to Step S228. In Step S228, the SAO processing unit 142 determines whether a current CU is the last CU of a current CTB serving as a processing target. When it is determined that the current CU is not the last CU, the process advances to Step S229.

In Step S229, the SAO processing unit 142 sets j=j+1. That is, the processing target is moved to the next CU. When the process of Step S229 ends, the process returns to Step S225, and the process thereafter is repeated. That is, a series of processes of Step S225 to Step S228 is performed on all CUs in the current CTB.

In addition, in Step S228, when it is determined as the last CU, the process advances to Step S230. In addition, in Step S223, when it is determined that SaoTypeIdx==0 is satisfied, the process advances to Step S230.

In Step S230, the SAO processing unit 142 determines whether it is the last CTB of the current picture. When it is not determined as the last CTB, the process advances to Step S231.

In Step S231, the SAO processing unit 142 sets i=i+1. That is, the processing target is moved to the next CTB. When the process of Step S231 ends, the process returns to Step S235, and the process thereafter is repeated.

Figure 24:
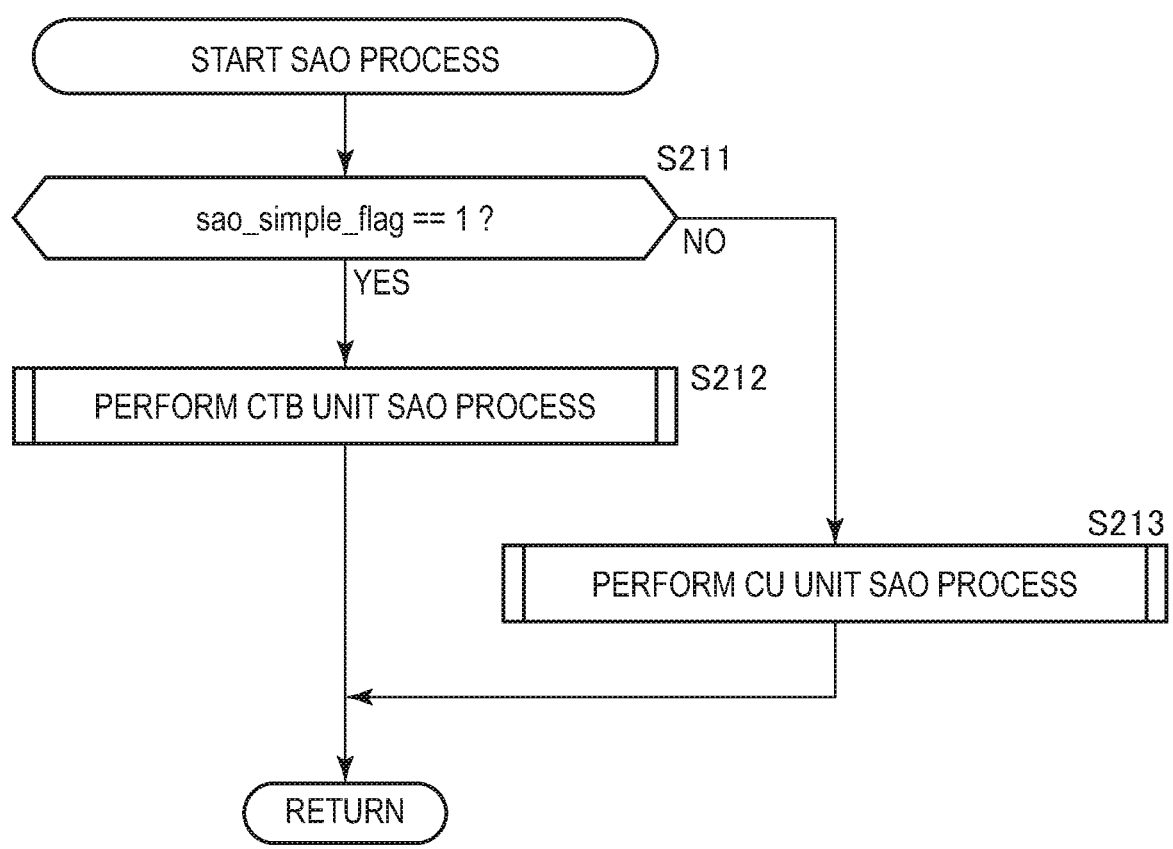
FIG. 24 is a flowchart describing an example of a flow of an SAO process.
Figure 25:
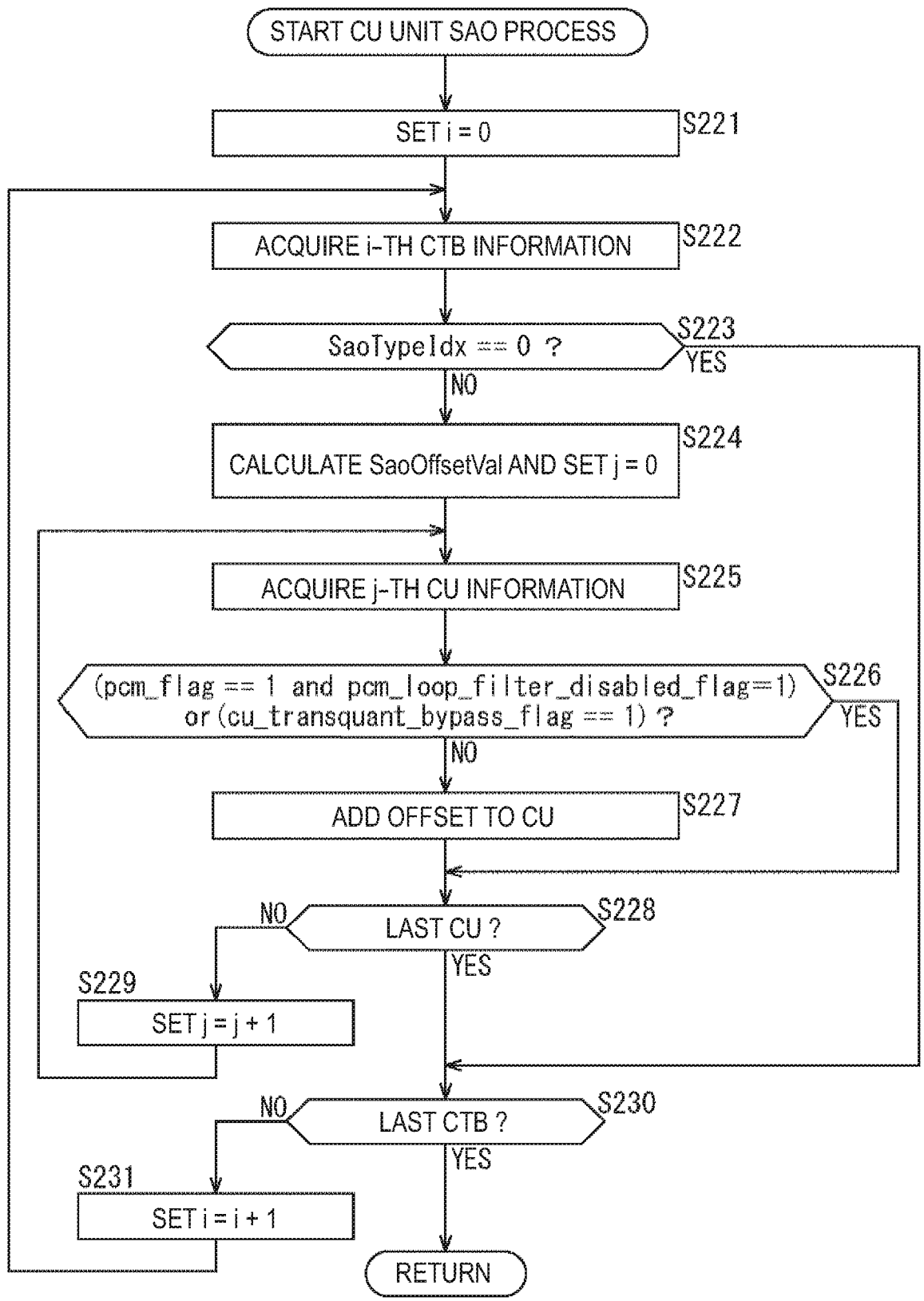
FIG. 25 is a flowchart describing an example of a flow of a CU unit SAO process.

On the other hand, in Step S230, when it is determined as the last CTB, the CU unit SAO process ends and the process returns to FIG. 24.

As described above, the SAO process in which the CU unit information is used should refer to each CU, and a load of the process is large. When the SAO process is performed without confirming the header information, the CU unit SAO process should be performed. Therefore, even if the CU unit information is unnecessary, the CU unit information should be referred to, and there is concern of a load of the SAO process unnecessarily increasing.

<Flow of a CTB Unit SAO Process>

Figure 26:
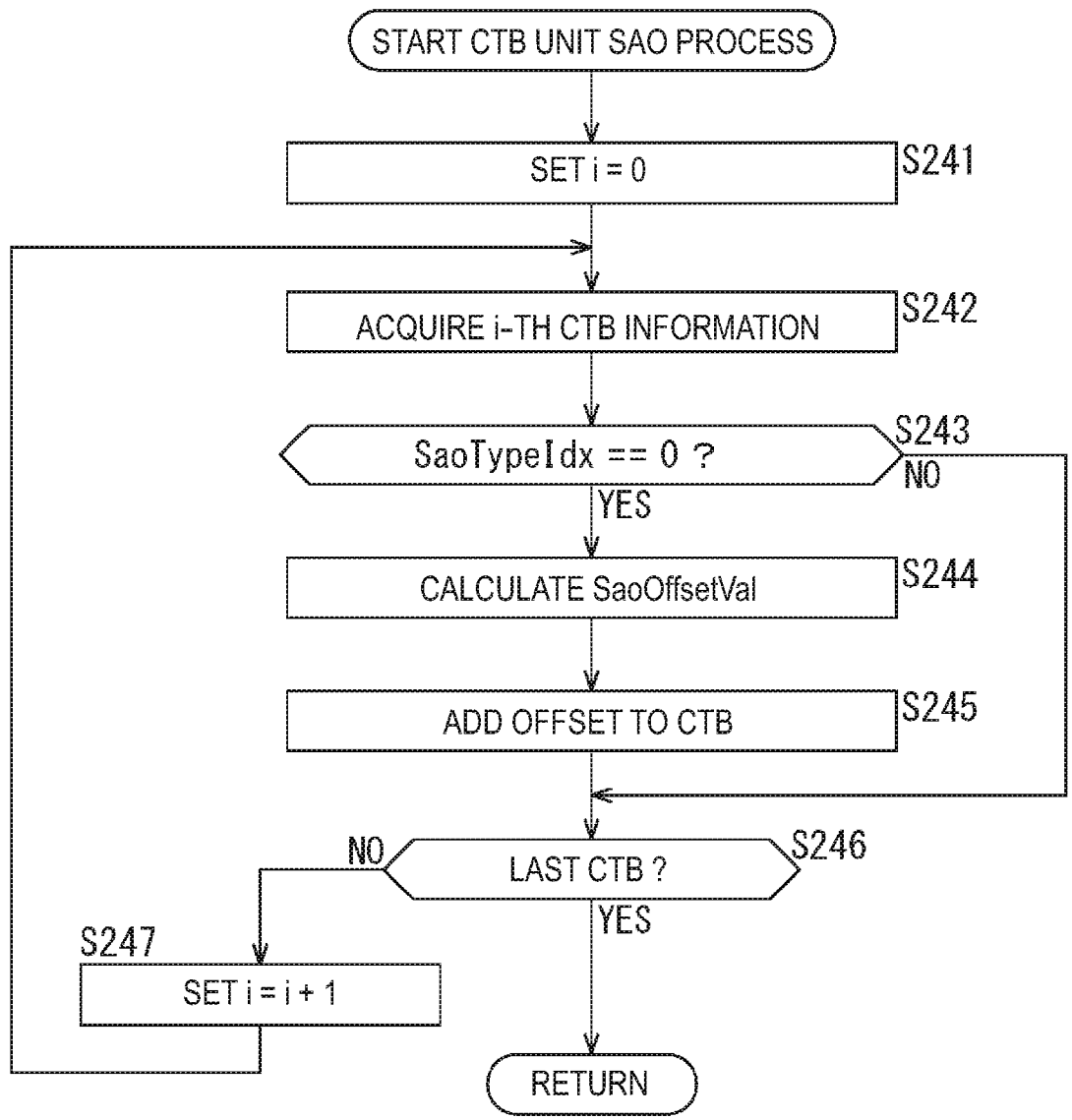
FIG. 26 is a flowchart describing an example of a flow of a CTB unit SAO process.

Next, an example of a flow of the CTB unit SAO process performed in Step S212 of FIG. 24 will be described with reference to a flowchart of FIG. 26. When the CTB unit SAO process starts, the SAO processing unit 142 sets i=0 in Step S241.

In Step S242, the SAO processing unit 142 acquires i-th CTB information.

In Step S243, the SAO processing unit 142 determines whether SaoTypeIdx==0 is satisfied. When it is determined that SaoTypeIdx==0 is not satisfied, the process advances to Step S244.

In Step S244, the SAO processing unit 142 calculates SaoOffsetVal.

In Step S245, the SAO processing unit 142 adds an offset to the CTB. When the process of Step S245 ends, the process advances to Step S246. On the other hand, in Step S243, when it is determined that SaoTypeIdx==0 is satisfied, the process advances to Step S246.

In Step S246, the SAO processing unit 142 determines whether it is the last CTB of the current picture. When it is not determined as the last CTB, the process advances to Step S247.

In Step S247, the SAO processing unit 142 sets i=i+1. That is, the processing target is moved to the next CTB. When the process of Step S247 ends, the process returns to Step S242, and the process thereafter is repeated.

On the other hand, in Step S246, when it is determined as the last CTB, the CTB unit SAO process ends and the process returns to FIG. 24.

As described above, since the SAO process can be performed without referring to each CU in the SAO process in which CTB unit information is used, it is possible to suppress a load of the process from increasing. That is, as described above, the SAO processing unit 142 refers to the header information, confirms that the CU unit information is unnecessary and appropriately uses the CU unit SAO process and the CTB unit SAO process according to necessity or lack of necessity. Thus, the SAO processing unit 142 can suppress a load of the SAO process from unnecessarily increasing.

That is, by calculating in advance whether it is possible to perform the deblocking filter process in units of CTBs in an encoded bitstream, it is possible to decrease a load of the deblocking filter process when it is possible to perform the process in units of CTBs.

Similarly, by calculating in advance a flag indicating whether it is possible to perform the SAO process in units of CTBs in an encoded bitstream, it is possible to decrease a load of the SAO process when it is possible to perform the process in units of CTBs.

Therefore, when the processes are performed as described above, since the image decoding device 100 may not refer to information of an unnecessarily small unit during the filter process, it is possible to suppress a load of the process from increasing.

The scope of applications of the present technology can be applied to all image decoding devices that can decode encoding data obtained by encoding image data and perform the filter process during decoding.

In addition, the present technology can be applied to an image decoding device that is used when image information (a bitstream) that is compressed by an orthogonal transform such as a discrete cosine transform and motion compensation, for example, MPEG and H.26x, is received through network media such as satellite broadcasting, cable television, the Internet, or a mobile phone. In addition, the present technology can be applied to an image decoding device that is used when processing is performed on storage media such as optical and magnetic disks and a flash memory.

2. Second Embodiment

<Application to Multi-View Image Decoding>

Figure 27:
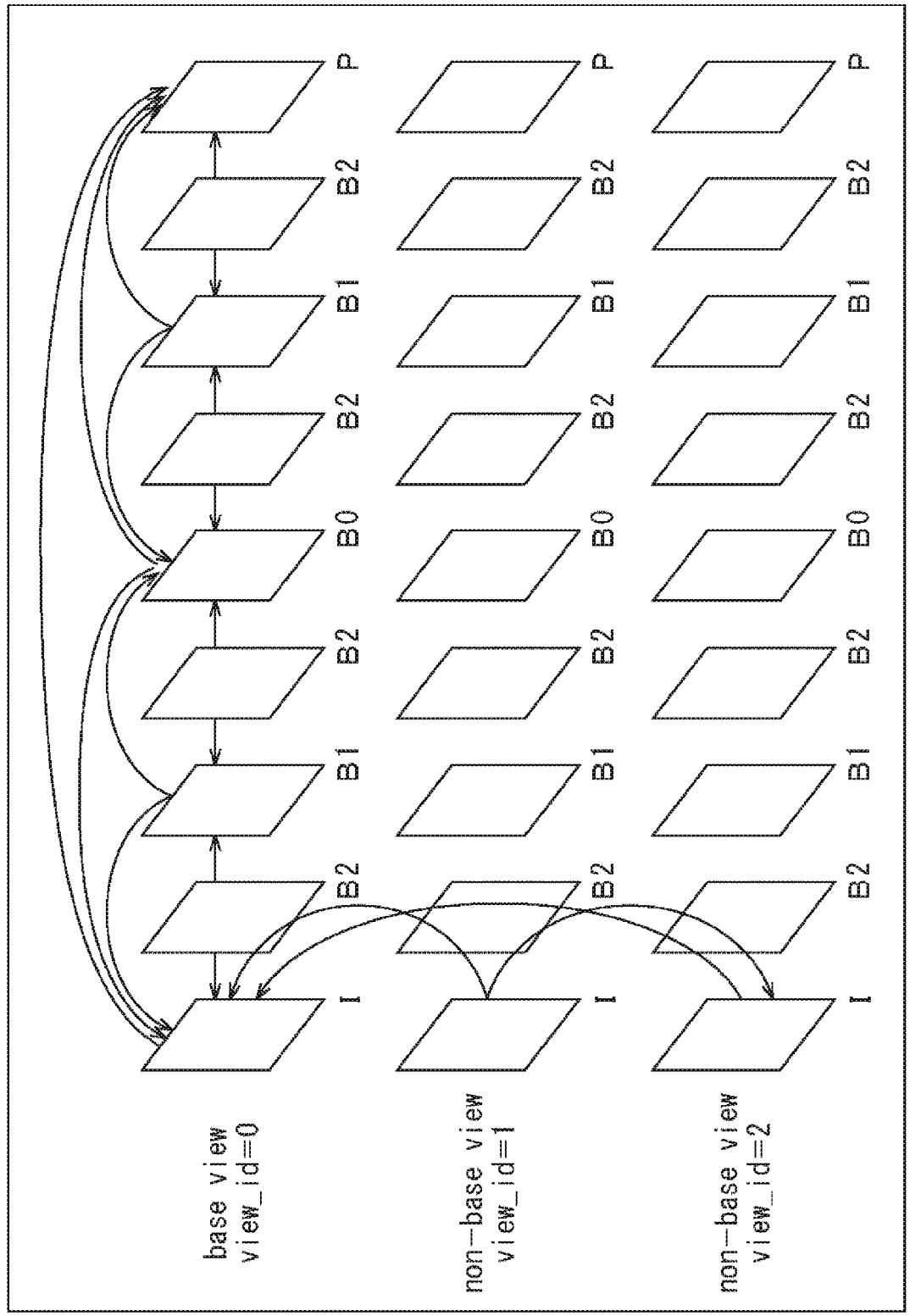
FIG. 27 is a diagram illustrating an example of a multi-view image encoding scheme.

The above-described series of processes can be applied to multi-view image decoding. FIG. 27 illustrates an example of a multi-view image encoding scheme.

As illustrated in FIG. 27, a multi-view image includes an image of a plurality of views. The plurality of views of the multi-view image include a base view in which only an image of its own view is used to perform encoding and decoding without using information of other views, and a non-base view in which information of other views is used to perform encoding and decoding. Encoding and decoding of the non-base view may use information of the base view and may use information of other non-base views.

When the multi-view image is encoded as illustrated in the example of FIG. 27, the multi-view image is encoded for each view. Then, when the encoding data obtained in this manner is decoded, the encoding data of each view is decoded (separately for each view). The above-described method in the first embodiment may be applied to decoding of such views. Thus, in the image of views, it is possible to suppress a load of the decoding process from increasing. That is, similarly, in the case of the multi-view image, it is possible to suppress a load of the decoding process from increasing.

<Multi-View Image Encoding Device>

Figure 28:
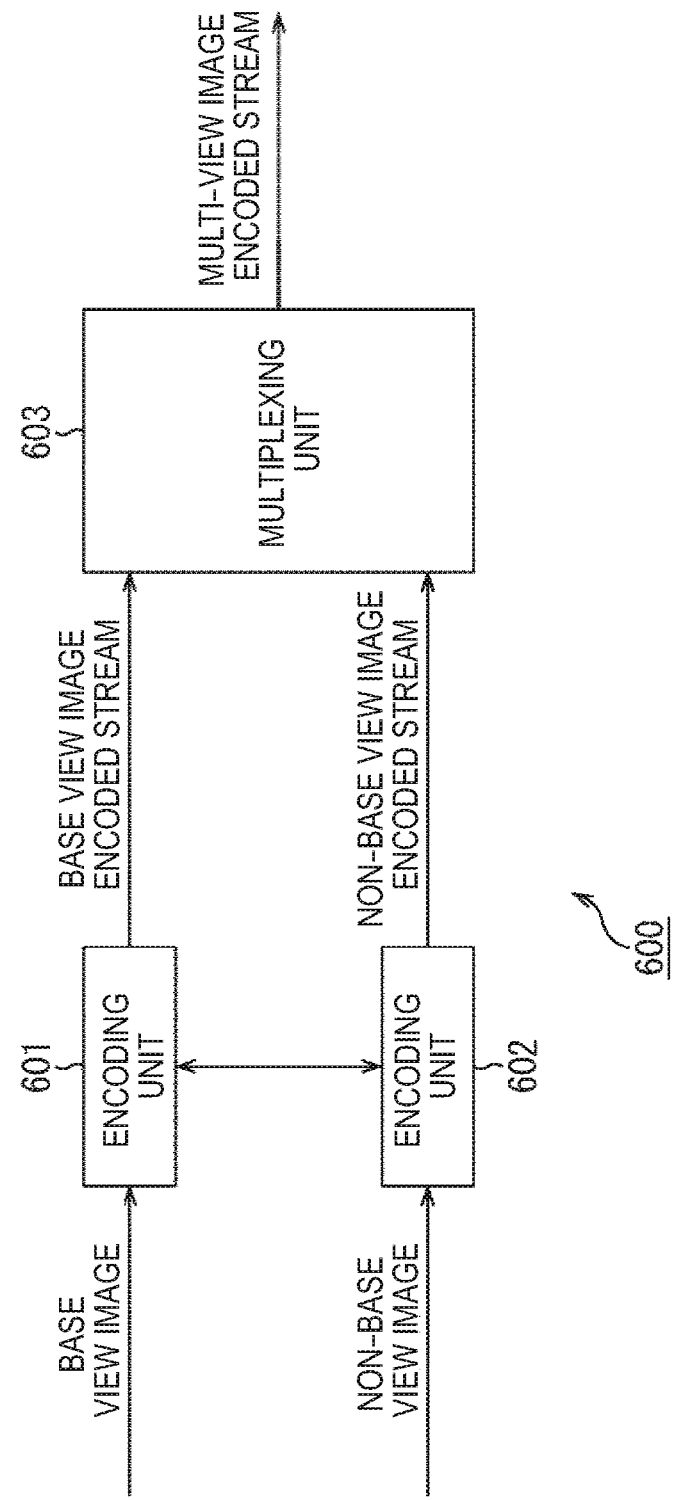
FIG. 28 is a diagram illustrating an example of a main configuration of a multi-view image encoding device to which the present technology is applied.

FIG. 28 is a diagram illustrating a multi-view image encoding device which performs the above-described multi-view image encoding. As illustrated in FIG. 28, the multi-view image encoding device 600 has an encoding unit 601, another encoding unit 602, and a multiplexing unit 603.

The encoding unit 601 encodes a base view image to generate a base view image encoded stream. The encoding unit 602 encodes a non-base view image to generate a non-base view image encoded stream. The multiplexing unit 603 multiplexes the base view image encoded stream generated by the encoding unit 601 and the non-base view image encoded stream generated by the encoding unit 602 to generate a multi-view image encoded stream.

<Multi-View Image Decoding Device>

Figure 29:
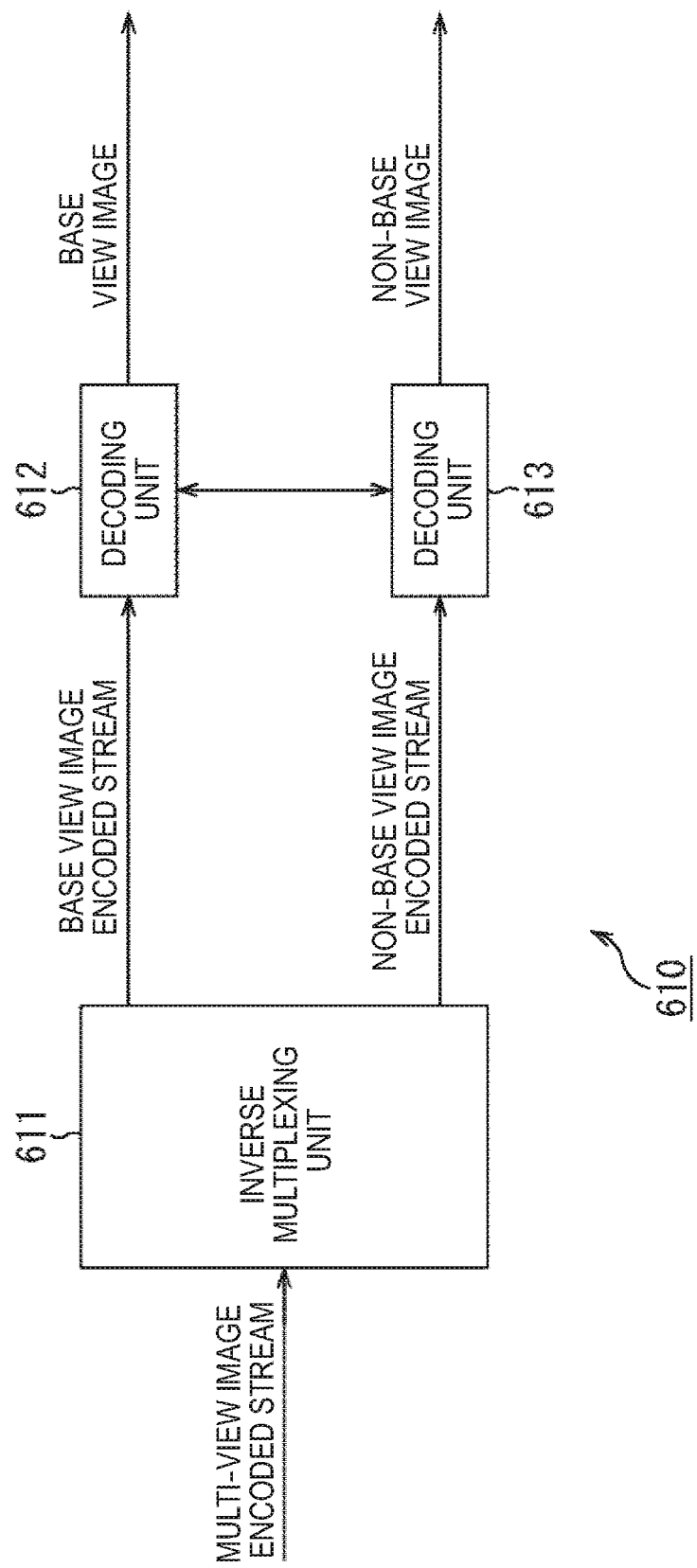
FIG. 29 is a diagram illustrating an example of a main configuration of a multi-view image decoding device to which the present technology is applied.

FIG. 29 is a diagram illustrating a multi-view image decoding device which performs the above-described multi-view image decoding. As illustrated in FIG. 29, the multi-view image decoding device 610 has an inverse multiplexing unit 611, a decoding unit 612, and another decoding unit 613.

The inverse multiplexing unit 611 inversely multiplexes the multi-view image encoded stream obtained by multiplexing the base view image encoded stream and the non-base view image encoded stream to extract the base view image encoded stream and the non-base view image encoded stream. The decoding unit 612 decodes the base view image encoded stream extracted by the inverse multiplexing unit 611 to obtain the base view image. The decoding unit 613 decodes the non-base view image encoded stream extracted by the inverse multiplexing unit 611 to obtain the non-base view image.

For example, as the decoding unit 612 and the decoding unit 613 of the multi-view image decoding device 610, the above-described image decoding device 100 may be applied. Thus, even when the encoding data of the multi-view image is decoded, the method described in the first embodiment can be applied. That is, the multi-view image decoding device 610 can suppress a load of the decoding process of the encoding data of the multi-view image from increasing.

3. Third Embodiment

<Application to Hierarchical Image Decoding>

Figure 30:
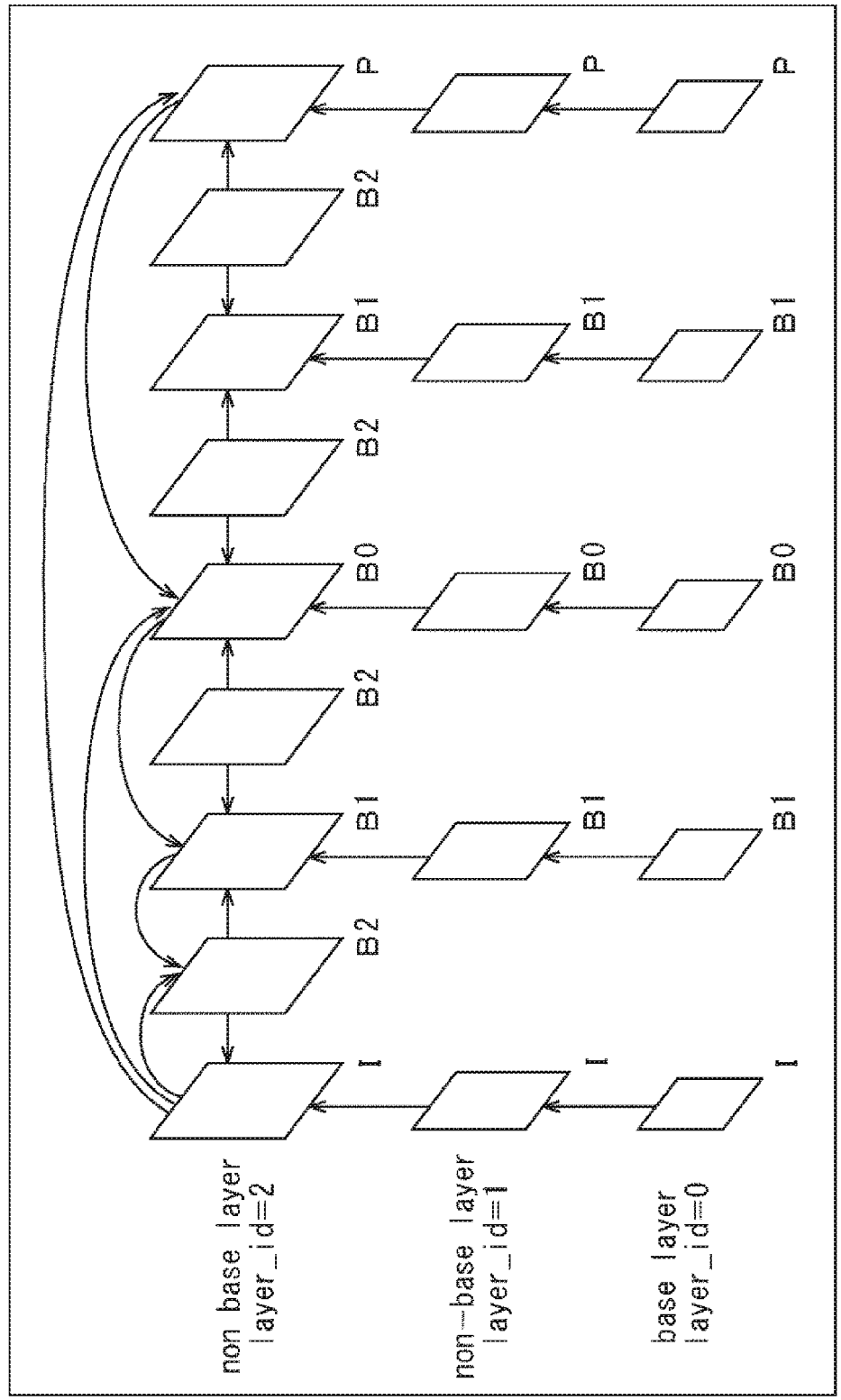
FIG. 30 is a diagram illustrating an example of a hierarchical image encoding scheme.

In addition, the above-described series of processes can be applied to hierarchical image decoding (scalable decoding). FIG. 30 illustrates an example of a hierarchical image encoding scheme.

Hierarchical image encoding (scalable encoding) involves dividing an image into a plurality of layers (hierarchized) and performing encoding for each layer so that image data can have scalability with respect to a predetermined parameter. Hierarchical image decoding (scalable decoding) is decoding that corresponds to the hierarchical image encoding.

As illustrated in FIG. 30, in hierarchizing of an image, one image is divided into a plurality of images (layers) with respect to a predetermined parameter that brings scalability. That is to say, the hierarchized image (hierarchical image) includes images with a plurality of hierarchies (layers) which have different values of the predetermined parameter. The plurality of layers of the hierarchical image are constituted by a base layer for which encoding/decoding is performed using only the image of its own layer without using images of other layers and non-base layers (each of which is also referred to as an enhancement layer) for which encoding/decoding is performed using images of other layers. A non-base layer may use the image of the base layer, or use the image of another non-base layer.

In general, a non-base layer includes data of the differential image (differential data) of its own image and the image of another layer so that redundancy is reduced. When one image has been divided into two hierarchies of a base layer and a non-base layer (also referred to as an enhancement layer), for example, an image with a lower quality than the original image is obtained only with data of the base layer, and by combining data of the base layer and data of the non-base layer, the original image (i.e., a high-quality image) is obtained.

By hierarchizing an image as described above, images with various levels of quality according to situations can be easily obtained. For example, image compression information according to a capability of a terminal or a network can be transmitted from a server without performing a transcoding process as when image compression information of only a base layer is transmitted to a terminal with a low processing capability such as a mobile telephone to reproduce a dynamic image having low spatial and temporal resolution or poor image quality or when image compression information of an enhancement layer in addition to a base layer is transmitted to a terminal with a high processing capability such as a television or a personal computer to reproduce a dynamic image having high spatial and temporal resolution or high image quality.

When the hierarchical image illustrated in the example of FIG. 30 is encoded, the hierarchical image is encoded for each layer. Then, when the encoding data obtained in this manner is decoded, the encoding data of each layer is decoded (separately for each layer). The above-described method in the first embodiment may be applied when such layers are decoded. Thus, it is possible to suppress a load of the decoding process in the image of layers. That is, similarly, in the case of the hierarchical image, it is possible to suppress a load of the decoding process from increasing.

<Hierarchical Image Encoding Device>

Figure 31:
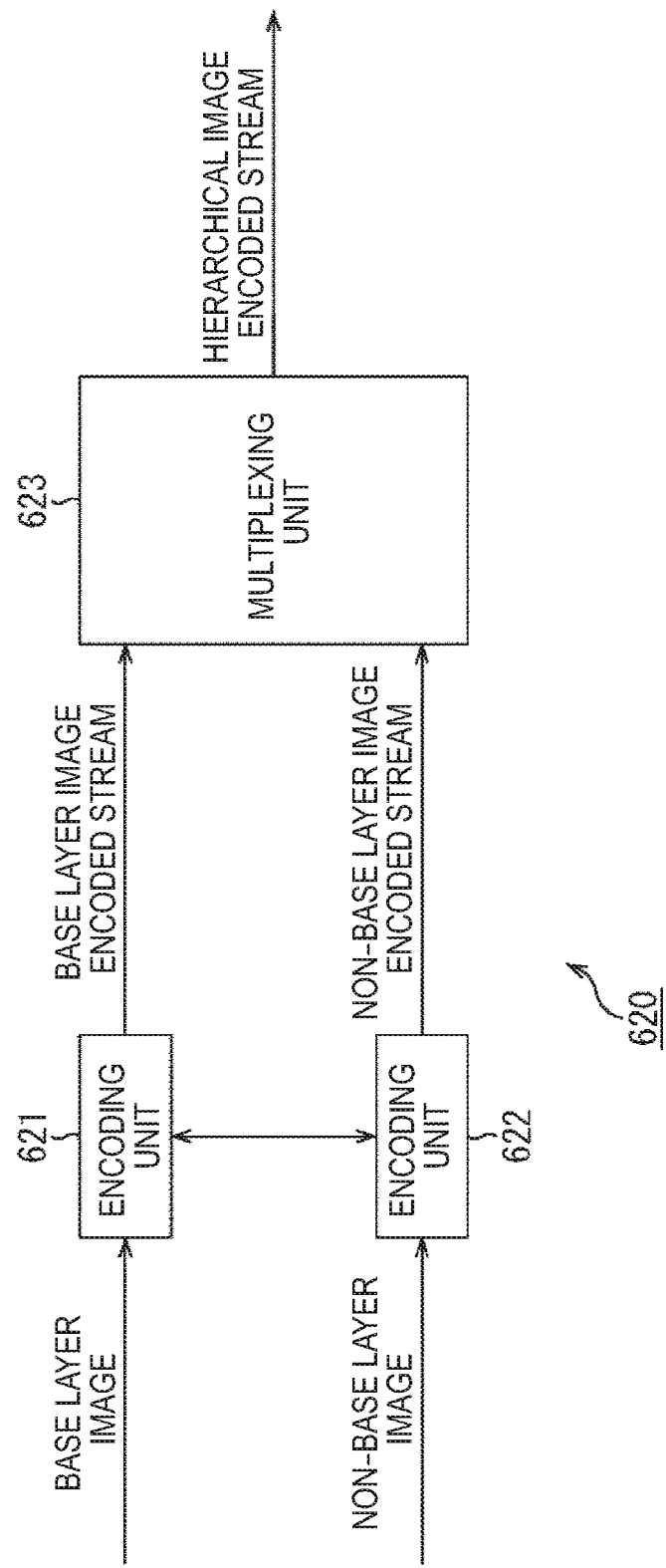
FIG. 31 is a diagram illustrating an example of a main configuration of a hierarchical image encoding device to which the present technology is applied.

FIG. 31 is a diagram illustrating a hierarchical image encoding device which performs the above-described hierarchical image encoding. The hierarchical image encoding device 620 has an encoding unit 621, another encoding unit 622, and a multiplexing unit 623 as illustrated in FIG. 31.

The encoding unit 621 encodes a base layer image to generate a base layer image encoded stream. The encoding unit 622 encodes a non-base layer image to generate a non-base layer image encoded stream. The multiplexing unit 623 multiplexes the base layer image encoded stream generated by the encoding unit 621 and the non-base layer image encoded stream generated by the encoding unit 622 to generate a hierarchical image encoded stream.

<Hierarchical Image Decoding Device>

Figure 32:
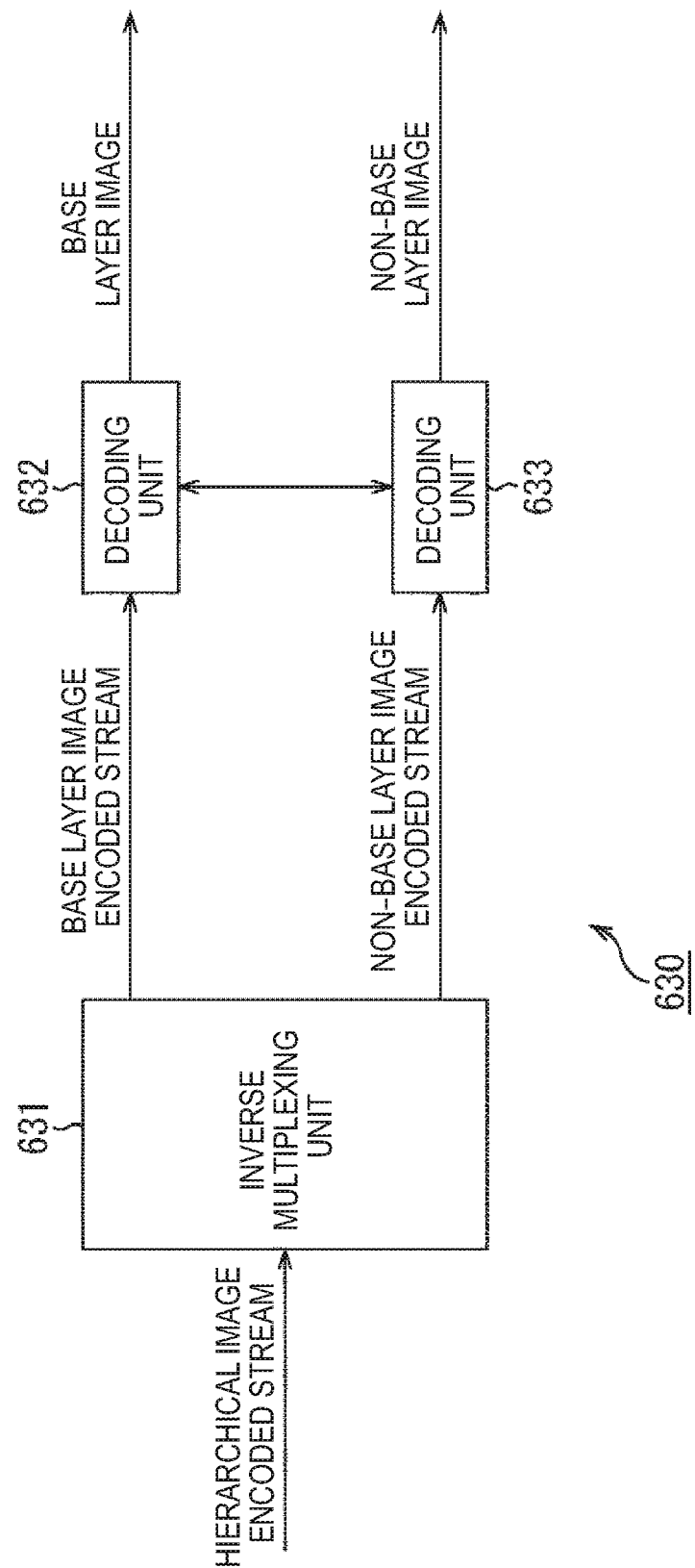
FIG. 32 is a diagram illustrating an example of a main configuration of a hierarchical image decoding device to which the present technology is applied.

FIG. 32 is a diagram illustrating a hierarchical image decoding device which performs the above-described hierarchical image decoding. The hierarchical image decoding device 630 has an inverse multiplexing unit 631, a decoding unit 632, and another decoding unit 633 as illustrated in FIG. 32.

The inverse multiplexing unit 631 inversely multiplexes the hierarchical image encoded stream obtained by multiplexing the base layer image encoded stream and the non-base layer image encoded stream to extract the base layer image encoded stream and the non-base layer image encoded stream. The decoding unit 632 decodes the base layer image encoded stream extracted by the inverse multiplexing unit 631 to obtain the base layer image. The decoding unit 633 decodes the non-base layer image encoded stream extracted by the inverse multiplexing unit 631 to obtain the non-base layer image.

For example, as the decoding unit 632 and the decoding unit 633 of the hierarchical image decoding device 630, the above-described image decoding device 100 may be applied. Thus, even when the encoding data of the hierarchical image is decoded, the method described in the first embodiment can be applied. That is, the hierarchical image decoding device 630 can correctly decode the encoding data of the hierarchical image that is encoded by various methods described in the above embodiments. Accordingly, the hierarchical image decoding device 630 can suppress a load of the decoding process of the encoding data of the hierarchical image from increasing.

4. Fourth Embodiment

<Computer>

The series of processes described above can be executed by hardware or software. When the series of processes are executed by software, a program constituting the software is installed in a computer. Here, the computer includes a computer incorporated into dedicated hardware, a general-purpose personal computer, for example, that can execute various functions by installing various programs, and the like.

Figure 33:
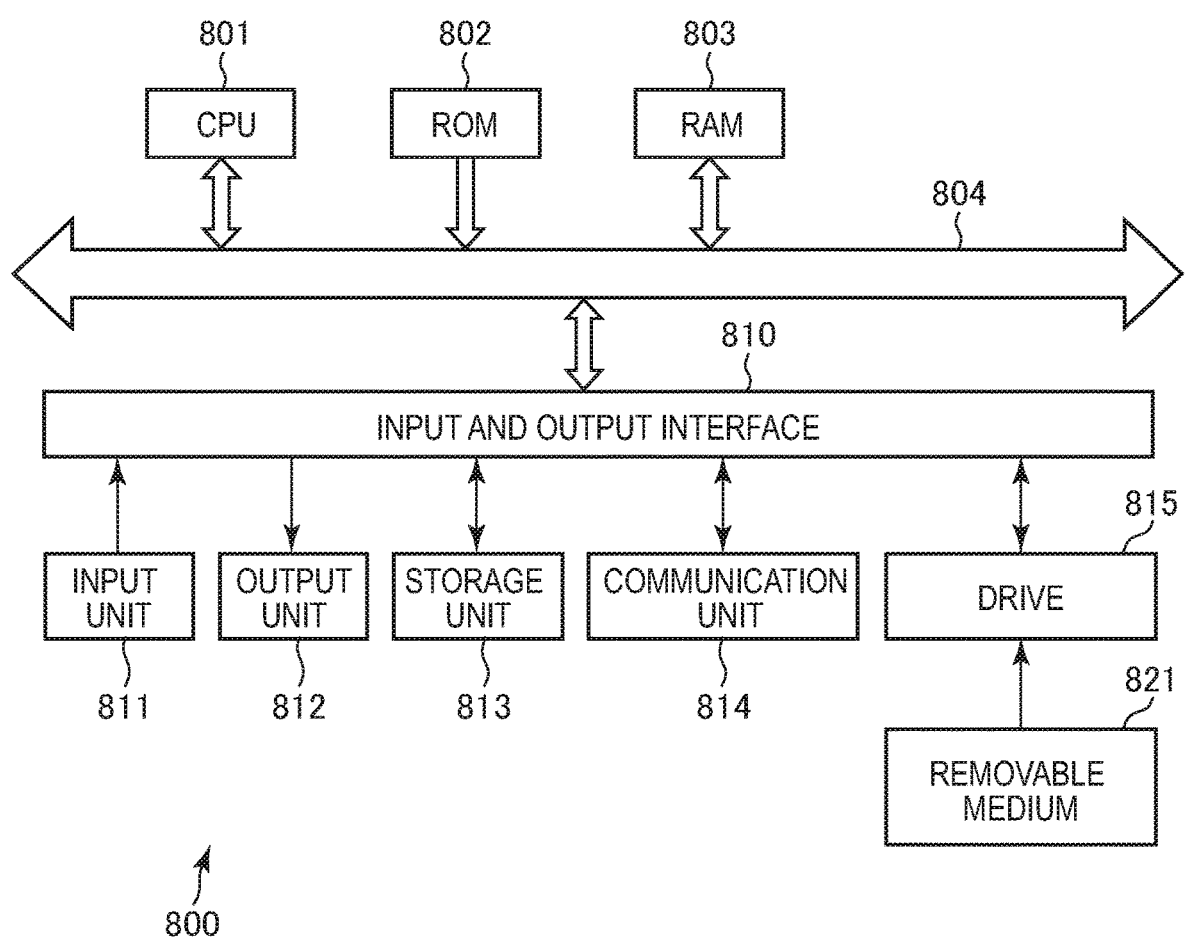
FIG. 33 is a block diagram illustrating an example of a main configuration of a computer.

FIG. 33 is a block diagram illustrating an example of a hardware configuration of a computer which executes the above-described series of processes using a program.

In the computer 800 shown in FIG. 33, a central processing unit (CPU) 801, a read only memory (ROM) 802, and a random access memory (RAM) 803 are connected to one another by a bus 804.

The bus 804 is further connected with an input and output interface 810. The input and output interface 810 is connected with an input unit 811, an output unit 812, a storage unit 813, a communication unit 814, and a drive 815.

The input unit 811 includes, for example, a keyboard, a mouse, a microphone, a touch panel, and an input terminal. The output unit 812 includes, for example, a display, a speaker, and an output terminal. The storage unit 813 includes, for example, a hard disk, a RAM disk, and a non-volatile memory. The communication unit 814 includes, for example, a network interface. The drive 815 drives a removable medium 821 such as a magnetic disk, an optical disc, a magneto optical disc or a semiconductor memory.

In the computer configured as described above, the CPU 801 loads and executes a program stored in, for example, the storage unit 813, through the input and output interface 810 and the bus 804, in the RAM 803 and thus the above-described series of processes is performed. In addition, data necessary for the CPU 801 to perform various types of processing is also appropriately stored in the RAM 803.

The program executed by the computer (the CPU 801) can be recorded in the removable medium 821, for example, as package media, and applied. In this case, when the removable medium 821 is mounted in the drive 815, the program can be installed in the storage unit 813 through the input and output interface 810.

In addition, the program can be provided through wired or wireless transmission media such as a local area network, the Internet, and digital satellite broadcasting. In this case, the program can be received by the communication unit 814 and installed in the storage unit 813.

Alternatively, the program can be installed in advance in the ROM 802 or the storage unit 813.

Note that the program executed by the computer may be a program which performs the processes in a time series manner in the order described in the present specification, or may be a program which performs the processes in parallel or at necessary timings when they are invoked, or the like.

It should be also noted that, in this specification, the steps describing the program stored in the recording medium include not only a process performed in time series according to the sequence shown therein but also a process executed in parallel or individually, not necessarily performed in time series.

Further, in the present disclosure, a system has the meaning of a set of a plurality of configured elements (such as an apparatus or a module (part)), and does not take into account whether or not all the configured elements are in the same casing. Therefore, the system may be either a plurality of apparatuses, stored in separate casings and connected through a network, or a plurality of modules within a single casing.

Further, an element described as a single device (or processing unit) above may be configured as a plurality of devices (or processing units). On the contrary, elements described as a plurality of devices (or processing units) above may be configured collectively as a single device (or processing unit). Further, an element other than those described above may be added to each device (or processing unit). Furthermore, a part of an element of a given device (or processing unit) may be included in an element of another device (or another processing unit) as long as the configuration or operation of the system as a whole is substantially the same.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

For example, the present disclosure can adopt a configuration of cloud computing which processes by allocating and connecting one function by a plurality of apparatuses through a network.

Further, each step described by the above-mentioned flow charts can be executed by one apparatus or by allocating a plurality of apparatuses.

In addition, in the case where a plurality of processes are included in one step, the plurality of processes included in this one step can be executed by one apparatus or by sharing a plurality of apparatuses.

The image decoding device according to the above-described embodiments may be applied to various electronic devices, for example, a transmitter or a receiver used for satellite broadcasting, cable broadcasting such as cable TV, delivery over the Internet, delivery to a terminal through cellular communication, and a recording device configured to record an image in media such as an optical disc, a magnetic disk and a flash memory, and a reproduction device configured to reproduce an image in such a storage medium. Hereinafter, four application examples will be described.

5. Fifth Embodiment

First Application Example: Television Receiver

Figure 34:
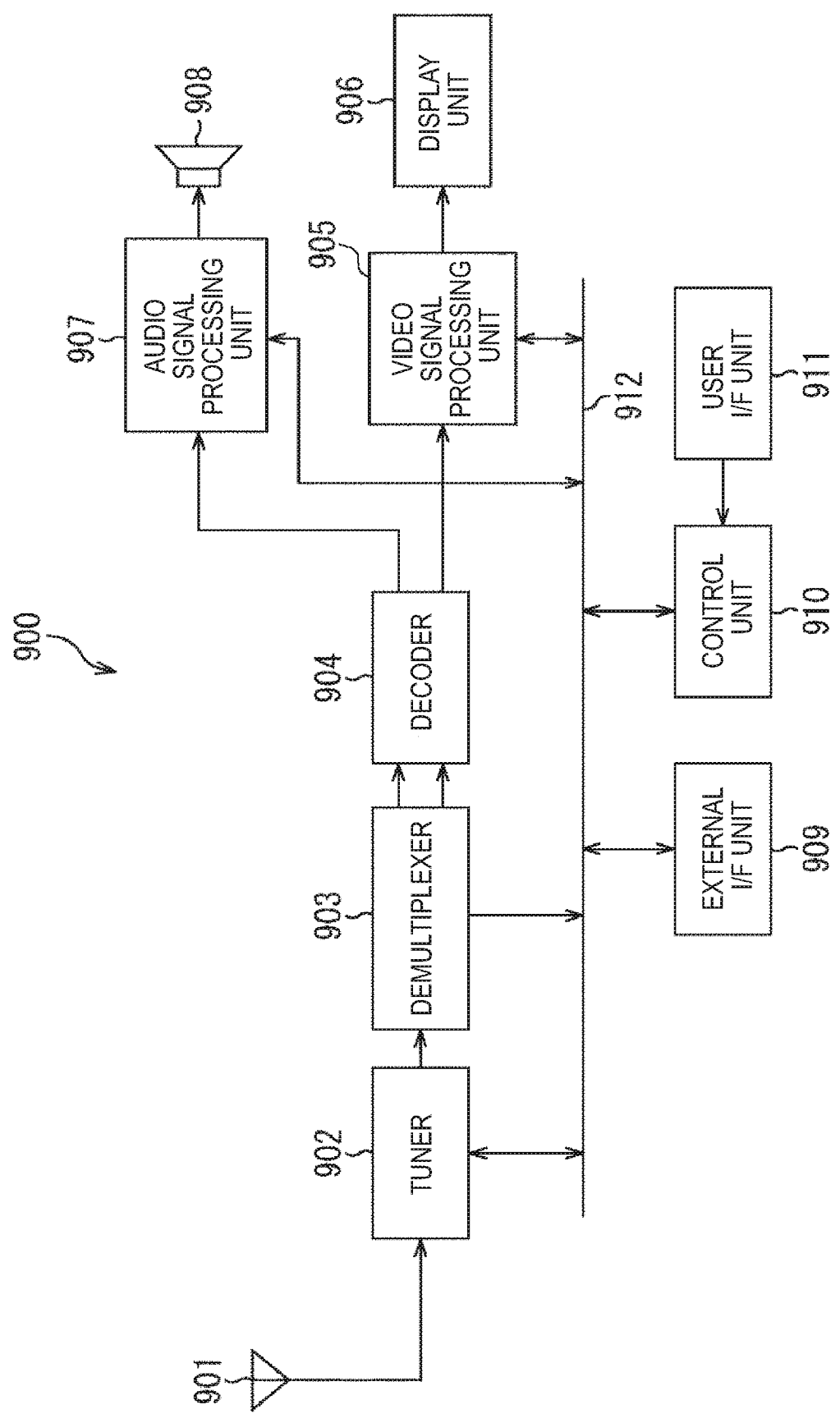
FIG. 34 is a block diagram illustrating an example of a schematic configuration of a television device.

FIG. 34 illustrates an example of a schematic configuration of a television device to which the above-described embodiment is applied. A television device 900 includes an antenna 901, a tuner 902, a demultiplexer 903, a decoder 904, a video signal processing unit 905, a display unit 906, an audio signal processing unit 907, a speaker 908, an external interface (I/F) unit 909, a control unit 910, a user interface (I/F) unit 911, and a bus 912.

The tuner 902 extracts a desired channel signal from a broadcast signal received through the antenna 901, and demodulates the extracted signal. Then, the tuner 902 outputs an encoding bitstream obtained by demodulation to the demultiplexer 903. That is, the tuner 902 serves as a transmission unit in the television device 900, which receives an encoding stream in which an image is encoded.

The demultiplexer 903 separates a video stream and an audio stream of a viewing target program from the encoding bitstream, and outputs separated streams to the decoder 904. In addition, the demultiplexer 903 extracts auxiliary data such as an electronic program guide (EPG) from the encoding bitstream, and supplies the extracted data to the control unit 910. When the encoding bitstream is scrambled, the demultiplexer 903 may perform descrambling.

The decoder 904 decodes the video stream and the audio stream input from the demultiplexer 903. Then, the decoder 904 outputs video data generated in the decoding process to the video signal processing unit 905. In addition, the decoder 904 outputs audio data generated in the decoding process to the audio signal processing unit 907.

The video signal processing unit 905 reproduces video data input from the decoder 904, and displays a video on the display unit 906. In addition, the video signal processing unit 905 may display an application screen supplied through a network on the display unit 906. In addition, the video signal processing unit 905 may perform an additional process of the video data, for example, noise removal, according to settings. Further, the video signal processing unit 905 generates an image of a graphical user interface (GUI), for example, a menu, a button or a cursor, and superimposes the generated image on an output image.

The display unit 906 is driven by a drive signal supplied from the video signal processing unit 905, and displays a video or an image on a video area of a display device (for example, a liquid crystal display, a plasma display or an organic electroluminescence display (OELD)).

The audio signal processing unit 907 performs a reproducing process such as D/A conversion and amplification of audio data input from the decoder 904, and outputs audio from the speaker 908. In addition, the audio signal processing unit 907 may perform an additional process such as noise removal of the audio data.

The external interface unit 909 is an interface for connecting the television device 900 and an external device or a network. For example, a video stream or an audio stream received through the external interface unit 909 may be decoded by the decoder 904. That is, the external interface unit 909 also serves as a transmission unit in the television device 900, which receives an encoding stream in which an image is encoded.

The control unit 910 includes a processor such as a CPU and a memory such as a RAM and a ROM. The memory stores a program executed by the CPU, program data, EPG data, and data acquired via a network. The program stored in the memory is read and executed by the CPU, for example, when the television device 900 starts. The CPU executes the program, and therefore controls operations of the television device 900 according to, for example, a manipulation signal input from the user interface unit 911.

The user interface unit 911 is connected to the control unit 910. The user interface unit 911 includes, for example, a button or a switch for a user to manipulate the television device 900 and a reception unit of a remote control signal. The user interface unit 911 detects user manipulation through such components, generates a manipulation signal, and outputs the generated manipulation signal to the control unit 910.

The bus 912 connects the tuner 902, the demultiplexer 903, the decoder 904, the video signal processing unit 905, the audio signal processing unit 907, the external interface unit 909 and the control unit 910 to one another.

In the television device 900 configured in this manner, the decoder 904 may include functions of the image decoding device 100. That is, the decoder 904 may decode the encoding data using the method described in the first embodiment. Thus, the television device 900 can suppress a load of the decoding process of the received encoding bitstream from increasing.

Second Application Example: Mobile Phone

Figure 35:
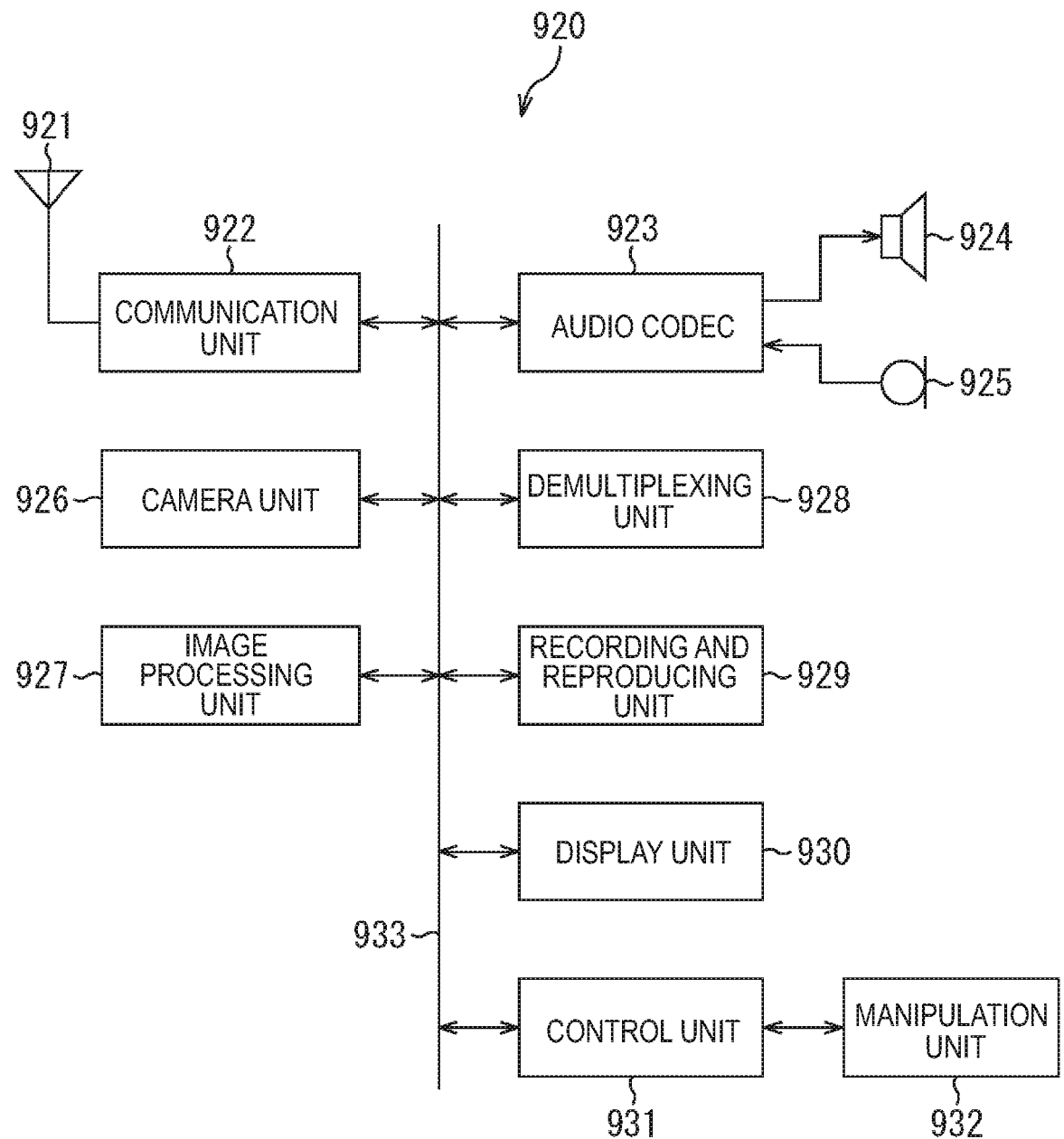
FIG. 35 is a block diagram illustrating an example of a schematic configuration of a mobile telephone.

FIG. 35 illustrates an example of a schematic configuration of a mobile phone to which the above-described embodiment is applied. A mobile phone 920 includes an antenna 921, a communication unit 922, an audio codec 923, a speaker 924, a microphone 925, a camera unit 926, an image processing unit 927, a demultiplexing unit 928, a recording and reproducing unit 929, a display unit 930, a control unit 931, a manipulation unit 932, and a bus 933.

The antenna 921 is connected to the communication unit 922. The speaker 924 and the microphone 925 are connected to the audio codec 923. The manipulation unit 932 is connected to the control unit 931. The bus 933 connects the communication unit 922, the audio codec 923, the camera unit 926, the image processing unit 927, the demultiplexing unit 928, the recording and reproducing unit 929, the display unit 930, and the control unit 931 to one another.

The mobile phone 920 performs operations such as audio signal transmission and reception, e-mail or image data transmission and reception, image capturing, and data recording in various operation modes including a voice call mode, a data communication mode, an imaging mode and a videophone mode.

In the voice call mode, an analog audio signal generated by the microphone 925 is supplied to the audio codec 923. The audio codec 923 converts the analog audio signal into audio data, and performs A/D conversion and compression of the converted audio data. Then, the audio codec 923 outputs the compressed audio data to the communication unit 922. The communication unit 922 encodes and modulates the audio data, and generates a transmission signal. Then, the communication unit 922 transmits the generated transmission signal to a base station (not illustrated) through the antenna 921. In addition, the communication unit 922 performs amplification and frequency conversion of a wireless signal received through the antenna 921, and acquires a reception signal. Then, the communication unit 922 demodulates and decodes the reception signal, generates audio data, and outputs the generated audio data to the audio codec 923. The audio codec 923 performs decompression and D/A conversion of the audio data and generates an analog audio signal. Then, the audio codec 923 supplies the generated audio signal to the speaker 924, and outputs audio.

In addition, in the data communication mode, for example, the control unit 931 generates text data of an e-mail according to user manipulation through the manipulation unit 932. In addition, the control unit 931 displays text on the display unit 930. In addition, the control unit 931 generates e-mail data according to a transmission instruction from the user through the manipulation unit 932, and outputs the generated e-mail data to the communication unit 922. The communication unit 922 encodes and modulates the e-mail data, and generates a transmission signal. Then, the communication unit 922 transmits the generated transmission signal to a base station (not illustrated) through the antenna 921. In addition, the communication unit 922 performs amplification and frequency conversion of the wireless signal received through the antenna 921, and acquires a reception signal. Then, the communication unit 922 demodulates and decodes the reception signal, restores the e-mail data, and outputs the restored e-mail data to the control unit 931. The control unit 931 displays content of the e-mail on the display unit 930, supplies the e-mail data to the recording and reproducing unit 929, and writes the data in the storage medium.

The recording and reproducing unit 929 includes a certain readable and writable storage medium. For example, the storage medium may be a built-in storage medium such as a RAM and a flash memory, and an externally mounted storage medium such as a hard disk, a magnetic disk, a magneto optical disc, an optical disc, a Universal Serial Bus (USB) memory, or a memory card.

In addition, in the imaging mode, for example, the camera unit 926 images a subject, generates image data, and outputs the generated image data to the image processing unit 927. The image processing unit 927 encodes the image data input from the camera unit 926, supplies an encoding stream to the recording and reproducing unit 929, and writes the stream in the storage medium.

Further, in an image display mode, the recording and reproducing unit 929 reads the encoding stream recorded in the storage medium, and outputs the read encoding stream to the image processing unit 927. The image processing unit 927 decodes the encoding stream input from the recording and reproducing unit 929, supplies the image data to the display unit 930, and displays the image thereon.

In addition, in the videophone mode, for example, the demultiplexing unit 928 multiplexes the video stream encoded by the image processing unit 927 and the audio stream input from the audio codec 923, and outputs the multiplexed stream to the communication unit 922. The communication unit 922 encodes and modulates the stream and generates a transmission signal. Then, the communication unit 922 transmits the generated transmission signal to a base station (not illustrated) through the antenna 921. In addition, the communication unit 922 performs amplification and frequency conversion of the wireless signal received through the antenna 921, and acquires a reception signal. The encoding bitstream may be included in the transmission signal and the reception signal. Then, the communication unit 922 demodulates and decodes the reception signal, restores the stream, and outputs the restored stream to the demultiplexing unit 928. The demultiplexing unit 928 separates a video stream and an audio stream from the input stream, and outputs the video stream to the image processing unit 927, and the audio stream to the audio codec 923. The image processing unit 927 decodes the video stream and generates video data. The video data is supplied to the display unit 930, and a series of images is displayed by the display unit 930. The audio codec 923 performs decompression and D/A conversion of the audio stream and generates an analog audio signal. Then, the audio codec 923 supplies the generated audio signal to the speaker 924, and outputs audio.

In the mobile phone 920 configured in this manner, for example, the image processing unit 927 may include functions of the image decoding device 100. That is, the image processing unit 927 may decode the encoding data using the method described in the first embodiment. Thus, the mobile phone 920 can suppress a load of the decoding process of the encoding stream (the video stream) from increasing.

Third Application Example: Recording and Reproduction Device

Figure 36:
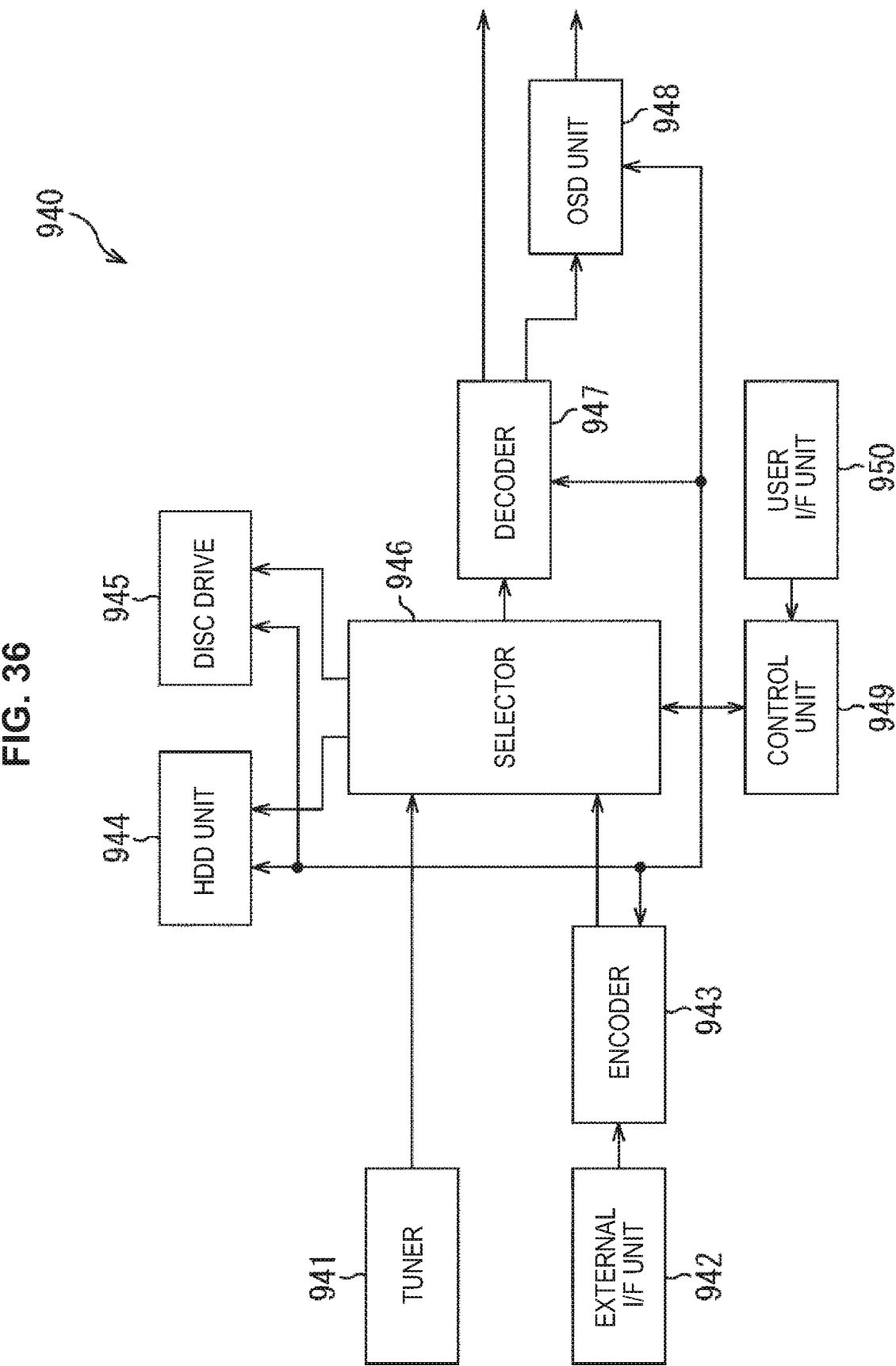
FIG. 36 is a block diagram illustrating an example of a schematic configuration of a recording and reproduction device.

FIG. 36 illustrates an example of a schematic configuration of a recording and reproduction device to which the above-described embodiment is applied. A recording and reproduction device 940 encodes, for example, audio data and video data of a received broadcast program, and records the data in the recording medium. In addition, the recording and reproduction device 940 may encode, for example, audio data and video data acquired from another device, and record the data in the recording medium. In addition, the recording and reproduction device 940 reproduces data recorded in the recording medium using a monitor and a speaker according to, for example, the user's instruction. In this case, the recording and reproduction device 940 decodes the audio data and the video data.

The recording and reproduction device 940 has a tuner 941, an external interface unit (I/F) 942, an encoder 943, a hard disk drive (HDD) unit 944, a disc drive 945, a selector 946, a decoder 947, an on-screen display (OSD) unit 948, a control unit 949, and a user interface unit (I/F) 950.

The tuner 941 extracts a desired channel signal from a broadcast signal received through an antenna (not illustrated), and demodulates the extracted signal. Then, the tuner 941 outputs an encoding bitstream obtained by demodulation to the selector 946. That is, the tuner 941 serves as a transmission unit in the recording and reproduction device 940.

The external interface unit 942 is an interface for connecting the recording and reproduction device 940 and an external device or a network. The external interface unit 942 may be, for example, an Institute of Electrical and Electronic Engineers (IEEE) 1394 interface, a network interface, a USB interface, or a flash memory interface. For example, video data and audio data received through the external interface unit 942 are input to the encoder 943. That is, the external interface unit 942 serves as the transmission unit in the recording and reproduction device 940.

When the video data and audio data input from the external interface unit 942 are not encoded, the encoder 943 encodes the video data and audio data. Then, the encoder 943 outputs the encoding bitstream to the selector 946.

The HDD 944 records the encoding bitstream in which content data such as a video and audio is compressed, various programs, and other data in an internal hard disk. In addition, when a video and audio are reproduced, the HDD 944 reads such data from a hard disk.

The disc drive 945 records and reads data in and from a recording medium that is mounted. The recording medium to be mounted in the disc drive 945 may be, for example, a Digital Versatile Disc (DVD) disc (DVD-Video, DVD-RAM (DVD-Random Access Memory), DVD-Recordable (DVD-R), DVD-Rewritable (DVD-RW), DVD+Recordable (DVD+R), DVD+Rewritable (DVD+RW) and the like) or a Blu-ray (registered trademark) disc.

When a video and audio are recorded, the selector 946 selects the encoding bitstream input from the tuner 941 or the encoder 943, and outputs the selected encoding bitstream to the HDD 944 or the disc drive 945. In addition, when a video and audio are reproduced, the selector 946 outputs the encoding bitstream input from the HDD 944 or the disc drive 945 to the decoder 947.

The decoder 947 decodes the encoding bitstream, and generates video data and audio data. Then, the decoder 947 outputs the generated video data to the OSD 948. In addition, the decoder 947 outputs the generated audio data to an external speaker.

The OSD 948 reproduces the video data input from the decoder 947, and displays a video. In addition, the OSD 948 may superimpose an image of a GUI, for example, a menu, a button or a cursor, on the video to be displayed.

The control unit 949 includes a processor such as a CPU and a memory such as a RAM and a ROM. The memory stores a program executed by the CPU and program data. The program stored in the memory is read and executed by the CPU, for example, when the recording and reproduction device 940 starts. The CPU executes the program, and therefore controls operations of the recording and reproduction device 940 according to, for example, a manipulation signal input from the user interface unit 950.

The user interface unit 950 is connected to the control unit 949. The user interface unit 950 includes, for example, a button and a switch for the user to manipulate the recording and reproduction device 940, and a reception unit of a remote control signal. The user interface unit 950 detects user manipulation through such components, generates a manipulation signal, and outputs the generated manipulation signal to the control unit 949.

In the recording and reproduction device 940 configured in this manner, for example, the decoder 947 may include functions of the image decoding device 100. That is, the decoder 947 may decode the encoding data using the method described in the first embodiment. Thus, the recording and reproduction device 940 can suppress a load of the decoding process of the encoding bitstream from increasing.

Fourth Application Example: Imaging Device

Figure 37:
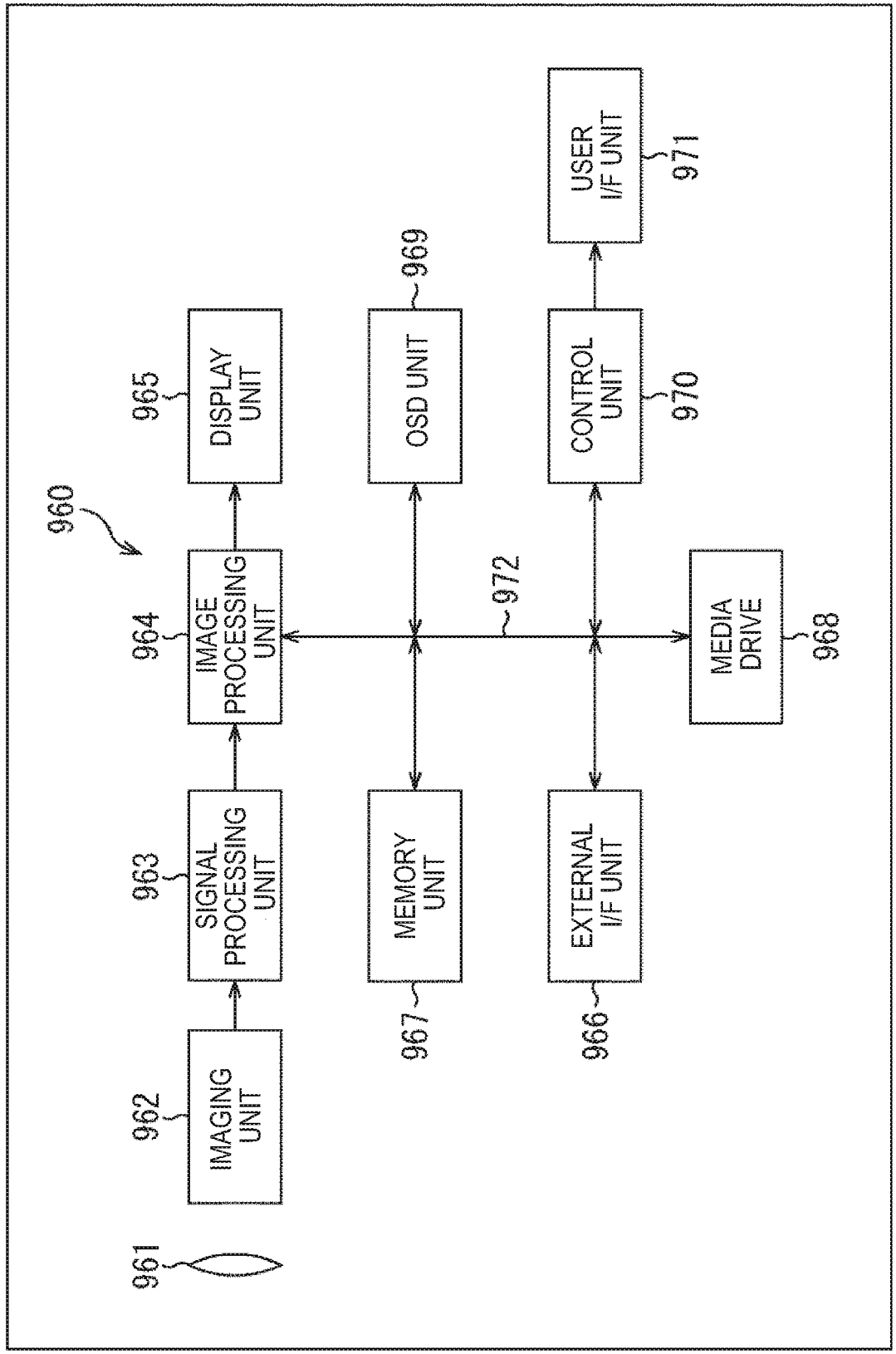
FIG. 37 is a block diagram illustrating an example of a schematic configuration of an imaging device.

FIG. 37 illustrates an example of a schematic configuration of an imaging device to which the above-described embodiment is applied. An imaging device 960 images a subject, generates an image, encodes image data, and records the data in the recording medium.

The imaging device 960 includes an optical block 961, an imaging unit 962, a signal processing unit 963, an image processing unit 964, a display unit 965, an external interface (I/F) unit 966, a memory unit 967, a media drive 968, an OSD 969, a control unit 970, a user interface (I/F) unit 971, and a bus 972.

The optical block 961 is connected to the imaging unit 962. The imaging unit 962 is connected to the signal processing unit 963. The display unit 965 is connected to the image processing unit 964. The user interface unit 971 is connected to the control unit 970. The bus 972 connects the image processing unit 964, the external interface unit 966, the memory unit 967, the media drive 968, the OSD 969, and the control unit 970 to one another.

The optical block 961 includes a focus lens and a diaphragm mechanism. The optical block 961 forms an optical image of the subject on an imaging area of the imaging unit 962. The imaging unit 962 includes an image sensor such as a charge coupled device (CCD) and a complementary metal oxide semiconductor (CMOS), and converts the optical image formed on the imaging area into an image signal as an electrical signal according to photoelectric conversion. Then, the imaging unit 962 outputs the image signal to the signal processing unit 963.

The signal processing unit 963 performs various types of camera signal processing such as knee correction, gamma correction, and color correction of the image signal input from the imaging unit 962. The signal processing unit 963 outputs the image data on which camera signal processing is performed to the image processing unit 964.

The image processing unit 964 encodes the image data input from the signal processing unit 963, and generates encoding data. Then, the image processing unit 964 outputs the generated encoding data to the external interface unit 966 or the media drive 968. In addition, the image processing unit 964 decodes the encoding data input from the external interface unit 966 or the media drive 968, and generates image data. Then, the image processing unit 964 outputs the generated image data to the display unit 965. In addition, the image processing unit 964 may output the image data input from the signal processing unit 963 to the display unit 965 and display an image. In addition, the image processing unit 964 may superimpose display data acquired from the OSD 969 on an image to be output to the display unit 965.

The OSD 969 generates an image of a GUI, for example, a menu, a button or a cursor, and outputs the generated image to the image processing unit 964.

The external interface unit 966 includes, for example, a USB input and output terminal. The external interface unit 966 connects the imaging device 960 and a printer, for example, when an image is printed. In addition, a drive is connected to the external interface unit 966 as necessary. A removable medium, for example, a magnetic disk or an optical disc, is mounted in the drive, and the program read from the removable medium may be installed in the imaging device 960. Further, the external interface unit 966 may be configured as a network interface that is connected to a network such as a LAN and the Internet. That is, the external interface unit 966 serves as the transmission unit in the imaging device 960.

The recording medium mounted in the media drive 968 may be a certain readable and writable removable medium, for example, a magnetic disk, a magneto optical disc, an optical disc, or a semiconductor memory. In addition, the recording medium is fixedly mounted in the media drive 968, and a non-portable storage unit, for example, a built-in hard disk drive or a solid state drive (SSD), may be provided.

The control unit 970 includes a processor such as a CPU and a memory such as a RAM and a ROM. The memory stores a program executed by the CPU and program data. The program stored in the memory is read and executed by the CPU, for example, when the imaging device 960 starts. The CPU executes the program, and therefore controls operations of the imaging device 960 according to, for example, a manipulation signal input from the user interface unit 971.

The user interface unit 971 is connected to the control unit 970. The user interface unit 971 includes, for example, a button and a switch for the user to manipulate the imaging device 960. The user interface unit 971 detects user manipulation through such components, generates a manipulation signal, and outputs the generated manipulation signal to the control unit 970.

In the imaging device 960 configured in this manner, for example, the image processing unit 964 may include functions of the image decoding device 100. That is, the image processing unit 964 may decode the encoding data using the method described in the first embodiment. Thus, the imaging device 960 can suppress a load of the decoding process of the encoding data from increasing.

The present technology can be applied to HTTP streaming, for example, MPEG DASH, in which appropriate data is selected from and used in units of segments among a previously prepared plurality of pieces of encoding data whose resolutions are different. That is, information about encoding or decoding can be shared among the plurality of pieces of encoding data.

6. Sixth Embodiment

Other Examples

Although the examples of devices, systems, and the like to which the present technology is applied have been described above, the present technology is not limited thereto, and can be implemented as any configuration mounted in the devices or devices constituting the systems, for example, processors in the form of system large scale integration (LSI), modules that use a plurality of processors, units that use a plurality of modules, sets obtained by further adding other functions to the units (i.e., a partial configuration of the devices), and the like.

<Video Set>

Figure 38:
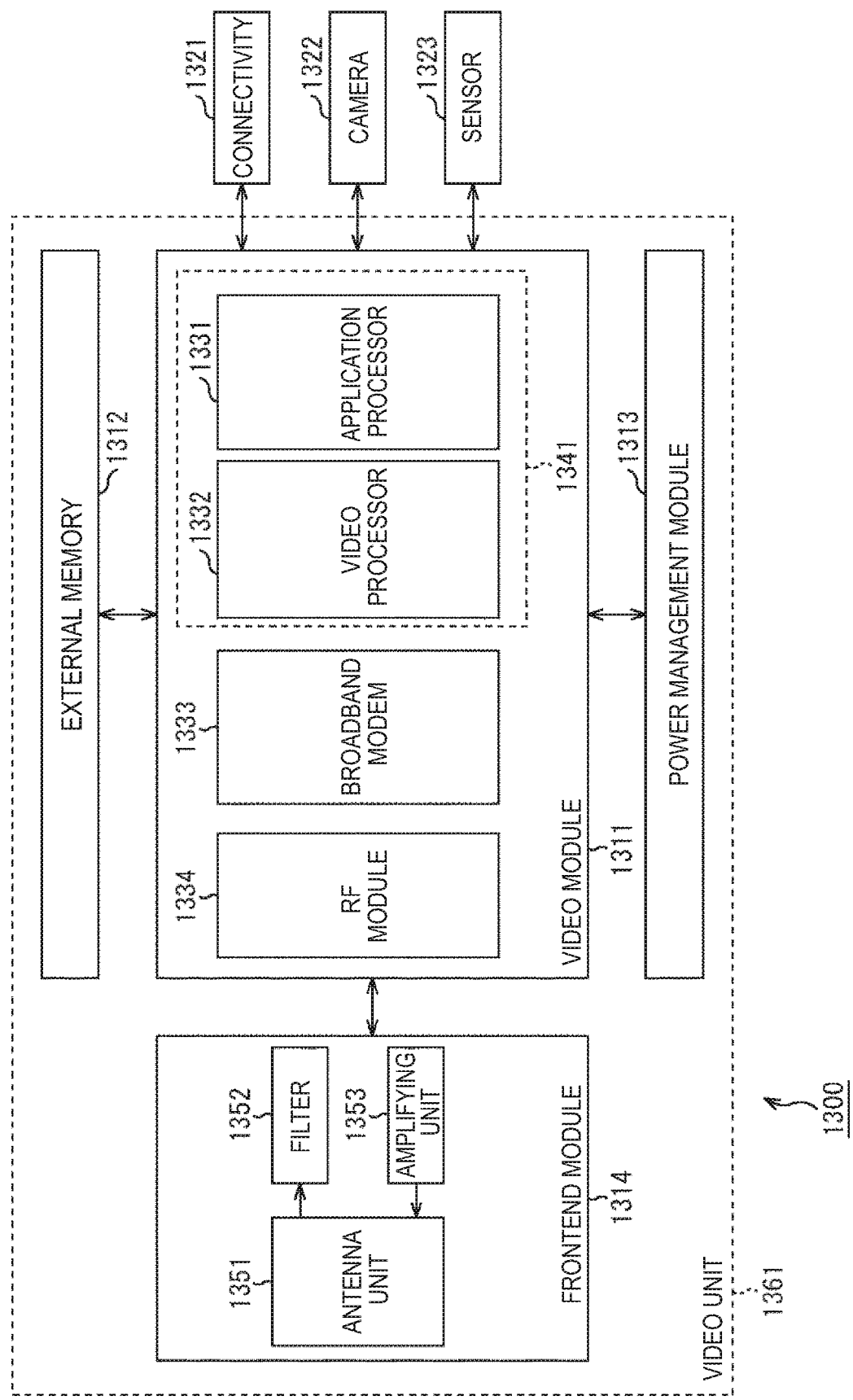
FIG. 38 is a block diagram illustrating an example of a schematic configuration of a video set.

An example in which the present technology is implemented as a set will be described with reference to FIG. 38. FIG. 38 illustrates an example of a schematic configuration of a video set to which the present technology is applied.

As electronic apparatuses have gradually become multifunctional in recent years, when some configurations of each apparatus are prepared for sale, provision, and the like in the stage of development and manufacturing, there are not only cases in which such an apparatus is configured to have one function, but also many cases in which a plurality of configurations having relevant functions are combined and implemented as one set with the plurality of functions.

The video set 1300 illustrated in FIG. 38 is configured to be multifunctional as described above by combining devices having functions of encoding and decoding (which may have either or both of the functions) of images with devices having other functions relating to the foregoing functions.

As illustrated in FIG. 38, the video set 1300 has a module group including a video module 1311, an external memory 1312, a power management module 1313, a frontend module 1314 and the like, and devices having relevant functions such as connectivity 1321, a camera 1322, a sensor 1323, and the like.

A module is a form of a component in which several related componential functions are gathered to provide a cohesive function. A specific physical configuration is arbitrary; however, it is considered to be an integration in which, for example, a plurality of processors each having functions, electronic circuit elements such as a resistor and a capacitor, and other devices are disposed on a circuit board. In addition, making a new module by combining a module with another module, a processor, or the like is also considered.

In the example of FIG. 38, the video module 1311 is a combination of configurations with functions relating to image processing, and has an application processor, a video processor, a broadband modem 1333, and an RF module 1334.

A processor is a semiconductor chip integrated with a configuration having predetermined functions using System-On-Chip (SoC), and is also referred to as, for example, system large scale integration (LSI), or the like. The configuration having a predetermined function may be a logic circuit (hardware configuration), may be, along with CPU, a ROM, and a RAM, a program that is executed by using the elements (software configuration), or may be a combination of both configurations. For example, a processor may have a logic circuit, a CPU, a ROM, a RAM, and the like and may realize some functions with the logic circuit (hardware configuration), or may realize the other functions with a program executed by the CPU (software configuration).

The application processor 1331 of FIG. 38 is a processor that executes an application relating to image processing. The application executed by the application processor 1331 can not only perform an arithmetic process but can also control a configuration internal and external to the video module 1311, for example, the video processor 1332 when necessary in order to realize predetermined functions.

The video processor 1332 is a processor having a function relating to (one or both of) encoding and decoding of images.

The broadband modem 1333 converts data (a digital signal) that is transmitted through either or both of wired and wireless broadband communication performed through a broadband line such as the Internet and a public telephone network into an analog signal according to digital modulation, demodulates the analog signal received through the broadband communication, and converts the signal into data (a digital signal). The broadband modem 1333 processes certain information, for example, image data processed by the video processor 1332, a stream in which image data is encoded, an application program, and setting data.

The RF module 1334 is a module which performs frequency conversion, modulation and demodulation, amplification, a filtering process, and the like on a radio frequency (RF) signal transmitted and received via an antenna. For example, the RF module 1334 generates an RF signal by performing frequency conversion and the like on a baseband signal generated by the broadband modem 1333. In addition, the RF module 1334, for example, generates a baseband signal by performing frequency conversion and the like on an RF signal received via the frontend module 1314.

Note that, as indicated by the dashed line 1341 in FIG. 38, the application processor 1331 and the video processor 1332 may be integrated to constitute one processor.

The external memory 1312 is a module that is provided outside the video module 1311, having a storage device used by the video module 1311. The storage device of the external memory 1312 may be realized with any physical configuration, but is generally used when large amounts of data such as image data in units of frames are stored, and thus it is desirable to realize the storage device with a relatively inexpensive and high-capacity semiconductor memory, for example, a dynamic random access memory (DRAM).

The power management module 1313 manages and controls power supply to the video module 1311 (each constituent element inside the video module 1311).

The frontend module 1314 is a module which provides the RF module 1334 with a frontend function (serving as a circuit of a transmitting and receiving end on an antenna side). The frontend module 1314 has, for example, an antenna unit 1351, a filter 1352, and an amplifying unit 1353 as illustrated in FIG. 38.

The antenna unit 1351 is configured with an antenna which transmits and receives wireless signals and peripherals thereof. The antenna unit 1351 transmits a signal supplied from the amplifying unit 1353 as a radio signal and supplies a received radio signal to the filter 1352 as an electric signal (RF signal). The filter 1352 performs a filtering process or the like on the RF signal received via the antenna unit 1351 and supplies the processed RF signal to the RF module 1334. The amplifying unit 1353 amplifies an RF signal supplied from the RF module 1334, and supplies the signal to the antenna unit 1351.

The connectivity 1321 is a module having a function relating to connection to the outside. A physical configuration of the connectivity 1321 is arbitrary. The connectivity 1321 has, for example, a configuration with a communication function other than that of a communication standard to which the broadband modem 1333 corresponds, an external input and output terminal, or the like.

For example, the connectivity 1321 may have a communicating function that is based on a wireless communication standard such as Bluetooth (a registered trademark), IEEE 802.11 (for example, Wireless Fidelity (Wi-Fi; a registered trademark), near field communication (NFC), or Infrared Data Association (IrDA), an antenna which transmits and receives signals based on the standard, or the like. In addition, the connectivity 1321 may have, for example, a module having a communicating function based on a wired communication standard such as Universal Serial Bus (USB), or High-Definition Multimedia Interface (HDMI; a registered trademark), or a terminal based on the standard. Furthermore, the connectivity 1321 may have, for example, another data (signal) transmitting function of an analog input and output terminal or the like.

Note that the connectivity 1321 may be set to include a device serving as a data (signal) transmission destination. For example, the connectivity 1321 may be set to have a drive (including a drive not only of a removable medium but also of a hard disk, a solid-state drive (SSD), a network-attached storage (NAS), or the like) which reads and writes data with respect to a recording medium such as a magnetic disk, an optical disc, a magneto-optical disc, or a semiconductor memory. In addition, the connectivity 1321 may be set to have an image or audio output device (a monitor, a speaker, or the like).

The camera 1322 is a module having a function of capturing a subject and obtaining image data of the subject. Image data obtained from capturing by the camera 1322 is, for example, supplied to and encoded by the video processor 1332.

The sensor 1323 is a module having arbitrary sensing functions of, for example, a sound sensor, an ultrasound sensor, a light sensor, an illuminance sensor, an infrared sensor, an image sensor, a rotation sensor, an angle sensor, an angular velocity sensor, a speed sensor, an acceleration sensor, an inclination sensor, a magnetic identification sensor, a shock sensor, a temperature sensor, and the like. Data detected by the sensor 1323 is, for example, supplied to the application processor 1331 and used by an application or the like.

The configurations described as modules above may be realized as processors, or conversely the configurations described as processors may be realized as modules.

In the video set 1300 with the configuration described above, the present technology can be applied to the video processor 1332 as will be described below. Thus, the video set 1300 can be implemented as a set to which the present technology is applied.

<Example of a Configuration of a Video Processor>

Figure 39:
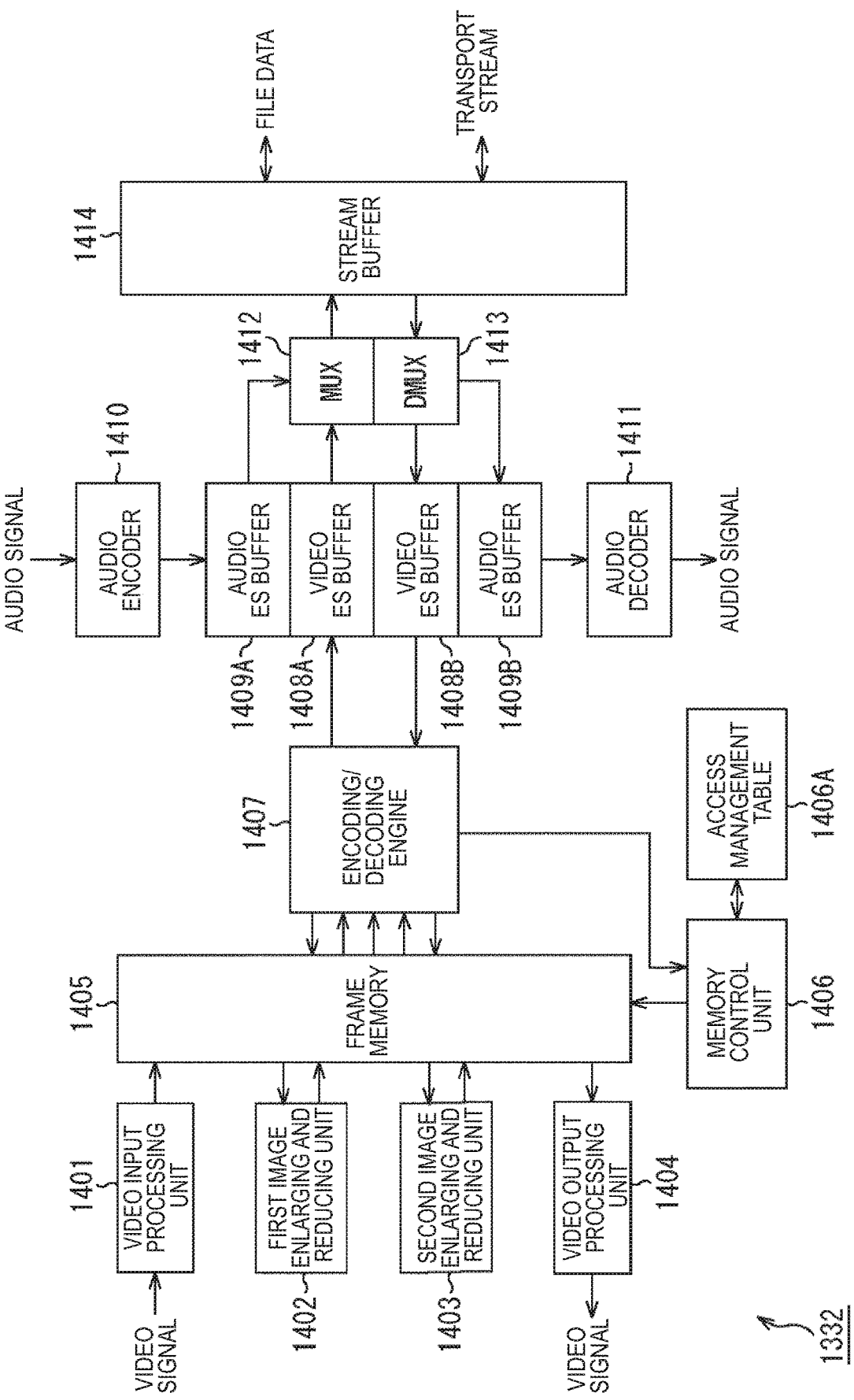
FIG. 39 is a block diagram illustrating an example of a schematic configuration of a video processor.

FIG. 39 illustrates an example of a schematic configuration of the video processor 1332 (of FIG. 38) to which the present technology is applied.

In the example of FIG. 39, the video processor 1332 has a function of receiving inputs of a video signal and an audio signal and encoding the signals in a predetermined scheme and a function of decoding encoded video data and audio data and outputting a video signal and an audio signal for reproduction.

As illustrated in FIG. 39, the video processor 1332 has a video input processing unit 1401, a first image enlarging and reducing unit 1402, a second image enlarging and reducing unit 1403, a video output processing unit 1404, a frame memory 1405, and a memory control unit 1406. In addition, the video processor 1332 has an encoding/decoding engine 1407, video elementary stream (ES) buffers 1408A and 1408B, and audio ES buffers 1409A and 1409B. Furthermore, the video processor 1332 has an audio encoder 1410, an audio decoder 1411, a multiplexer (MUX) 1412, a demultiplexer (DMUX) 1413, and a stream buffer 1414.

The video input processing unit 1401 acquires a video signal input from, for example, the connectivity 1321 (of FIG. 38), and converts the signal into digital image data. The first image enlarging and reducing unit 1402 performs format conversion, an image enlarging or reducing process or the like on image data. The second image enlarging and reducing unit 1403 performs an image enlarging or reducing process on the image data according to the format of a destination to which the data is output via the video output processing unit 1404, or performs format conversion, an image enlarging or reducing process or the like in the same manner as the first image enlarging and reducing unit 1402. The video output processing unit 1404 performs format conversion, conversion into an analog signal, or the like on image data, and outputs the data to, for example, the connectivity 1321 (of FIG. 38) as a reproduced video signal.

The frame memory 1405 is a memory for image data shared by the video input processing unit 1401, the first image enlarging and reducing unit 1402, the second image enlarging and reducing unit 1403, the video output processing unit 1404, and the encoding/decoding engine 1407. The frame memory 1405 is realized as a semiconductor memory, for example, a DRAM, or the like.

The memory control unit 1406 receives a synchronization signal from the encoding/decoding engine 1407 and controls access to the frame memory 1405 for writing and reading according to an access schedule to the frame memory 1405 which is written in an access management table 1406A. The access management table 1406A is updated by the memory control unit 1406 according to processes executed in the encoding/decoding engine 1407, the first image enlarging and reducing unit 1402, the second image enlarging and reducing unit 1403, and the like.

The encoding/decoding engine 1407 performs an encoding process of image data and a decoding process of a video stream that is data obtained by encoding image data. For example, the encoding/decoding engine 1407 encodes image data read from the frame memory 1405, and sequentially writes the data in the video ES buffer 1408A as video streams. In addition, for example, the encoding/decoding engine 1407 sequentially reads video streams from the video ES buffer 1408B, and sequentially writes the data in the frame memory 1405 as image data. The encoding/decoding engine 1407 uses the frame memory 1405 as a work area for such encoding and decoding. In addition, the encoding/decoding engine 1407 outputs a synchronization signal to the memory control unit 1406 at a timing at which, for example, a process on each micro block is started.

The video ES buffer 1408A buffers a video stream generated by the encoding/decoding engine 1407 and supplies the stream to the multiplexer (MUX) 1412. The video ES buffer 1408B buffers a video stream supplied from the demultiplexer (DMUX) 1413 and supplies the stream to the encoding/decoding engine 1407.

The audio ES buffer 1409A buffers an audio stream generated by an audio encoder 1410 and supplies the stream to the multiplexer (MUX) 1412. The audio ES buffer 1409B buffers an audio stream supplied from the demultiplexer (DMUX) 1413 and supplies the stream to an audio decoder 1411.

The audio encoder 1410, for example, digitally converts an audio signal input from, for example, the connectivity 1321 or the like, and encodes the signal in a predetermined scheme, for example, an MPEG audio scheme, an Audio-Code number 3 (AC3) scheme, or the like. The audio encoder 1410 sequentially writes audio streams that are data obtained by encoding audio signals in the audio ES buffer 1409A. The audio decoder 1411 decodes an audio stream supplied from the audio ES buffer 1409B, performs conversion into an analog signal, for example, and supplies the signal to, for example, the connectivity 1321 or the like as a reproduced audio signal.

The multiplexer (MUX) 1412 multiplexes a video stream and an audio stream. A method for this multiplexing (i.e., a format of a bit stream generated from multiplexing) is arbitrary. In addition, during multiplexing, the multiplexer (MUX) 1412 can also add predetermined header information or the like to a bit stream. That is to say, the multiplexer (MUX) 1412 can convert the format of a stream through multiplexing. By multiplexing a video stream and an audio stream, for example, the multiplexer (MUX) 1412 converts the streams into a transport stream that is a bit stream of a format for transport. In addition, by multiplexing a video stream and an audio stream, for example, the multiplexer (MUX) 1412 converts the streams into data of a file format for recording (file data).

The demultiplexer (DMUX) 1413 demultiplexes a bit stream obtained by multiplexing a video stream and an audio stream using a method which corresponds to the multiplexing performed by the multiplexer (MUX) 1412. That is to say, the demultiplexer (DMUX) 1413 extracts a video stream and an audio stream from a bit stream read from the stream buffer 1414 (separates the bit stream into the video stream and the audio stream). The demultiplexer (DMUX) 1413 can convert the format of a stream through demultiplexing (inverse conversion to conversion by the multiplexer (MUX) 1412). For example, the demultiplexer (DMUX) 1413 can acquire a transport stream supplied from, for example, the connectivity 1321, the broadband modem 1333, or the like via the stream buffer 1414, and convert the stream into a video stream and an audio stream through demultiplexing. In addition, for example, the demultiplexer (DMUX) 1413 can acquire file data read from various recording media by, for example, the connectivity 1321 via the stream buffer 1414, and convert the data into a video stream and an audio stream through demultiplexing.

The stream buffer 1414 buffers bit streams. For example, the stream buffer 1414 buffers a transport stream supplied from the multiplexer (MUX) 1412, and supplies the stream to, for example, the connectivity 1321, the broadband modem 1333, or the like at a predetermined timing or based on a request from outside or the like.

In addition, for example, the stream buffer 1414 buffers file data supplied from the multiplexer (MUX) 1412, and supplies the data to, for example, the connectivity 1321 or the like at a predetermined timing or based on a request from outside or the like to cause the data to be recorded on any of various kinds of recording media.

Furthermore, the stream buffer 1414 buffers a transport stream acquired via, for example, the connectivity 1321, the broadband modem 1333, or the like, and supplies the stream to the demultiplexer (DMUX) 1413 at a predetermined timing or based on a request from outside or the like.

In addition, the stream buffer 1414 buffers file data read from any of various kinds of recording media via, for example, the connectivity 1321 or the like, and supplies the data to the demultiplexer (DMUX) 1413 at a predetermined timing or based on a request from outside or the like.

Next, an example of an operation of the video processor 1332 having this configuration will be described. For example, a video signal input to the video processor 1332 from the connectivity 1321 or the like is converted into digital image data in a predetermined format such as a YCbCr format of 4:2:2 of in the video input processing unit 1401, and sequentially written in the frame memory 1405. This digital image data is read by the first image enlarging and reducing unit 1402 or the second image enlarging and reducing unit 1403, undergoes format conversion and an enlarging or reducing process in a predetermined format such as a YCbCr format of 4:2:0, and then is written in the frame memory 1405 again. This image data is encoded by the encoding/decoding engine 1407, and written in the video ES buffer 1408A as a video stream.

In addition, an audio signal input to the video processor 1332 from the connectivity 1321 is encoded by the audio encoder 1410, and then written in the audio ES buffer 1409A as an audio stream.

The video stream of the video ES buffer 1408A and the audio stream of the audio ES buffer 1409A are read and multiplexed by the multiplexer (MUX) 1412 to be converted into a transport stream, file data, or the like. The transport stream generated by the multiplexer (MUX) 1412 is buffered in the stream buffer 1414, and then output to an external network via, for example, the connectivity 1321, the broadband modem 1333, or the like. In addition, the file data generated by the multiplexer (MUX) 1412 is buffered in the stream buffer 1414, and output to, for example, the connectivity 1321 to be recorded in any of various kinds of recording media.

In addition, a transport stream input to the video processor 1332 from an external network via, for example, the connectivity 1321, the broadband modem 1333, or the like is buffered in the stream buffer 1414, and then demultiplexed by the demultiplexer (DMUX) 1413. In addition, for example, file data read from any of various kinds of recording media via the connectivity 1321 and input to the video processor 1332 is buffered in the stream buffer 1414, and then demultiplexed by the demultiplexer (DMUX) 1413. That is to say, the transport stream or the file data input to the video processor 1332 is separated into a video stream and an audio stream by the demultiplexer (DMUX) 1413.

The audio stream is supplied to the audio decoder 1411 via the audio ES buffer 1409B to be decoded, and an audio signal is reproduced. In addition, the video stream is written in the video ES buffer 1408B, then sequentially read by the encoding/decoding engine 1407 to be decoded, and written in the frame memory 1405. The decoded image data undergoes an enlarging and reducing process by the second image enlarging and reducing unit 1403, and is written in the frame memory 1405. Then, the decoded image data is read by the video output processing unit 1404, undergoes format conversion in a predetermined format such as the YCbCr format of 4:2:2, and is further converted into an analog signal, and a video signal is reproduced to be output.

When the present technology is applied to the video processor 1332 configured in this manner, the present technology according to the above-described embodiments may be applied to the encoding/decoding engine 1407. That is, for example, the encoding/decoding engine 1407 may include the above-described functions of the image decoding device 100. Thus, the video processor 1332 makes it possible to obtain the same effects described with reference to FIG. 1 to FIG. 26.

Note that the encoding/decoding engine 1407 of the present technology (i.e., the functions of the image decoding device 100) may be realized in the form of hardware such as a logic circuit, in the form of software such as an embedded program, or in both forms.

<Other Configuration Examples of a Video Processor>

Figure 40:
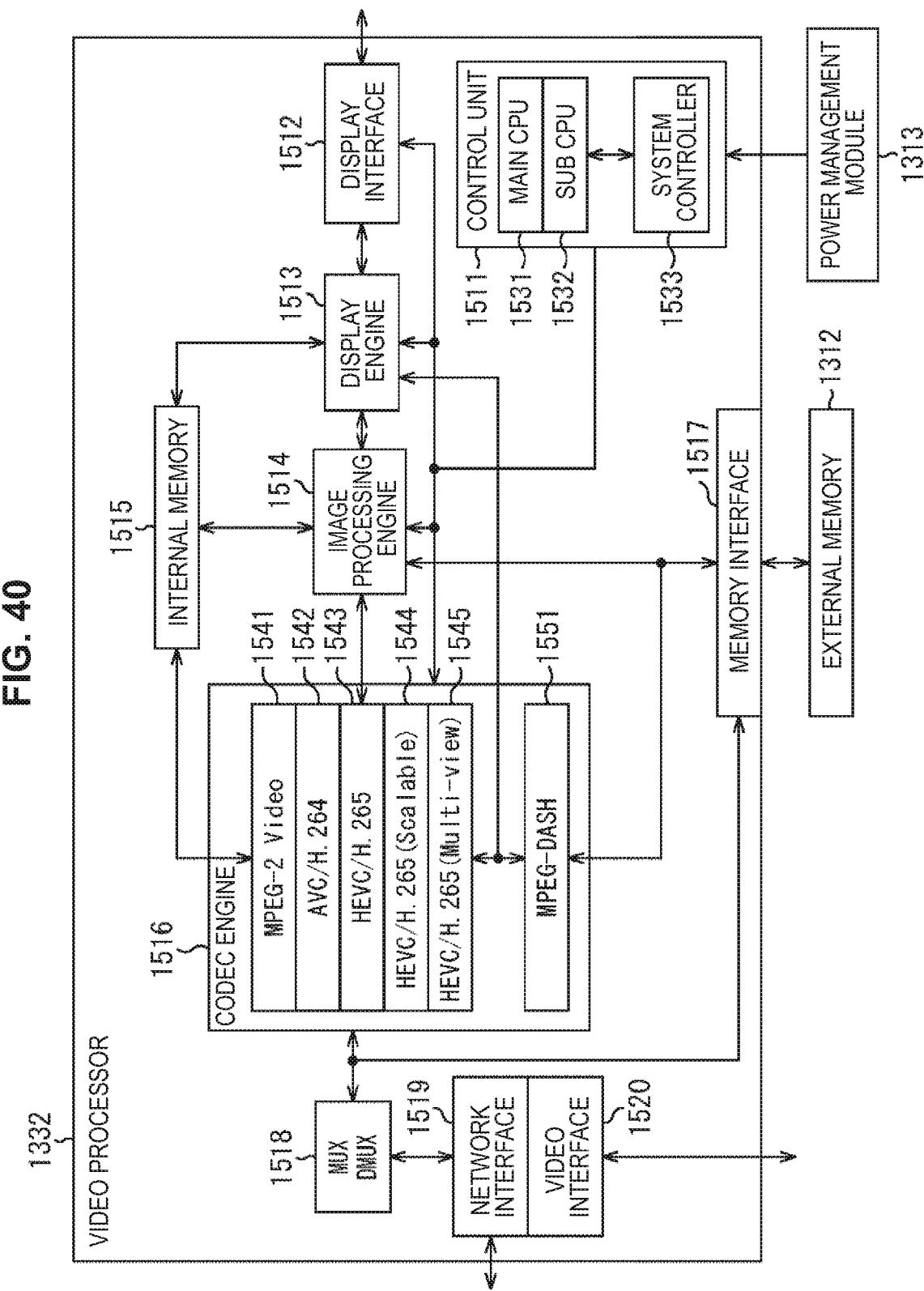
FIG. 40 is a block diagram illustrating another example of a schematic configuration of a video processor.

FIG. 40 illustrates another example of a schematic configuration of the video processor 1332 to which the present technology is applied. In the example of FIG. 40, the video processor 1332 includes a function of encoding and decoding video data according to a predetermined scheme.

More specifically, as illustrated in FIG. 40, the video processor 1332 includes a control unit 1511, a display interface 1512, a display engine 1513, an image processing engine 1514, and an internal memory 1515. In addition, the video processor 1332 includes a codec engine 1516, a memory interface 1517, a multiplexing and demultiplexing unit (MUX DMUX) 1518, a network interface 1519, and a video interface 1520.

The control unit 1511 controls operations of processing units in the video processor 1332, for example, the display interface 1512, the display engine 1513, the image processing engine 1514, and the codec engine 1516.

As illustrated in FIG. 40, the control unit 1511 includes, for example, a main CPU 1531, a sub CPU 1532, and a system controller 1533. The main CPU 1531 executes a program for controlling operations of processing units in the video processor 1332. The main CPU 1531 generates a control signal according to the program, and supplies the signal to the processing units (that is, controls operations of the processing units). The sub CPU 1532 has an auxiliary role of the main CPU 1531. For example, the sub CPU 1532 performs a child process and a subroutine of the program executed by the main CPU 1531. The system controller 1533 controls operations of the main CPU 1531 and the sub CPU 1532, for example, designating a program that the main CPU 1531 and the sub CPU 1532 execute.

The display interface 1512 outputs image data to, for example, the connectivity 1321, under control of the control unit 1511. For example, the display interface 1512 outputs image data of digital data as a video signal that is converted into an analog signal and is reproduced or image data of digital data without change to a monitor device of the connectivity 1321.

Under control of the control unit 1511, the display engine 1513 performs various types of transform processing of the image data such as a format transform, a size transform, and a color gamut transform to match hardware specifications of a monitor device on which the image is displayed.

Under control of the control unit 1511, the image processing engine 1514 performs predetermined image processing of the image data, for example, a filter process for improving image quality.

The internal memory 1515 is a memory that is shared among the display engine 1513, the image processing engine 1514, and the codec engine 1516 and is provided inside the video processor 1332. The internal memory 1515 is used for exchange of data that is performed among, for example, the display engine 1513, the image processing engine 1514, and the codec engine 1516. For example, the internal memory 1515 stores data supplied from the display engine 1513, the image processing engine 1514, or the codec engine 1516, and as necessary (for example, in response to a request), supplies the data to the display engine 1513, the image processing engine 1514, or the codec engine 1516. The internal memory 1515 may be implemented by any storage device. However, in general, the internal memory 1515 is used to store small capacity data such as image data in units of blocks or parameters in many cases. Therefore, it is preferable that the internal memory 1515 be implemented by a semiconductor memory having a high response rate even if it has a relatively (for example, compared to the external memory 1312) small capacity, like a static random access memory (SRAM).

The codec engine 1516 performs a process of encoding or decoding image data. An encoding and decoding scheme corresponding to the codec engine 1516 is arbitrary, and the number of schemes may be one or plural. For example, the codec engine 1516 may include a codec function of a plurality of encoding and decoding schemes, and may encode image data or decode encoding data according to a scheme selected therefrom.

In the example illustrated in FIG. 40, the codec engine 1516 includes, as functional blocks of a codec process, for example, an MPEG-2 Video 1541, an AVC/H.264 1542, an HEVC/H.265 1543, an HEVC/H.265 (Scalable) 1544, an HEVC/H.265 (Multi-view) 1545, and an MPEG-DASH 1551.

The MPEG-2 Video 1541 is a functional block that encodes or decodes image data according to an MPEG-2 scheme. The AVC/H.264 1542 is a functional block that encodes or decodes image data according to an AVC scheme. The HEVC/H.265 1543 is a functional block that encodes or decodes image data according to an HEVC scheme. The HEVC/H.265 (Scalable) 1544 is a functional block that scalably encodes or scalably decodes image data according to an HEVC scheme. The HEVC/H.265 (Multi-view) 1545 is a functional block that performs multi-view encoding or multi-view decoding of image data according to an HEVC scheme.

The MPEG-DASH 1551 is a functional block that transmits and receives image data according to an MPEG-Dynamic Adaptive Streaming over HTTP (MPEG-DASH) scheme. The MPEG-DASH is a technique in which video streaming is performed using HyperText Transmit Protocol (HTTP), and has one feature in which appropriate data is selected and transmitted in units of segments from among a previously prepared plurality of pieces of encoding data whose resolutions are different. In the MPEG-DASH 1551, a stream based on a standard is generated, transmission control of the stream is performed, and the above-described MPEG-2 Video 1541 to the HEVC/H.265 (Multi-view) 1545 are used to encode and decode image data.

The memory interface 1517 is an interface for the external memory 1312. Data supplied from the image processing engine 1514 or the codec engine 1516 is supplied to the external memory 1312 through the memory interface 1517. In addition, data read from the external memory 1312 is supplied to the video processor 1332 (the image processing engine 1514 or the codec engine 1516) through the memory interface 1517.

The multiplexing and demultiplexing unit (MUX DMUX) 1518 multiplexes or demultiplexes various types of data regarding an image, for example, a bitstream of encoding data, image data, and a video signal. The multiplexing and demultiplexing method is arbitrary. For example, when multiplexing is performed, the multiplexing and demultiplexing unit (MUX DMUX) 1518 can combine a plurality of pieces of data into one piece of data, and add predetermined header information to the data. In addition, when demultiplexing is performed, the multiplexing and demultiplexing unit (MUX DMUX) 1518 can divide one piece of data into a plurality of pieces of data and add predetermined header information to each divided piece of data. That is, the multiplexing and demultiplexing unit (MUX DMUX) 1518 can transform a data format according to multiplexing and demultiplexing. For example, the multiplexing and demultiplexing unit (MUX DMUX) 1518 multiplexes the bitstream and therefore can transform the bitstream into a transport stream which is a bitstream having a format for transmission or data (file data) having a file format for recording. It is needless to say that an inverse transform according to demultiplexing is possible.

The network interface 1519 is an interface for, for example, the broadband modem 1333, the connectivity 1321 and the like. The video interface 1520 is an interface for, for example, the connectivity 1321 or the camera 1322.

Next, an example of operations of the video processor 1332 will be described. For example, when a transport stream is received from an external network through the connectivity 1321 or the broadband modem 1333, the transport stream is supplied to and demultiplexed in the multiplexing and demultiplexing unit (MUX DMUX) 1518 through the network interface 1519, and is decoded by the codec engine 1516. Image data obtained by decoding performed by the codec engine 1516 undergoes, for example, predetermined image processing performed by the image processing engine 1514, undergoes a predetermined transform performed by the display engine 1513, and is supplied to, for example, the connectivity 1321 through the display interface 1512, and the image is displayed on a monitor. In addition, for example, the image data obtained by decoding performed by the codec engine 1516 is re-encoded by the codec engine 1516, is multiplexed by the multiplexing and demultiplexing unit (MUX DMUX) 1518, is transformed into file data, is output to, for example, the connectivity 1321 through the video interface 1520, and is recorded in various types of recording media.

Further, for example, file data of encoding data obtained by encoding image data read from a recording medium (not illustrated) by the connectivity 1321 is supplied to and demultiplexed in the multiplexing and demultiplexing unit (MUX DMUX) 1518 through the video interface 1520, and is decoded by the codec engine 1516. The image data obtained by decoding performed by the codec engine 1516 undergoes predetermined image processing by the image processing engine 1514, undergoes a predetermined transform by the display engine 1513, and is supplied to, for example, the connectivity 1321, through the display interface 1512, and the image is displayed on a monitor. In addition, for example, the image data obtained by decoding performed by the codec engine 1516 is re-encoded by the codec engine 1516, is multiplexed by the multiplexing and demultiplexing unit (MUX DMUX) 1518, is transformed into a transport stream, is supplied to, for example, the connectivity 1321 or the broadband modem 1333 through the network interface 1519, and is transmitted to another device (not illustrated).

Exchange of the image data or other data among the processing units in the video processor 1332 may be performed using, for example, the internal memory 1515 or the external memory 1312. In addition, the power management module 1313 controls power supply to, for example, the control unit 1511.

When the present technology is applied to the video processor 1332 configured in this manner, the above-described embodiments according to the present technology may be applied to the codec engine 1516. That is, for example, the codec engine 1516 may have a functional block that implements the above-described image decoding device 100. Thus, the video processor 1332 makes it possible to obtain the same effects described with reference to FIG. 1 to FIG. 26.

In the codec engine 1516, the present technology (that is, functions of the image decoding device 100) may be implemented by either or both of hardware such as a logic circuit and software such as an embedded program.

While two configuration examples of the video processor 1332 have been described above, the video processor 1332 has an arbitrary configuration, and may have a configuration other than the above two examples. In addition, the video processor 1332 may include one semiconductor chip or a plurality of semiconductor chips, for example, a 3-dimensional stacked LSI in which a plurality of semiconductors are stacked. In addition, the video processor 1332 may be implemented by a plurality of LSIs.

Application Example to Devices

The video set 1300 can be embedded into various devices configured to process image data. The video set 1300 can be embedded in, for example, the television device 900 (FIG. 34), the mobile phone 920 (FIG. 35), the recording and reproduction device 940 (FIG. 36), or the imaging device 960 (FIG. 37). When the video set 1300 is embedded, the device makes it possible to obtain the same effects described with reference to FIG. 1 to FIG. 26.

Even in a part of each configuration of the above-described video set 1300, as long as the video processor 1332 is included, it can be implemented as a configuration to which the present technology is applied. For example, the video processor 1332 alone can be implemented as a video processor to which the present technology is applied. In addition, for example, as described above, the processor indicated by the dashed line 1341 or the video module 1311 can be implemented as a processor or a module to which the present technology is applied. Moreover, for example, a combination of the video module 1311, the external memory 1312, the power management module 1313, and the frontend module 1314 can be implemented as a video unit 1361 to which the present technology is applied. Any configuration makes it possible to obtain the same effects described with reference to FIG. 1 to FIG. 26.

That is, as long as the video processor 1332 is included, any configuration can be embedded in various devices configured to process image data, similarly to the case of the video set 1300. For example, the video processor 1332, the processor indicated by the dashed line 1341, the video module 1311, or the video unit 1361 can be embedded in, for example, the television device 900 (FIG. 34), the mobile phone 920 (FIG. 35), the recording and reproduction device 940 (FIG. 36), or the imaging device 960 (FIG. 37). Then, when any configuration to which the present technology is applied is embedded, the device makes it possible to obtain the same effects described with reference to FIG. 1 to FIG. 26, similarly to the case of the video set 1300.

In addition, an example in which various pieces of information are multiplexed in an encoding stream and transmitted from the encoding side to the decoding side has been described herein. However, a method of transmitting such information is not limited to such an example. For example, instead of multiplexing such information in the encoding bitstream, it may be transmitted or recorded as separate data associated with the encoding bitstream. Here, the description "associated with" means that an image (including a part of an image such as a slice or a block) included in the bitstream and information corresponding to the image may be linked when decoding is performed. That is, information may be transmitted through a different transmission path from that of an image (or a bitstream). In addition, information may be recorded in a different recording medium (or another recording area of the same recording medium) from that of an image (or a bitstream). Further, information and an image (or a bitstream) may be associated according to an arbitrary unit, for example, a plurality of frames, one frame, or a part of a frame.

Additionally, the present technology may also be configured as below.

(1)

An image decoding device including:

a decoding unit configured to generate decoded image data by decoding encoding data obtained by encoding image data for each coding unit (CU) that is recursively divided; and a filter processing unit configured to perform a filter process of the decoded image data generated by the decoding unit according to information set for each data unit corresponding to header information of the encoding data.

(2)

The image decoding device according to (1), wherein the filter processing unit skips a reference to information set for each CU unit referred to when the filter process is performed and performs the filter process of the decoded image data.

(3)

The image decoding device according to (2), wherein, when conditions for values of the header information indicate that it is unnecessary to refer to information set for each CU unit, the filter processing unit skips a reference to information set for each CU unit referred to when the filter process is performed.

(4)

The image decoding device according to (3), wherein the filter processing unit performs a filter process of the decoded image data in units of coding tree blocks (CTBs).

(5)

The image decoding device according to (3) or (4), wherein the filter processing unit performs a deblocking filter process as the filter process.

(6)

The image decoding device according to (5), wherein, when the following formulae are satisfied as the conditions, the filter processing unit skips a reference to information set for each CU unit referred to when the filter process is performed:

pcm_loop_filter_disabled_flag==0 transquant_bypass_enabled_flag==0 cu_qp_delta_enabled_flag==0.

(7)

The image decoding device according to (6), wherein, when a picture includes one slice, the filter processing unit skips a reference to information set for each CU unit referred to when the filter process is performed.

(8)

The image decoding device according to (6) or (7), wherein, when a picture includes a plurality of slices and when slice headers in the picture have same slice_qp_delta, the filter processing unit skips a reference to information set for each CU unit referred to when the filter process is performed.

(9)

The image decoding device according to any one of (3) to (8), wherein the filter processing unit performs a sample adaptive offset process as the filter process.

(10)

The image decoding device according to (9), wherein, when the following formulae are satisfied as the conditions, the filter processing unit skips a reference to information set for each CU unit referred to when the filter process is performed:

pcm_loop_filter_disabled_flag==0 transquant_bypass_enabled_flag==0.

(11)

An image decoding method including:

generating decoded image data by decoding encoding data obtained by encoding image data for each coding unit (CU) that is recursively divided; and performing a filter process of the generated decoded image data according to information set for each data unit corresponding to header information of the encoding data.

REFERENCE SIGNS LIST

100 image decoding device
112 reversible decoding unit
116 loop filter
122 filter control unit
131 deblocking filter control information generation unit
132 SAO control information generation unit
141 deblocking filter processing unit
142 SAO processing unit

The invention claimed is:

1. An image decoding device, comprising:
    circuitry configured to:
        decode encoded image data to generate decoded image data,
            wherein the encoded image data is obtained by encode of image data in a first data unit that is divided;
        skip a reference to information set in the first data unit based on header information of the image data; and
        filter the decoded image data in a second data unit,
            wherein the header information includes at least a sequence parameter set (SPS), a picture parameter set (PPS), and a slice header.

2. The image decoding device according to claim 1, wherein the circuitry is further configured to:
    skip the reference to the information set in the first data unit and filter the decoded image data in the second data unit, when conditions for values of the header information indicate that a filter process of pulse code modulated (PCM) data is enabled; and
    refer to the information set in the first data unit and filter the decoded image data in the first data unit, when the conditions for the values of the header information indicate that the filter process of the PCM data is disabled.

3. The image decoding device according to claim 2, wherein the circuitry is further configured to:
    skip the reference to the information set in the first data unit and filter the decoded image data in the second data unit, when the conditions for the values of the header information of the encoded image data satisfy following formula:

pcm_loop_filter_disabled_flag==0.

4. The image decoding device according to claim 1, wherein the circuitry is further configured to:
    skip the reference to the information set in the first data unit and filter the decoded image data in the second data unit, when conditions for values of the header information indicate that there is no possibility of a filter process in the first data unit being skipped; and
    refer to the information set in the first data unit and filter the decoded image data in the first data unit, when the conditions for the values of the header information indicate that there is a possibility of the filter process in the first data unit being skipped.

5. The image decoding device according to claim 1, wherein the circuitry is further configured to:
    skip the reference to the information set in the first data unit and filter the decoded image data in the second data unit, when conditions for values of the header information indicate that there is no possibility of a quantization parameter in the first data unit being changed; and
    refer to the information set in the first data unit and filter the decoded image data in the first data unit, when the conditions for the values of the header information of the encoded image data indicate that there is a possibility of the quantization parameter in the first data unit being changed.

6. The image decoding device according to claim 1, wherein the first data unit is a coding unit (CU), and the second data unit is a coding tree block (CTB).

7. The image decoding device according to claim 1, wherein the circuitry is further configured to:
    skip the reference to the information set in the first data unit and filter the decoded image data in the second data unit, when a picture includes one slice.

8. The image decoding device according to claim 1, wherein the circuitry is further configured to select a deblocking filter process as a filter process.

9. The image decoding device according to claim 1, wherein the circuitry is further configured to select a sample adaptive offset process as a filter process.

10. The image decoding device according to claim 1, wherein the information set in the first data unit corresponds to the header information of the encoded image data.

11. An image decoding method, comprising:
    decoding, by circuitry, encoded image data for generating decoded image data,
        wherein the encoded image data is obtained by encoding image data in a first data unit that is divided;
    skipping, by the circuitry, a reference to information set in the first data unit based on header information of the image data; and
    filtering, by the circuitry, the decoded image data in a second data unit, wherein the header information includes at least a sequence parameter set (SPS), a picture parameter set (PPS), and a slice header.

12. The image decoding method according to claim 11, further comprising:
skipping, by the circuitry, the reference to the information set in the first data unit and filtering, by the circuitry, the decoded image data in the second data unit, when conditions for values of the header information indicate that a filter process of pulse code modulated (PCM) data is enabled; and
referring, by the circuitry, to the information set in the first data unit and filtering, by the circuitry, the decoded image data in the first data unit, when the conditions for the values of the header information indicate that the filter process of the PCM data is disabled.

13. The image decoding method according to claim 12, further comprising:
skipping, by the circuitry, the reference to the information set in the first data unit and filtering, by the circuitry, the decoded image data in the second data unit, when the conditions for the values of the header information of the encoded image data satisfy following formula:

pcm_loop_filter_disabled_flag==0.

14. The image decoding method according to claim 11, further comprising:
skipping, by the circuitry, the reference to the information set in the first data unit and filtering, by the circuitry, the decoded image data in the second data unit, when conditions for values of the header information indicate that there is no possibility of a filter process in the first data unit being skipped; and
referring, by the circuitry, to the information set in the first data unit and filtering, by the circuitry, the decoded image data in the first data unit, when the conditions for the values of the header information indicate that there is a possibility of the filter process in the first data unit being skipped.

15. The image decoding method according to claim 11, further comprising:
skipping, by the circuitry, the reference to the information set in the first data unit and filtering, by the circuitry, the decoded image data in the second data unit, when conditions for values of the header information indicate that there is no possibility of a quantization parameter in the first data unit being changed; and
referring, by the circuitry, to the information set in the first data unit and filtering, by the circuitry, the decoded image data in the first data unit, when the conditions for the values of the header information of the encoded image data indicate that there is a possibility of the quantization parameter in the first data unit being changed.

16. The image decoding method according to claim 11, wherein the first data unit is a coding unit (CU), and the second data unit is a coding tree block (CTB).

17. The image decoding method according to claim 11, further comprising:
skipping, by the circuitry, the reference to the information set in the first data unit and filtering, by the circuitry, the decoded image data in the second data unit, when a picture includes one slice.

18. The image decoding method according to claim 11, further comprising selecting, by the circuitry, a deblocking filter process as a filter process.

19. The image decoding method according to claim 11, further comprising selecting, by the circuitry, a sample adaptive offset process as a filter process.

20. The image decoding method according to claim 11, wherein the information set in the first data unit corresponds to the header information of the encoded image data.

* * * * *